United States Patent
Johnson et al.

(10) Patent No.: US 12,040,441 B2
(45) Date of Patent: *Jul. 16, 2024

(54) CONSTRUCTION OF ULTRA HIGH CAPACITY PERFORMANCE BATTERY CELLS

(71) Applicant: HHeLi, LLC, Tulsa, OK (US)

(72) Inventors: Paige L. Johnson, Tulsa, OK (US); James Dean Fleetwood, II, Bloomington, IN (US)

(73) Assignee: HHeLi, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,118

(22) Filed: Nov. 1, 2021

(65) Prior Publication Data
US 2022/0123350 A1    Apr. 21, 2022

Related U.S. Application Data

(63) Continuation of application No. 16/138,640, filed on Sep. 21, 2018, now Pat. No. 11,165,090.

(60) Provisional application No. 62/562,253, filed on Sep. 22, 2017.

(51) Int. Cl.
| | |
|---|---|
| *H01M 10/04* | (2006.01) |
| *H01M 4/04* | (2006.01) |
| *H01M 4/131* | (2010.01) |
| *H01M 4/139* | (2010.01) |
| *H01M 4/36* | (2006.01) |

(52) U.S. Cl.
CPC ....... *H01M 10/045* (2013.01); *H01M 4/0419* (2013.01); *H01M 4/0471* (2013.01); *H01M 4/131* (2013.01); *H01M 4/139* (2013.01); *H01M 4/366* (2013.01)

(58) Field of Classification Search
CPC .... H01M 10/045; H01M 4/366; H01M 4/139; H01M 4/0471; H01M 4/0419; H01M 4/131
See application file for complete search history.

(56) References Cited

U.S. PATENT DOCUMENTS

| | | |
|---|---|---|
| 3,230,115 A | 1/1966 | Tamminen |
| 4,502,936 A | 3/1985 | Hayfield |
| 5,296,319 A | 3/1994 | Bito et al. |
| 5,679,481 A | 10/1997 | Takanishi et al. |
| 6,007,945 A | 12/1999 | Jacobs et al. |
| 6,171,571 B1 | 1/2001 | Bedard et al. |
| 6,670,300 B2 | 12/2003 | Werpy et al. |
| 6,746,983 B2 | 6/2004 | Gaffney et al. |

(Continued)

FOREIGN PATENT DOCUMENTS

| | | |
|---|---|---|
| AU | 2007330996 B2 | 6/2008 |
| BR | PI0720068 A2 | 6/2008 |

(Continued)

OTHER PUBLICATIONS

WIPO, "PCT/US18/52286: International Search Report and Written Opinion", dated Dec. 4, 2018.

(Continued)

*Primary Examiner* — Stewart A Fraser
(74) *Attorney, Agent, or Firm* — GableGotwals

(57) ABSTRACT

A method of forming a battery electrode includes spraying a suspension of nanoparticle sized metal oxide to create an active layer.

22 Claims, 59 Drawing Sheets

(56) References Cited

U.S. PATENT DOCUMENTS

| | | |
|---|---|---|
| 6,753,114 B2 | 6/2004 | Jacobs et al. |
| 7,053,022 B2 | 5/2006 | Gaffney et al. |
| 7,147,834 B2 | 12/2006 | Wong et al. |
| 7,166,263 B2 | 1/2007 | Vanderspurt et al. |
| 7,314,682 B2 | 1/2008 | Thackeray et al. |
| 7,320,845 B2 | 1/2008 | Zucker |
| 7,582,276 B2 | 9/2009 | Nonninger |
| 7,611,750 B2 | 11/2009 | Yi et al. |
| 7,612,011 B2 | 11/2009 | Vanderspurt et al. |
| 7,718,568 B2 | 5/2010 | Gaffney et al. |
| 7,732,096 B2 | 6/2010 | Thackeray et al. |
| 7,825,064 B2 | 11/2010 | Wong et al. |
| 8,088,707 B2 | 1/2012 | Kim et al. |
| 8,148,011 B2 | 4/2012 | Thackeray et al. |
| 8,173,827 B2 | 5/2012 | Chang et al. |
| 8,303,841 B2 | 11/2012 | Li et al. |
| 8,318,384 B2 | 11/2012 | Luo et al. |
| 8,383,077 B2 | 2/2013 | Thackeray et al. |
| 8,480,998 B2 | 7/2013 | Hagemeyer et al. |
| 8,493,711 B2 | 7/2013 | Seymour |
| 8,503,162 B2 | 8/2013 | Seymour |
| 8,614,878 B2 | 12/2013 | Seymour |
| 8,658,126 B2 | 2/2014 | Toledo Antonio et al. |
| 8,685,283 B2 | 4/2014 | Wei et al. |
| 8,759,245 B2 | 6/2014 | Chang et al. |
| 8,828,904 B2 | 9/2014 | Wei et al. |
| 8,871,374 B2 | 10/2014 | Vaughey et al. |
| 8,889,078 B2 | 11/2014 | Ji et al. |
| 8,921,257 B2 | 12/2014 | Hazin et al. |
| 8,926,860 B2 | 1/2015 | Sun et al. |
| 8,969,238 B2 | 3/2015 | Fehrmann et al. |
| 9,012,351 B2 | 4/2015 | Yang et al. |
| 9,098,001 B2 | 8/2015 | Tashiro et al. |
| 9,130,226 B2 | 9/2015 | Thackeray et al. |
| 9,786,910 B2 | 10/2017 | Johnson et al. |
| 10,978,731 B2 * | 4/2021 | Johnson ............... H01M 10/44 |
| 11,165,090 B2 * | 11/2021 | Johnson ............... H01M 4/131 |
| 2002/0028380 A1 * | 3/2002 | Tanjo ............... H01M 10/0568 |
| | | 429/231.1 |
| 2002/0086213 A1 | 7/2002 | Utsugi et al. |
| 2003/0065216 A1 | 4/2003 | Tanimoto et al. |
| 2004/0201948 A1 | 10/2004 | Hosoya et al. |
| 2004/0219428 A1 | 11/2004 | Nagayama |
| 2005/0118511 A1 | 6/2005 | Park et al. |
| 2005/0202171 A1 | 9/2005 | Shin |
| 2006/0147808 A1 | 7/2006 | Xiao et al. |
| 2006/0188781 A1 * | 8/2006 | Thackeray ............. C01G 51/50 |
| | | 423/594.15 |
| 2007/0048435 A1 | 3/2007 | Suzuki et al. |
| 2008/0026282 A1 | 1/2008 | Tamura et al. |
| 2008/0272740 A1 | 11/2008 | Martinet et al. |
| 2009/0017378 A1 | 1/2009 | Charest et al. |
| 2009/0027056 A1 | 1/2009 | Huang et al. |
| 2010/0001583 A1 | 1/2010 | Ichikawa |
| 2010/0016443 A1 | 1/2010 | Toledano et al. |
| 2010/0027192 A1 | 2/2010 | Perry et al. |
| 2010/0092866 A1 * | 4/2010 | Kim .................... H01M 4/1391 |
| | | 429/231.1 |
| 2010/0099031 A1 * | 4/2010 | Kato ................. H01M 10/0567 |
| | | 429/345 |
| 2010/0129724 A1 | 5/2010 | Kolosnitsyn |
| 2010/0181540 A1 | 7/2010 | Suzuki |
| 2010/0203121 A1 | 8/2010 | Toledano et al. |
| 2011/0033746 A1 | 2/2011 | Liu et al. |
| 2011/0129709 A1 | 6/2011 | Ahn et al. |
| 2011/0183203 A1 * | 7/2011 | Du ....................... H01M 4/133 |
| | | 427/78 |
| 2011/0206974 A1 * | 8/2011 | Inoue ................... H01M 4/667 |
| | | 156/60 |
| 2011/0259244 A1 | 10/2011 | Herbig et al. |
| 2011/0305940 A1 | 12/2011 | Usami |
| 2012/0058397 A1 | 3/2012 | Zhamu et al. |
| 2012/0085978 A1 | 4/2012 | Tashiro et al. |
| 2012/0237819 A1 | 9/2012 | Ahn |
| 2012/0238842 A1 | 9/2012 | Colvin, Jr. et al. |
| 2013/0017340 A1 | 1/2013 | Brown et al. |
| 2013/0026409 A1 | 1/2013 | Baker et al. |
| 2013/0078518 A1 | 3/2013 | Thackeray et al. |
| 2013/0149610 A1 | 6/2013 | Kang et al. |
| 2013/0216911 A1 | 8/2013 | Hosoya et al. |
| 2013/0224603 A1 | 8/2013 | Chen et al. |
| 2013/0255872 A1 | 10/2013 | Zhong |
| 2013/0266872 A1 | 10/2013 | Adamson et al. |
| 2013/0330640 A1 | 12/2013 | Badding et al. |
| 2014/0027670 A1 | 1/2014 | Sun et al. |
| 2014/0093761 A1 | 4/2014 | Sakanaka et al. |
| 2014/0154576 A1 | 6/2014 | Kang et al. |
| 2014/0187413 A1 | 7/2014 | Lagaron Cabello et al. |
| 2014/0212694 A1 | 7/2014 | Park et al. |
| 2014/0242445 A1 | 8/2014 | Gozdz et al. |
| 2014/0295244 A1 | 10/2014 | Galkwad |
| 2014/0322607 A1 | 10/2014 | Thackeray et al. |
| 2014/0343203 A1 | 11/2014 | Miltner et al. |
| 2015/0044565 A1 | 2/2015 | Wang et al. |
| 2015/0065667 A1 | 3/2015 | Cheng et al. |
| 2015/0069295 A1 | 3/2015 | Ho et al. |
| 2015/0079471 A1 | 3/2015 | Fang et al. |
| 2015/0087505 A1 | 3/2015 | Sanchez Valente et al. |
| 2015/0126774 A1 | 5/2015 | Hiraoka et al. |
| 2015/0140423 A1 | 5/2015 | Brown et al. |
| 2015/0151280 A1 | 6/2015 | Sanchez Valente et al. |
| 2015/0155595 A1 | 6/2015 | Ogihara |
| 2015/0207143 A1 * | 7/2015 | Wu ....................... H01M 4/366 |
| | | 429/231.8 |
| 2015/0238937 A1 | 8/2015 | Kang et al. |
| 2015/0263342 A1 | 9/2015 | Newbound et al. |
| 2015/0287978 A1 | 10/2015 | Lockett et al. |
| 2015/0303459 A1 | 10/2015 | Kovalenko et al. |
| 2016/0293957 A1 | 10/2016 | Okae et al. |
| 2017/0069931 A1 | 3/2017 | Wang et al. |
| 2017/0141389 A1 | 5/2017 | Johnson et al. |
| 2017/0170515 A1 * | 6/2017 | Yushin ................ H01M 50/434 |
| 2017/0214079 A1 | 7/2017 | Dai et al. |
| 2017/0222220 A1 | 8/2017 | Busnaina et al. |
| 2018/0138506 A1 | 5/2018 | Johnson |
| 2018/0294479 A1 | 10/2018 | Johnson et al. |
| 2018/0337404 A1 | 11/2018 | Johnson |
| 2018/0337405 A1 | 11/2018 | Johnson |

FOREIGN PATENT DOCUMENTS

| | | |
|---|---|---|
| CA | 2637436 A1 | 8/2007 |
| CA | 2677185 A1 | 8/2008 |
| CA | 2824842 A1 | 8/2008 |
| CA | 2685475 A1 | 11/2008 |
| CA | 2744601 A1 | 6/2010 |
| CA | 2744601 C | 9/2013 |
| CA | 2677185 C | 12/2013 |
| CA | 2637436 C | 11/2014 |
| CN | 105543961 A | 5/2016 |
| CN | 105552306 A | 5/2016 |
| DE | 102013206736 A1 | 10/2014 |
| DE | 102013224206 A1 | 5/2015 |
| EP | 2086678 A1 | 8/2006 |
| EP | 1739139 A1 | 1/2007 |
| EP | 1888311 A2 | 2/2008 |
| EP | 2104558 A2 | 6/2008 |
| EP | 1997169 A1 | 12/2008 |
| EP | 2118208 A2 | 11/2009 |
| EP | 1739139 B1 | 10/2010 |
| EP | 1888311 A4 | 6/2011 |
| EP | 2545776 A2 | 1/2013 |
| EP | 2662914 A2 | 11/2013 |
| EP | 2662915 A2 | 11/2013 |
| EP | 2545776 A3 | 12/2014 |
| EP | 2662914 A4 | 1/2015 |
| EP | 1997169 B1 | 8/2015 |
| JP | 2009259723 A | 11/2009 |
| KR | 101125593 B1 | 3/2012 |
| KR | 1020170032905 A | 3/2017 |
| WO | 0023510 A1 | 4/2000 |
| WO | 2006124670 A2 | 11/2006 |
| WO | 2007085077 A1 | 8/2007 |

(56) References Cited

FOREIGN PATENT DOCUMENTS

| WO | 2007129842 | A1 | 11/2007 |
|---|---|---|---|
| WO | 2008066293 | A1 | 6/2008 |
| WO | 2008072239 | A2 | 6/2008 |
| WO | 2008093347 | A2 | 8/2008 |
| WO | 2008131551 | A1 | 11/2008 |
| WO | 2015078745 | A1 | 6/2015 |
| WO | 2016018738 | A1 | 2/2016 |
| WO | 2016019309 | A1 | 2/2016 |
| WO | 2016030126 | A1 | 3/2016 |
| WO | 2016184687 | A1 | 11/2016 |
| WO | 2017087404 | A1 | 5/2017 |
| WO | 2017087408 | A9 | 5/2017 |
| WO | 2017108181 | A1 | 6/2017 |

OTHER PUBLICATIONS

Pubchem Open Chemistry Database, "Ammonium Dihydrogen Phosphate", Mar. 22, 2016.
Adschiri et al, "Hydrothermal synthesis of metal oxide nanoparticles at supercritical conditions", , pp. 227-235, vol. 3, No. 2, Publisher: Journal of Nanoparticle Research; Jun. 2001.
Barbe et al, "Nanocrystalline Titanium Oxide electrodes for Photovoltaic Applications", , pp. 3157-3158, 3168, vol. 80, No. 12, Publisher: Journal of the American Ceramic Society; 1997.
Briois et al, "Solid-State and Solution Structural Study of Acetylacetone-Modified Tin(IV) Chloride Used as a Precursor of SnO2 nanoparticles Prepared by a Sol-Gel Route", , pp. 3885-3894, vol. 16, Publisher: Chem. Mater. 2004.
Chen et al, "Size effect of tin oxide nanoparticles on high capacity lithium battery anode materials", Dec. 15, 2007, pp. 1313-1318, vol. 202, No. 4-7, Publisher: Surface and Coatings Technology.
Feng, "The Synthesis and Characterization of Phosphonic Acids for the Surface Modification Study on Indium Tin Oxide", , Publisher: A dissertation presented to The Academic Faculty Georgia Institute of Technology; Aug. 2012.
Hino et al, "Reactions of butane and isobutane catalyzed by zirconium oxide treated with sulfate ion. solid superacid catalyst", , pp. 6439-6441, vol. 101, No. 21, Publisher: 1979 American Chemical Society.
Hofmann et al, "Highly monodisperse water-dispersable iron oxide nanoparticles for biomedical applications", , pp. 7842-7853, vol. 20, Publisher: Journal of Materials Chemistry; 2010.
Holland et al, "NMR characterization of phosphonic Acid Capped SnO2 nanoparticles", Chem. Mater. 2007, Feb. 14, 2007, pp. 2519-2526, vol. 19, Publisher: American Chemical Society.
Jouhannaud et al, "Rapid synthesis of tin (IV) oxide nanoparticles by microwave induced thermohydrolysis", Journal of Solid State Chemistry 2008, , pp. 1439-1444, vol. 181.
Lim et al, "Spherical Tin Oxide, SnO2 Particles Fabricated via Facile Hydrothermal method for Detection of Mercury (II) Ions", Sep. 1, 2011, pp. 4329-4340, Publisher: International Journal of Electrochemical Science.
Lu et al, "Electrochemical properties of tin oxide anodes for sodium-ion batteries", , pp. 287-295, Publisher: Journal of Power Sources 284; 2015.
Lu et al, "Improved electrochemical performance of tin-sulfide anodes for solium-ion batteries", Jun. 24, 2015, Publisher: Journal of Materials Chemistry A.
Mousavand et al, "Supercritical hydrothermal synthesis of organic-Oinorganic hybrid nanoparticles", Mar. 2006, pp. 1445-1446, vol. 41, No. 5, Publisher: Journal of Materials Science.
Munoz et al, "Comparative study of two wet chemical methods of BaSnO3 synthesis: Mechanism of formation of mixed oxide", Apr. 7, 2015, pp. 86-95, vol. 279, Publisher: Powder Technology 2015.
Nitta et al, "High-Capacity Anode Materials for Lithium-Ion Batteries: Choice of Elements and Structures of Active Particles", , Publisher: www.materialsviews.com; 2013.
WIPO, "PCT/US18/26961 International Search Report", dated Aug. 27, 2018.
KIPO, "PCT/US16/62068 International Search Report and Written Opinion", dated Mar. 2, 2017.
KIPO, "PCT/US16/62073 International Search Report and Written Opinion", dated Mar. 2, 2017.
USPTO, "PCT/US17/61866 International Search Report and Written Opinion", dated Jan. 17, 2018.
Queffelec et al, "Surface Modification Using Phosphonic Acids and Esters", , pp. 3777-3807, vol. 112, Publisher: Chemical Reviews; 2012.
Rabuffetti et al, "Synthesis-Dependent Surface Acidity and Structure of SrTiO3 Nanoparticles", , pp. 11056-11067, vol. 114, No. 26, Publisher: Dept of Chemistry, Northwestern University, J. Phys. Chem; 2010.
Subramanian et al, "Hydrothermal Synthesis and Pseudocapacitance Properties of MnO2 Nanostructures", The Journal of Physical Chemistry B; Dec. 2005, , pp. 20207-20214, vol. 109, No. 43, Publisher: ResearchGate.
Sugunan et al, "Catalysis by some metal oxides modified with phosphate ions", Jun. 3, 2002, pp. 2251-2255, vol. 41A, No. Nov. 2002, Publisher: Indian Journal of Chemistry.
Sun et al, "Monodisperse Porous LiFePO4 Microspheres for a High Power Li-Ion Battery Cathode", , pp. 2132-2135, vol. 133, No. 7, Publisher: Journal of the American Chemical Society; 2011.
Venere, "Nanoparticle network could bring fast-charging batteries", Dec. 3, 2014, Publisher: Purdue University.
Wang et al, "Selected-control hydrothermal synthesis of alpha-and beta-MnO(2) single crystal nanowires", , pp. 2880-2881, vol. 124, No. 12, Publisher: Journal of the American Chemical Society; Apr. 2002.
Zhang et al, "Nanoscale Magnesium Hydroxide and Magnesium Oxide Powders: Control Over Size, Shape, and Structure via Hydrothermal Synthesis", ResearchGate, Jan. 2001, pp. 435-440, vol. 13, No. 2, Publisher: Chemistry of Materials.
Zhou et al, "Ultra-Uniform SnOx/Carbon Nanohybrids toward Advanced Lithium-Ion Battery Anodes", Advanced Materials 2014, , pp. 3943-3949, vol. 26, Publisher: wileyonlinelibrary.com.

* cited by examiner

| Reagents used for synthesis | O | S | Cl | Metal | pH |
|---|---|---|---|---|---|
| Metal-chloride and HCl | 58.6 | - | 2.3 | 27.9 | 2.0 |
| Metal-sulfate and H₂SO₄ | 58.3 | 2.0 | - | 26.2 | 1.2 |

FIG. 6

| Reagents used for synthesis | O | P | O-C=O | Metal |
|---|---|---|---|---|
| Metal-acetate and phosphoric acid | 59.6 | 3.0 | 0.4 | 27.3 |

FIG. 10

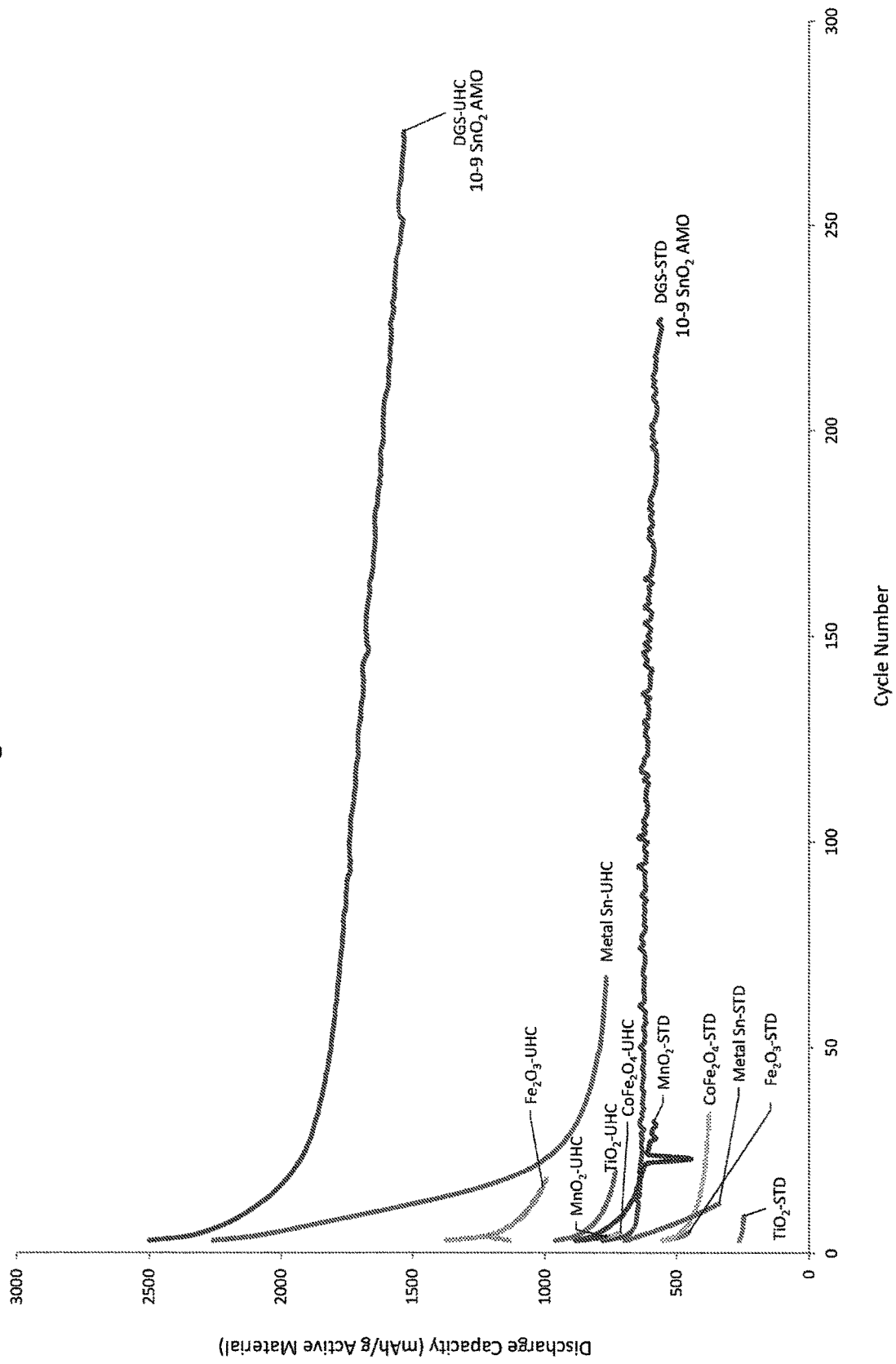

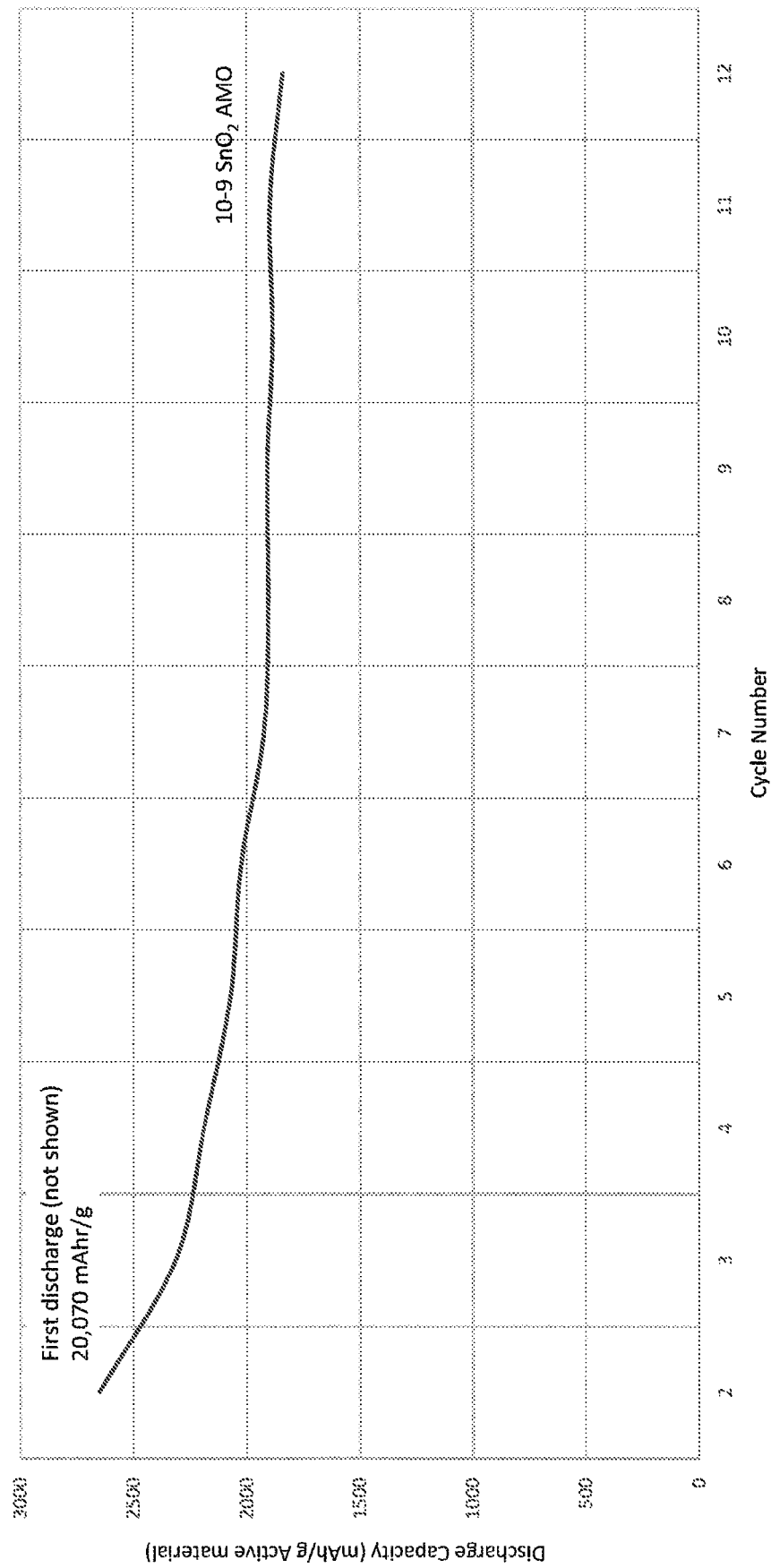

CONSTRUCTION OF ULTRA HIGH CAPACITY PERFORMANCE BATTERY CELLS

CROSS-REFERENCE To RELATED CASES

This application is a continuation application of U.S. application Ser. No. 16/138,640, filed on Sep. 21, 2018, which claims the benefit of U.S. provisional patent application Ser. No. 62/562,253, filed on Sep. 22, 2017, and incorporates such provisional application by reference into this disclosure as if fully set out at this point.

BACKGROUND

This invention is in the field of materials useful in chemical energy storage and power devices such as, but not limited to, batteries. More specifically, the invention relates to a battery cell with an electrode constructed at least in part by a spraying methodology. The spray-constructed electrode may comprise metal oxide nanomaterials, which may include acidified metal oxide ("AMO") nanomaterials. Such AMO materials are described herein. In some embodiments, a lithium anode may be utilized with a spray-constructed cathode. In some embodiments, the lithium anode consists of lithium, or consists essentially of lithium.

Metal oxides are compounds in which oxygen is bonded to metal, having a general formula $M_mO_x$. They are found in nature but can be artificially synthesized. In synthetic metal oxides the method of synthesis can have broad effects on the nature of the surface, including its acid/base characteristics. A change in the character of the surface can alter the properties of the oxide, affecting such things as its catalytic activity and electron mobility. The mechanisms by which the surface controls reactivity, however, are not always well characterized or understood. In photocatalysis, for example, the surface hydroxyl groups are thought to promote electron transfer from the conduction band to chemisorbed oxygen molecules.

Despite the importance of surface characteristics, the metal oxide literature, both scientific papers and patents, is largely devoted to creating new, nanoscale, crystalline forms of metal oxides for improved energy storage and power applications. Metal oxide surface characteristics are ignored and, outside of the chemical catalysis literature, very little innovation is directed toward controlling or altering the surfaces of known metal oxides to achieve performance goals.

The chemical catalysis literature is largely devoted to the creation of "superacids"—acidity greater than that of pure sulfuric acid (18.4 M $H_2SO_4$)—often used for large-scale reactions such as hydrocarbon cracking. Superacidity cannot be measured on the traditional pH scale, and is instead quantified by Hammet numbers. Hammet numbers ($H_0$) can be thought of as extending the pH scale into negative numbers below zero. Pure sulfuric acid has an $H_0$ of −12.

There are, however, many reaction systems and many applications for which superacidity is too strong. Superacidity may, for example, degrade system components or catalyze unwanted side reactions. However, acidity may still be useful in these same applications to provide enhanced reactivity and rate characteristics or improved electron mobility.

The battery literature teaches that acidic groups are detrimental in batteries, where they can attack metal current collectors and housings and cause deterioration in other electrode components. Further, the prior art teaches that an active, catalytic electrode surface leads to electrolyte decomposition which can result in gas generation within the cell and ultimately in cell failure.

A need exists for battery implementation having a synthetic metal oxide that is acidic but not superacidic at least on its surface.

The highest reported first cycle charge and discharge of $SnO_2$ capacity was 2358 mAh/g and 1303 mAh/g, respectively.[1] The $SnO_2$ nanoparticles were arranged in mesospheres, a secondary structure in which the particles are arranged as a sphere within a hollow sphere. Other papers reported $SnO_2$ nanoparticles of sizes less than 10 nm. For nanoparticles of sizes from 6-10 nm, J. Chen reported a capacity of 631 mAh/g after 100 charge/discharge cycles.[2] Kim reports a capacity of 740 mAh/g with 3 nm $SnO_2$ nanoparticles.[3] There were several other morphologies reported in the literature to have high capacity, such as nanoflowers[4] and nanorods[5-6]. The highest capacity reported of these morphologies were nanorods doped with antimony.[5] The Sb-doped nanorods had a first cycle charge/discharge capacity of 1213 mAh/g and 1128 mAh/g, respectively.

A reported lithiation capacity in Silicon-based materials for Porous c-Si is at 2800 mAh/g, which retained 99% capacity for over 100 cycles[7]. Si/G NPs first cycle was 3200 mAh/g and maintained 83% of its theoretical capacity for over 150 cycles[9].

A reported first cycle charge of Iron based materials was porous iron oxide ribbons with a capacity of 1426 mAh/g. They maintained 1000 mAh/g after 130 cycles[8].

REFERENCES

1. Deng, D.; Lee, J. Y., Hollow Core-Shell Mesospheres of Crystalline SnO2 Nanoparticle Aggregates for High Capacity Li+ Ion Storage. *Chemistry of Materials* 2008, 20 (5), 1841-1846.
2. Chen, Y.-C.; Chen, J.-M.; Huang, Y.-H.; Lee, Y.-R.; Shih, H. C., Size effect of tin oxide nanoparticles on high capacity lithium battery anode materials. *Surface and Coatings Technology* 2007, 202 (4-7), 1313-1318.
3. Kim, C.; Noh, M.; Choi, M.; Cho, J.; Park, B., Critical Size of a Nano SnO2 Electrode for Li-Secondary Battery. *Chemistry of Materials* 2005, 17 (12), 3297-3301.
4. Ning, J.; Dai, Q.; Jiang, T.; Men, K.; Liu, D.; Xiao, N.; Li, C.; Li, D.; Liu, B.; Zou, B.; Zou, G.; Yu, W. W., Facile Synthesis of Tin Oxide Nanoflowers: A Potential High-Capacity Lithium-Ion-Storage Material. *Langmuir* 2009, 25 (3), 1818-1821.
5. Wu, F. D.; Wu, M.; Wang, Y., Antimony-doped tin oxide nanotubes for high capacity lithium storage. *Electrochemistry Communications* 2011, 13 (5), 433-436.
6. Wang, Y.; Lee, J. Y., Molten Salt Synthesis of Tin Oxide Nanorods: Morphological and Electrochemical Features. *The Journal of Physical Chemistry B* 2004, 108 (46), 17832-17837.
7. Huajun Tiana., Fengxia Xina, Xiaoliang Wanga, 1, Wei Hea, Weiqiang Han., High capacity group-IV elements (Si, Ge, Sn) based anodes for lithium-ion batteries 2015, 1 (3) 153-169. http://www.sciencedirect.com/science/article/pii/S2352847815000477
8. Shubin Yang, Yi Sun, Long Chen, Yenny Hernandez, Xinliang Feng & Klaus Mullen., Porous Iron Oxide Ribbons Grown on Graphene for High-Performance Lithium Storage https://www.nature.com/articles/srep00427.
9. Graphene Science Handbook: Electrical and Optical Properties.

SUMMARY

This application describes materials corresponding to acidified metal oxides ("AMO") and applications for using the AMOs, including in batteries, such as in battery electrode materials, as catalysts, as photovoltaic or photoactive components, and sensors. Techniques for preparing AMOs and devices comprising AMOs are further disclosed. The disclosed AMOs are optionally used in combination with acidic species to enhance their utility.

This application further describes high capacity electrochemical cells including electrodes comprising a metal oxide. Techniques for preparing metal oxides and electrochemical cells comprising metal oxides are further disclosed. Optionally, the disclosed metal oxides are used in conjunction with conductive materials to form electrodes. The formed electrodes are useful with metallic lithium and conventional lithium ion electrodes as the corresponding counter electrodes. The disclosed metal oxides are optionally used in combination with acidic species to enhance their utility.

In some embodiments, the present disclosure provides for layered electrode constructions of low active material (i.e., metal oxide) loading. In some cases less than 80%, by weight of active material is utilized in the electrode. This contrasts with conventional electrochemical cell technology in which the loading of active material is attempted to be maximized, and may be greater than or about 80%, by weight, e.g., 90% or 95% or 99%. While high active material loading may be useful for increasing capacity in conventional electrochemical cell technology, the inventors of the present application have found that reducing the active material loading actually permits higher cell capacities with various embodiments according to the present disclosure. Such capacity increase may be achieved, at least in part, by allowing for larger uptake of shuttle ions (i.e., lithium ions) since additional physical volume may be available when the active material loading levels are smaller. Such capacity increase may alternatively or additionally, at least in part, be achieved by allowing for more active sites for uptake of shuttle ions and less blocking of active sites by additional material mass.

The AMOs described include those in the form of a nanomaterial, such as a nanoparticulate form, which may be monodispersed or substantially monodispersed and have particle sizes less than 100 nm, for example. The disclosed AMOs exhibit low pH, such as less than 7 (e.g., between 0 and 7), when suspended in water or resuspended in water after drying, such as at a particular concentration (e.g., 5 wt. %), and further exhibit a Hammett function, $H_0$, that is greater than −12 (i.e., not superacidic), at least on the surface of the AMO.

The surface of the AMOs may optionally be functionalized, such as by acidic species or other electron withdrawing species. Synthesis and surface functionalization may be accomplished in a "single-pot" hydrothermal method in which the surface of the metal oxide is functionalized as the metal oxide is being synthesized from appropriate precursors. In some embodiments, this single-pot method does not require any additional step or steps for acidification beyond those required to synthesize the metal oxide itself, and results in an AMO material having the desired surface acidity (but not superacidic).

Optionally, surface functionalization occurs using strong electron-withdrawing groups ("EWGs")—such as $SO_4$, $PO_4$, or halogens (Br, Cl, etc.)—either alone or in some combination with one another. Surface functionalization may also occur using EWGs that are weaker than $SO_4$, $PO_4$, or halogens. For example, the synthesized metal oxides may be surface-functionalized with acetate ($CH_3COO$), oxalate ($C_2O_4$), and citrate ($C_6H_5O_7$) groups.

Despite the conventional knowledge that acidic species are undesirable in batteries because they can attack metal current collectors and housings and cause deterioration in other electrode components, and that active, catalytic electrode surfaces can lead to electrolyte decomposition, gas generation within the cell, and ultimately in cell failure, the inventors have discovered that acidic species and components can be advantageous in batteries employing AMO materials in battery electrodes.

For example, the combination or use of the AMO with acidic species can enhance the performance of the resultant materials, systems or devices, yielding improved capacity, cyclability, and longevity of devices. As an example, batteries employing AMO materials in combination with acidic electrolytes or electrolytes containing acidic species as described herein exhibit considerable gains in capacity, such as up to 100 mAh/g or more greater than similar batteries employing non-acidified electrolytes or electrolytes lacking acidic species. In some embodiments, improvements in capacity between 50 and 300 mAh/g may be achieved. In addition, absolute capacities of up to 1000 mAh/g or more are achievable using batteries having acidified electrolytes or electrolytes including acidic species. Moreover, cycle life of a battery may be improved through the use of acidic electrolytes or electrolytes containing acidic species, such as where a battery's cycle life is extended by up to 100 or more charge-discharge cycles.

An example battery cell comprises a first electrode, such as a first electrode that comprises a metal oxide (optionally an AMO nanomaterial), a conductive material, and a binder; a second electrode, such as a second electrode that includes metallic lithium; and an electrolyte positioned between the first electrode and the second electrode. Optionally, the metal oxide comprises less than 80 weight percent of the first electrode. Example electrolytes include those comprising a metal salt dissolved in a solvent, solid electrolytes, and gel electrolytes. Optionally, a separator is positioned between the first electrode and the second electrode.

In addition or alternatively, batteries including an electrode, such as a cathode or anode, that is itself acidic or that includes acidic species, such as an organic acid, may also be beneficial and, again, contrary to the conventional teaching in battery technology. For example, batteries incorporating acidic electrodes or acidic species within the electrode may enhance the performance and yield improved capacity, cyclability, and longevity, particularly when used in electrodes including AMO materials. Capacity gains of up to 100 mAh/g or greater are achievable. Cycle life of a battery may also be improved through the use of acidic electrodes or electrodes containing acidic species, such as where a battery's cycle life is extended by up to 100 or more cycles. As an example, an acidic electrode or an electrode that includes acidic species may exhibit a pH less than 7 (but not be superacidic), such as when components of the electrode are suspended in water (or resuspended in water after drying) at 5 wt. %.

Electrodes corresponding to the present disclosure may comprises a layered structure including a first set of layers comprising a conductive material and a second set of layers comprising the metal oxide, such as an acidified metal oxide (AMO) nanomaterial. Optionally, the first set of layers and the second set of layers may be provided in an alternating configuration.

Optionally, the first set of layers and the second set of layers independently comprises between 1 and 20 layers. Optionally, the first set of layers and the second set of layers independently have thicknesses of between 1 µm and 50 µm, between 2 µm and 25 µm, between 3 µm and 20 µm, between 4 µm and 15 µm, or between 5 µm and 10 µm. Optionally, the metal oxide comprises between 5 and 90 weight percent of the second set of layers, such as 5, 10, 15, 20, 25, 30, 35, 40, 45, 50, 55, 60, 65, 70, 75, 80, 85, or 90 weight percent. Optionally, the conductive material and the binder each independently comprise between 5 and 90 weight percent of the first set of layers such as 5, 10, 15, 20, 25, 30, 35, 40, 45, 50, 55, 60, 65, 70, 75, 80, 85, or 90 weight percent.

A first electrode optionally comprises the metal oxide at up to 95 weight percent of the first electrode, up to 80 weight percent of the first electrode, up to 70 weight percent of the first electrode, between 1 and 50 weight percent of the first electrode, between 1 and 33 weight percent of the first electrode, between 15 and 25 weight percent of the first electrode, between 55 and 70 weight percent of the first electrode, between 20 and 35 weight percent of the first electrode, between 5 and 15 weight percent of the first electrode. Specific examples of metal oxide weight percents for the first electrode include 1%, 5%, 11%, 12%, 13%, 14%, 21%, 22%, 23%, 24%, 25%, 26%, 27%, 28%, 29%, 30%, 31%, 32%, 33%, 60%, 61%, 62%, 63%, 64%, 65%, etc. Optionally, the conductive material and the binder each independently comprise the majority of the remainder of the first electrode. For example, the conductive material and the binder each independently comprise between 10 and 74 weight percent of the first electrode. Optionally, the conductive material and the binder each together comprise between 20 and 90 weight percent of the first electrode. Optionally, the AMO nanomaterial is added as a dopant of 1-10% by weight to a conventional lithium ion electrode, such as graphite, lithium cobalt oxide, etc.

Various materials are useful for the electrodes described herein. Example metal oxides include, but are not limited to, a lithium containing oxide, an aluminum oxide, a titanium oxide, a manganese oxide, an iron oxide, a zirconium oxide, an indium oxide, a tin oxide, an antimony oxide, a bismuth oxide, or any combination of these. Optionally, the oxides are in the form of an AMO. As described herein, the metal oxide optionally comprises and/or is surface functionalized by one or more electron withdrawing groups selected from Cl, Br, $BO_3$, $SO_4$, $PO_4$, $NO_3$, $CH_3COO$, $C_2O_4$, $C_2H_2O_4$, $C_6H_8O_7$, or $C_6H_5O_7$. Example conductive material comprises one or more of graphite, conductive carbon, carbon black, Ketjenblack, or conductive polymers, such as poly (3,4-ethylenedioxythiophene) (PEDOT), polystyrene sulfonate (PSS), PEDOT:PSS composite, polyaniline (PANI), or polypyrrole (PPY).

In some embodiments, electrodes comprising AMO nanomaterials are used in conjunction with other electrodes to form a cell. For example, a second electrode of such a cell may comprise graphite, metallic lithium, sodium metal, lithium cobalt oxide, lithium titanate, lithium manganese oxide, lithium nickel manganese cobalt oxide (NMC), lithium iron phosphate, lithium nickel cobalt aluminum oxide (NCA), an AMO nanomaterial, or any combination of these. In a specific embodiment, the first electrode comprises an AMO of $SnO_2$, and the second electrode comprises metallic lithium.

Various materials are useful for the electrodes described herein. Example metal oxides include, but are not limited to, a lithium containing oxide, an aluminum oxide, a titanium oxide, a manganese oxide, an iron oxide, a zirconium oxide, an indium oxide, a tin oxide, an antimony oxide, a bismuth oxide, or any combination of these. Optionally, the oxides are in the form of an AMO. As described herein, the metal oxide optionally comprises and/or is surface functionalized by one or more electron withdrawing groups selected from Cl, Br, $BO_3$, $SO_4$, $PO_4$, $NO_3$, $CH_3COO$, $C_2O_4$, $C_2H_2O_4$, $C_6H_8O_7$, or $C_6H_5O_7$. Example, conductive material comprises one or more of graphite, conductive carbon, carbon black, Ketjenblack, or conductive polymers, such as poly (3,4-ethylenedioxythiophene) (PEDOT), polystyrene sulfonate (PSS), PEDOT:PSS composite, polyaniline (PANI), or polypyrrole (PPY).

In various embodiments, high capacity battery cells comprise a first electrode including an acidified metal oxide (AMO) nanomaterial, a conductive material, and a binder; a second electrode; and an electrolyte positioned between the first electrode and the second electrode, where the AMO nanomaterial comprises 5-15, 20-35, or 55-70 weight percent of the first electrode, where the AMO nanomaterial comprises 0-15% by weight of iron oxide and 85-100% by weight of tin oxide, where the AMO nanomaterial comprises and/or is surface functionalized by one or more electron withdrawing groups, where the conductive material comprises one or more of graphite, conductive carbon, carbon black, Ketjenblack, and conductive polymers, such as poly (3,4-ethylenedioxythiophene) (PEDOT), polystyrene sulfonate (PSS), PEDOT:PSS composite, polyaniline (PANI), or polypyrrole (PPY), where the second electrode comprises or includes metallic lithium. Such a high capacity battery cell may exhibit a life cycle of 100 to 1000 charge-discharge cycles without failure, and an open circuit voltage upon assembly of between 2 V and 4 V. Optionally, the first electrode comprises a layered structure including a first set of layers the conductive material and a second set of layers comprising the AMO nanomaterial, such as where the first set of layers and the second set of layers are provided in an alternating configuration, where the first set of layers comprises between 1 and 20 layers and where the second set of layers comprises between 1 and 20 layers, where the first set of layers and the second set of layers independently have thicknesses of between 1 µm and 50 µm, where the AMO nanomaterial comprises between 5 and 70 weight percent of the second set of layers.

As a further example, batteries in which the electrode is formed using a slurry may also be beneficial and contrary to the conventional teaching in battery technology. As described herein, the AMO material may optionally formed into battery electrode by first forming a slurry of the AMO material with one or more binder compounds, solvents, additives (e.g., conductive additives or acidic additives), and/or other wet processing materials. The slurry may be deposited on a conductive material or current collector in order to form an electrode. Such a slurry and/or a solvent may optionally be acidic or include acidic species and, again, allow for improvements in capacity, cyclability, and longevity of the resultant battery. Optionally, all or a portion of the solvent may be evaporated, leaving the AMO material, binder, additives, etc. The resultant material may optionally exhibit its own acidity, such having a pH less than 7 (but not superacidic), when suspended in water (or resuspended in water after drying) at 5 wt. %, for example.

Various techniques may be used for making the metal oxide. Optionally, making a metal oxide comprises forming a solution comprising a metal salt, ethanol, and water; acidifying the solution by adding an acid to the solution; basifying the solution by adding an aqueous base to the solution; collecting precipitate from the solution; washing the precipitate; and drying the precipitate.

Optionally, making an electrode further comprises depositing a further conductive layer over the electrode layer, such as a conductive layer that comprises a second conductive material. Optionally, depositing the conductive layer include forming a conductive slurry using the second conductive material, a second binder, and a second solvent; depositing a conductive slurry layer on the electrode layer; and evaporating at least a portion of the second solvent to form the conductive layer. Optionally, making an electrode comprises forming 1-20 additional conductive layers comprising the conductive material and 1-20 additional electrode layers comprising the metal oxide. For example, an electrode may comprise a layered structure including a first set of layers comprising a second conductive material and a second set of layers comprising the metal oxide, such as where the first set of layers and the second set of layers are provided in an alternating configuration. Example layers include those independently having thicknesses of between 1 μm and 50 μm. Example layers include those comprising between 10 and 90 weight percent of the metal oxide. Example layers include those independently comprising between 5 and 85 weight percent of the conductive material and/or binder.

Electrodes formed using the methods of this aspect may have a metal oxide content of up to 80 weight percent. Electrodes formed using the methods of this aspect may have a conductive material and/or binder content of between 10 and 70 weight percent of the electrode.

As described above, acidic species may optionally be included as an additive to any of the components of a battery, such as an electrode or an electrolyte. Optionally, a battery comprising an AMO may include an electrolyte positioned between the electrodes in which acidic species are dissolved in a solvent. Such an electrolyte may also be referred to herein as an acidified electrolyte. The electrolyte may optionally include one or more lithium salts dissolved in the solvent, such as $LiPF_6$, $LiAsF_6$, $LiClO_4$, $LiBF_4$, $LiCF_3SO_3$, and combinations of these. It will be appreciated that the electrolyte may be positioned not only in the space separating the electrodes (i.e., between the electrodes), but may also penetrate through or into pores of the electrodes and/or through or into pores of any materials or structures optionally positioned between the electrodes, such as a separator.

Example acidic species useful with the AMOs, electrodes, and electrolytes described herein include but are not limited to organic acids, such as carboxylic acids. Example acidic species include those exhibiting a pKa in water of between −10 and 7, between −5 and 6, between 1 and 6, between 1.2 and 5.6, or about 4. Specific example organic acids include, for example, oxalic acid, carbonic acid, citric acid, maleic acid, methylmalonic acid, formic acid, glutaric acid, succinic acid, methylsuccinic acid, methylenesuccinic acid, citraconic acid, acetic acid, benzoic acid.

Example organic acids include dicarboxylic acids, such as those having a formula of

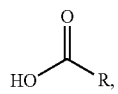

where R is a substituted or unsubstituted C1-C20 hydrocarbon, such as a substituted or unsubstituted alkyl group, a substituted or unsubstituted alkenyl group, a substituted or unsubstituted aromatic or heteroaromatic, a substituted or unsubstituted amine, etc. Example organic acids also include those having a formula of

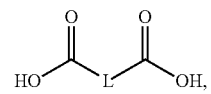

where L is a substituted or unsubstituted C1-C20 divalent hydrocarbon, such as a substituted or unsubstituted alkylene group, a substituted or unsubstituted arylene group, a substituted or unsubstituted heteroarylene group, a substituted or unsubstituted amine, etc. Organic acids may include organic acid anhydrides, such as having a formula of

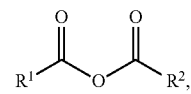

where $R^1$ and $R^2$ are independently a substituted or unsubstituted C1-C20 hydrocarbon, such as a substituted or unsubstituted alkyl group, a substituted or unsubstituted alkenyl group, a substituted or unsubstituted aromatic or heteroaromatic group, a substituted or unsubstituted amine, etc. Optionally, $R^1$ and $R^2$ can form a ring. Example organic acid anhydrides include any anhydrides of the above-mentioned organic acids. Specific organic acid anhydrides include, but are not limited to glutaric anhydride, succinic anhydride, methylsuccinic anhydride, maleic anhydride, and itaconic anhydride.

Useful concentrations of the acidic species in either or both the electrolyte and the AMO electrode include from 0 wt. % to 10 wt. %, 0.01 wt. % to 10 wt. %, from 0.1 wt. % to 10 wt. %, from 1 wt. % to 5 wt. %, or from 3 wt. % to 5 wt. %.

Useful solvents include those employed in lithium ion battery systems, for example, such as ethylene carbonate, butylene carbonate, propylene carbonate, vinylene carbonate, dimethyl carbonate, diethyl carbonate, dipropyl carbonate, ethylmethyl carbonate, methylpropyl carbonate, ethylpropyl carbonate, fluoroethylene carbonate and mixtures thereof. Other useful solvents will be appreciated to those skilled in the art. Optionally, when an acidic species and metal salt are dissolved in a solvent to form an electrolyte, the electrolyte itself exhibits an acidic condition (i.e., pH less than 7).

Example binders useful with the batteries and electrodes described herein include Styrene Butadiene Copolymer (SBR), Polyvinylidene Fluoride (PVDF), Carboxy methyl cellulose (CMC), Styrene Butadiene Rubber (SBR), acrylonitrile, polyacrylic acid (PAA), polyvinyl alcohol (PVA), polyamide imide (PAI), and any combination of these. Optionally, conductive polymers may be useful as a binder.

Other example additives useful with the AMOs and electrodes described herein include, but are not limited to conductive additives. Example conductive additives include graphite, conductive carbon, carbon black, Ketjenblack, and conductive polymers, such as poly (3,4-ethylenedioxythiophene (PEDOT), polystyrene sulfonate (PSS), PEDOT:PSS composite, polyaniline (PAM), and polypyrrole (PPY). Conductive additives may be present, for example, in an electrode, at any suitable concentration such as at weight percent greater than 0 and as high as 35 wt. %, 40 wt. % or more. Optionally, conductive additives are present in an electrode at a range of 1 wt. % to 95 wt. %, 1 wt. % to 35 wt. %, 1 wt. % to 25 wt. %, 5 wt. % to 40 wt. %, 10 wt. % to 40 wt. %, 15 wt. % to 40 wt. %, 20 wt. % to 40 wt. %, 25 wt. % to 40 wt. %, 30 wt. % to 40 wt. %, 35 wt. % to 40 wt. %, 40 wt. % to 45 wt. %, 40 wt. % to 50 wt. %, 40 wt. % to 55 wt. %, 40 wt. % to 60 wt. %, 40 wt. % to 65 wt. %, 40 wt. % to 70 wt. %, 40 wt. % to 75 wt. %, 40 wt. % to 80 wt. %, 40 wt. % to 85 wt. %, 40 wt. % to 90 wt. %, or 40 wt. % to 95 wt. %.

Methods of making batteries are also described herein. An example method of making a battery comprises making an AMO nanomaterial; forming a first electrode of or comprising the AMO nanomaterial; forming an electrolyte by dissolving one or more metal salts in a solvent; and positioning the electrolyte between the first electrode and a second electrode. Another example method of making a battery comprises making an AMO nanomaterial; forming a first electrode of or comprising the AMO nanomaterial and one or more metal salts; and positioning the electrolyte between the first electrode and a second electrode.

Electrolytes for use in batteries are also disclosed herein. For example, the disclosed electrolytes are useful in batteries comprising a first electrode and a second electrode, such as a first electrode that comprises an acidified metal oxide (AMO) nanomaterial. Example electrolytes comprise a solvent and one or more metal salts dissolved in the solvent. Optionally, an acidic species is dissolved in the solvent, such as an acidic species that is different from the one or more metal salts.

As described above, a variety of acidic species are useful in the disclosed electrolytes, such as an acidic species comprising an organic acid and/or an organic acid anhydride. Example organic acids include, but are not limited to, oxalic acid, acetic acid, citric acid, maleic acid, methylmalonic acid, glutaric acid, succinic acid, methylsuccinic acid, methylenesuccinic acid, citraconic acid, or any combination of these. Example organic acid anhydrides include, but are not limited to glutaric anhydride, succinic anhydride, methylsuccinic anhydride, maleic anhydride, itaconic anhydride, or any combination of these. Other acidic species examples are described above. Useful acidic species include, but are not limited to, those exhibiting a pKa of between −10 and 7, between −5 and 6, between 1 and 6, between 1.2 and 5.6, or about 4. The acidic species may optionally be present in the electrolyte at any suitable concentration, such as from 0.01 wt. % to 10 wt. %, from 0.1 wt. % to 10 wt. %, from 1 wt. % to 5 wt. %, or from 3 wt. % to 5 wt. %.

It will be appreciated that lithium metal salts, such as $LiPF_6$, $LiAsF_6$, $LiClO_4$, $LiBF_4$, $LiCF_3SO_3$, may be useful components of the disclosed acidified electrolytes. Example solvents include, but are not limited to, ethylene carbonate, butylene carbonate, propylene carbonate, vinylene carbonate, dimethyl carbonate, diethyl carbonate, dipropyl carbonate, ethylmethyl carbonate, methylpropyl carbonate, ethylpropyl carbonate, fluoroethylene carbonate and mixtures thereof. Example solvents may be useful in metal ion batteries, such as lithium ion batteries.

Embodiments of an ultra-high capacity battery cell have a lithiation capacity of at least 4000 mAhr/g and comprise an electrode that includes a layer containing a nanoparticle-sized metal oxide in a range of 20% to 40% by wt. and a nanoparticle-sized conductive carbon in a range of 20% to 40% by weight. In some embodiments, each are 33% by weight. The electrode may be arranged as an anode or a cathode. The electrode may have a sprayed assembly or construction methodology.

The battery cell may include least one other layer also containing a nanoparticle-sized conductive carbon and arranged adjacent to the layer containing the nanoparticle sized metal oxide. In some embodiments, this other layer is both above and below the layer containing the nanoparticle-sized metal oxide.

BRIEF DESCRIPTION OF THE DRAWINGS

FIG. 6 provides X-ray photoelectron spectroscopy (XPS) data showing surface functionalization arising endogenously from the synthesis method disclosed herein. Numbers shown are atomic concentrations in percent. The far right column lists the corresponding pH of the synthesized nanoparticles as measured when dispersed at 5 wt % in aqueous solution.

FIG. 10 provides X-ray photoelectron spectroscopy analysis of the surface of AMO nanoparticles synthesized using both a strong (phosphorous containing) and weak (acetate) electron withdrawing group shows greater atomic concentration of phosphorous than of the bonds associated with acetate groups.

FIG. 58 is a comparison of secondary cycling for standard and ultra-high capacity configurations according to the present disclosure.

FIG. 59 is a graph of spray-construction electrode construction performance for $SnO_2$ as an AMO according to aspects of the present disclosure.

DEFINITIONS

Figure 1:
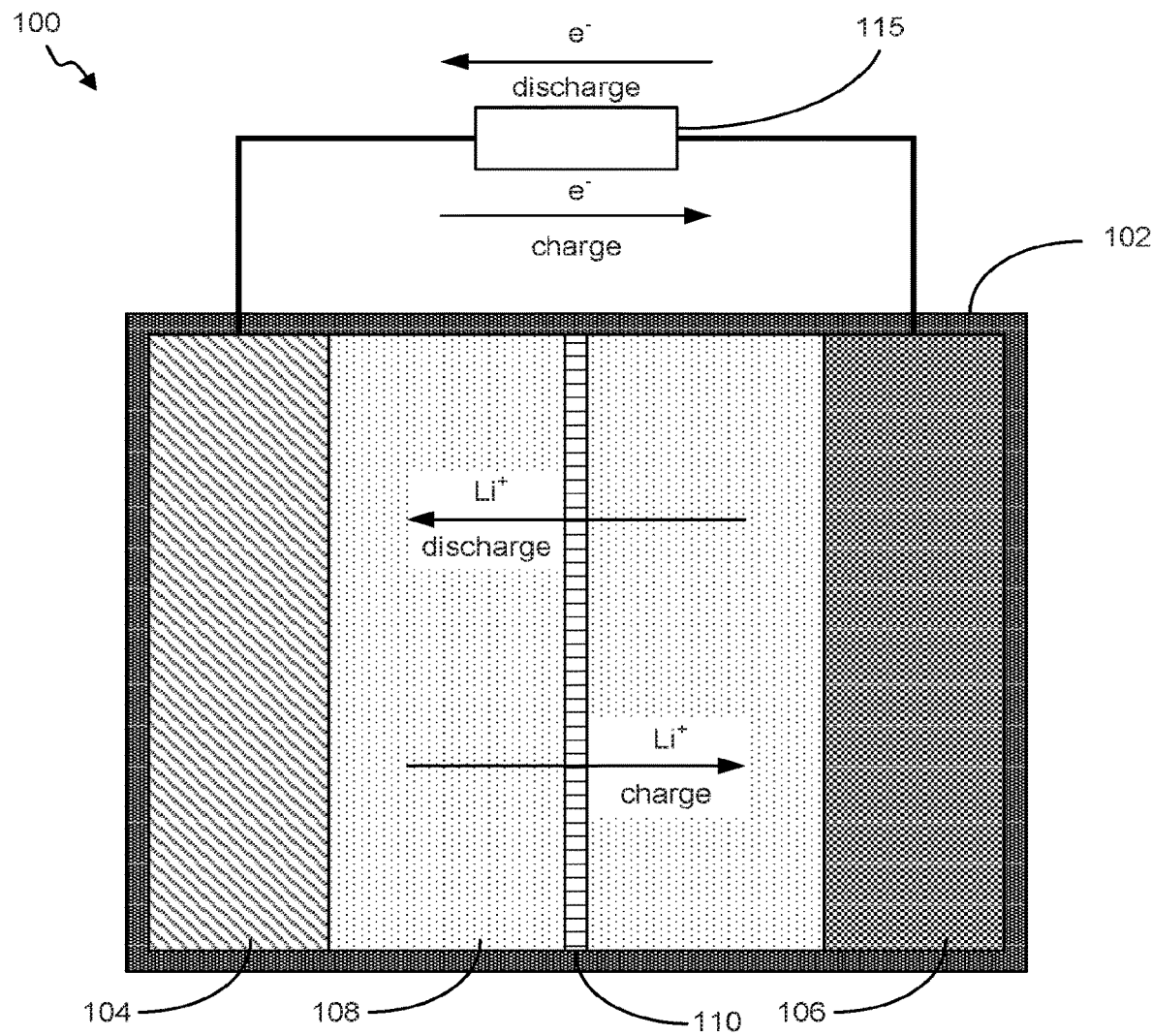
FIG. 1 is a simplified cutaway view of an example lithium ion battery cell.

For the purposes of this disclosure, the following terms have the following meanings:

Acidic oxide—a term used generally in the scientific literature to refer to binary compounds of oxygen with a nonmetallic element. An example is carbon dioxide, $CO_2$. The oxides of some metalloids (e.g., Si, Te, Po) also have weakly acidic properties in their pure molecular state.

Acidified metal oxide ("AMO"), AMO nanomaterial, or AMO material—terms used herein to denote binary compounds of oxygen with a metallic element which has been synthesized or modified to have an acidity greater than that of its natural mineralogical state and also a Hammet function, $H_0$, greater than −12 (i.e., not superacidic). It will be appreciated that AMOs may have a surface pH less than 7, such as when suspended in water (or resuspended in water after drying) at 5 wt. %. Optionally, AMOs may exhibit a surface pH less than 6, less than 5, less than 4 or less than 3. The average particle size of the AMOs disclosed herein is also less than that of the natural mineralogical state. For example AMOs may comprise nanomaterials, such as particles having at least one dimension less than 100 nm, less than 20 nm, less than 10 nm, or falling between 1 and 100 nm. Naturally occurring mineralogical forms do not fall within the scope of the inventive AMO material. A synthesized metal oxide, however, that is more acidic than its most abundant naturally occurring mineralogical form (of equivalent stoichiometry) but not superacidic falls within the bounds of this disclosure and can be said to be an AMO material provided it satisfies certain other conditions discussed in this disclosure.

Acidic—a term used generally in the scientific literature to refer to compounds having a pH of less than 7 in aqueous solution.

Electron-withdrawing group ("EWG")—an atom or molecular group that draws electron density towards itself. The strength of the EWG is based upon its known behavior in chemical reactions. Halogens, for example are known to be strong EWGs. Organic acid groups such as acetate are known to be weakly electron withdrawing.

Hammet function—An additional means of quantifying acidity in highly concentrated acid solutions and in superacids, the acidity being defined by the following equation: $H_0 = pK_{BH+} + \log([B]/[BH^+])$. On this scale, pure 18.4 molar $H_2SO_4$ has a $H_0$ value of −12. The value $H_0 = -12$ for pure sulfuric acid must not be interpreted as pH=−12, instead it means that the acid species present has a protonating ability equivalent to $H_3O^+$ at a fictitious (ideal) concentration of $10^{12}$ mol/L, as measured by its ability to protonate weak bases. The Hammett acidity function avoids water in its equation. It is used herein to provide a quantitative means of distinguishing the AMO material from superacids. The Hammet function can be correlated with colorimetric indicator tests and temperature programmed desorption results.

Metal oxide—a term used generally in the scientific literature to refer to binary compounds of oxygen with a metallic element. Depending on their position in the periodic table, metal oxides range from weakly basic to amphoteric (showing both acidic and basic properties) in their pure molecular state. Weakly basic metal oxides are the oxides of lithium, sodium, magnesium, potassium, calcium, rubidium, strontium, indium, cesium, barium, and tellurium. Amphoteric oxides are those of beryllium, aluminum, gallium, germanium, astatine, tin, antimony, lead, and bismuth. These and other metal oxides may optionally be useful as AMO materials.

Metallic lithium—a term that refers to lithium in its neutral atomic state (i.e., non-ionic state). The term metallic lithium is intended to distinguish over other forms of lithium including lithium ions and lithium compounds. The term metallic lithium may refer to neutral atomic lithium present in mixtures that comprise lithium atoms, such as mixtures of lithium and other elements, compounds, or substances. The term metallic lithium may refer to neutral atomic lithium present in lithium alloys, such as a metallic mixture including lithium and one or more other metals. The term metallic lithium may refer to neutral atomic lithium present in composite structures including lithium and one or more other materials. Electrodes comprising or including metallic lithium may include other materials besides lithium, but it will be appreciated that metallic lithium may correspond to an active material of such an electrode. In some cases, an anode in an electrochemical cell comprises metallic lithium.

Monodisperse—characterized by particles of uniform size which are substantially separated from one another, not agglomerated as grains of a larger particle. Monodisperse particles may have a uniform size distribution, such as where at least 90% of the distribution of particle sizes lies within 5% of the median particle size.

pH—a functional numeric scale used generally in the scientific literature to specify the acidity or alkalinity of an aqueous solution. It is the negative of the logarithm of the concentration of the hydronium ion $[H_3O^+]$. As used herein, pH may be used to describe the relative acidity of nanoparticles suspended in aqueous solution.

Surface functionalization—attachment of small atoms or molecular groups to the surface of a material. In embodiments, AMO material may be surface functionalized by covalently bonding EWGs to the surface of the AMO material.

Superacid—substances that are more acidic than 100% $H_2SO_4$, having a Hammet function, $H_0$, less than −12.

DETAILED DESCRIPTION

Described herein are high capacity electrochemical cells and cell components, such as electrodes, for such cells. The disclosed electrochemical cells and electrodes comprise acidified metal oxide ("AMO") nanomaterials, and exhibit high capacity. In embodiments, the AMO nanomaterials are provided at a relatively low loading (weight percent) in the electrodes, such as at weight percents less than 30%, with the majority of the remainder of the electrodes comprising conductive materials and binders. Even with such low loadings, capacities of greater than 10,000 mAh/g AMO nanomaterial have been observed. The electrodes may be provided in layered or non-layered configurations. Example layered configurations include separate layers including AMO nanomaterial and low loading or non-AMO containing layers. The layering of electrodes is entirely optional, however, and high capacities are observed in both layered and non-layered electrodes.

Referring now to FIG. 1, a lithium battery cell 100 is illustrated in a simplified cutaway view. The cell 100 may comprise a casing or container 102. In some embodiments, the casing 102 is a polymer or an alloy. The case 102 chemically and electrically isolates the contents of the cell 100 from adjacent cells, from contamination, and from damaging or being damaged by other components of the device into which the cell 100 is installed. A full battery may contain a plurality of cells arranged in a series and/or parallel configuration, but optionally may include only a single cell. The battery may have a further casing or securement mechanism binding the plurality of cells together, as is known in the art.

The cell 100 provides a cathode 104 and an anode 106. The contents of the cell 100 undergo a chemical reaction when a conduction path is provided between the cathode 104 and anode 106 that is external to the cell 100, such as element 115. As a result of the chemical reaction, electrons are provided at the anode 106 and flow through element 115 (sometimes referred to as a load) to the cathode 104 via the circuit provided external to the cell. At a basic level, during discharge of the cell 100, the materials comprising the anode 106 are oxidized providing the electrons that flow through the circuit. The materials comprising the cathode 104, as recipient of the electrons given up by the anode 106, are reduced.

Within the cell 100, during discharge, metallic cations move through an electrolyte 108 from the anode 106 to the cathode 104. In the case of a lithium based battery, the metallic cation may be a lithium cation ($Li^+$). The electrolyte 108 may be a liquid electrolyte such as a lithium salt in an organic solvent (e.g., $LiClO_4$ in ethylene carbonate). Other lithium based electrolyte/solvent combinations may be used as are known in the art. In some cases, the electrolyte 108 may be a solid electrolyte such as a lithium salt in a polyethylene oxide. Optionally, the electrolyte may comprise a polymer electrolyte. Example electrolytes include those described in U.S. Patent Application Publication 2017/0069931, which is hereby incorporated by reference.

A separator 110 may be employed to prevent contact between the electrodes 104, 106. The separator 110 may be a porous layer of material that is permeable to the lithium ions and the electrolyte 108 but not otherwise electrically conductive so as to prevent internal shorting of the cell 100. As is known in the art, the separator 110 may comprise glass fibers or may comprise a polymer, possibly with a semicrystalline structure. Additional components, such as current collectors, may also be included in the cell 100, but are not shown in FIG. 1.

Together the anode 104, cathode 106, electrolyte 108, and separator 110 form the completed cell 100. Since the separator 110 is porous, the electrolyte 108 may flow into, or be contained by, the separator 110. Under normal operating conditions, the porosity of the separator 110 allows for ion ($Li^+$) flow between the electrodes 104, 106 via the electrolyte 108. As is known in the art, a separator can be constructed so as to melt and close the internal pore structure to shut down the cell in the event of exposure to excess heat or a runaway exothermic reaction.

Most lithium-based cells are so-called secondary batteries. They can be discharged and recharged many times before the chemical or structural integrity of the cell falls below acceptable limits. Cells and batteries according to the present disclosure are considered to be both primary (e.g., single use) and secondary batteries.

In the case of the cell 100 being a secondary cell (or part of a secondary battery) it should be understood that the cell 100 may be recharged either alone or as a component of a completed system wherein multiple cells are recharged simultaneously (and possibly in the same parallel or series circuit).

A reverse voltage is applied to the cell 100 in order to effect charging. It should be understood that various schemes for effective recharging of lithium batteries can be employed. Constant current, variable current, constant voltage, variable voltage, partial duty cycles, etc., may be employed. The present disclosure is not intended to be limited to a particular charging methodology unless stated in the claims. During charging of cell 100, element 115 represents a voltage source that is applied between cathode 104 and anode 106 to provide electrons from cathode 105 to anode 106 and allow chemical reactions to take place. Lithium ions are shuttled from cathode 104 to the anode 106 through electrolyte 108 and separator 110.

As examples, cathode 104 or anode 106 may independently comprise an AMO material disclosed herein. For use of an AMO material as a cathode, an anode may correspond to lithium metal or a lithium intercalation material, such as graphite. Optionally, electrolyte 108 may include an acidic species, such as dissolved in an organic solvent with a lithium salt. In addition to or alternative to use of an acidic species in electrolyte 108, an electrode (i.e., cathode 104 or anode 106) may optionally comprise an AMO and an acidic species. Oxalic acid is an exemplary acidic species.

Figure 2:
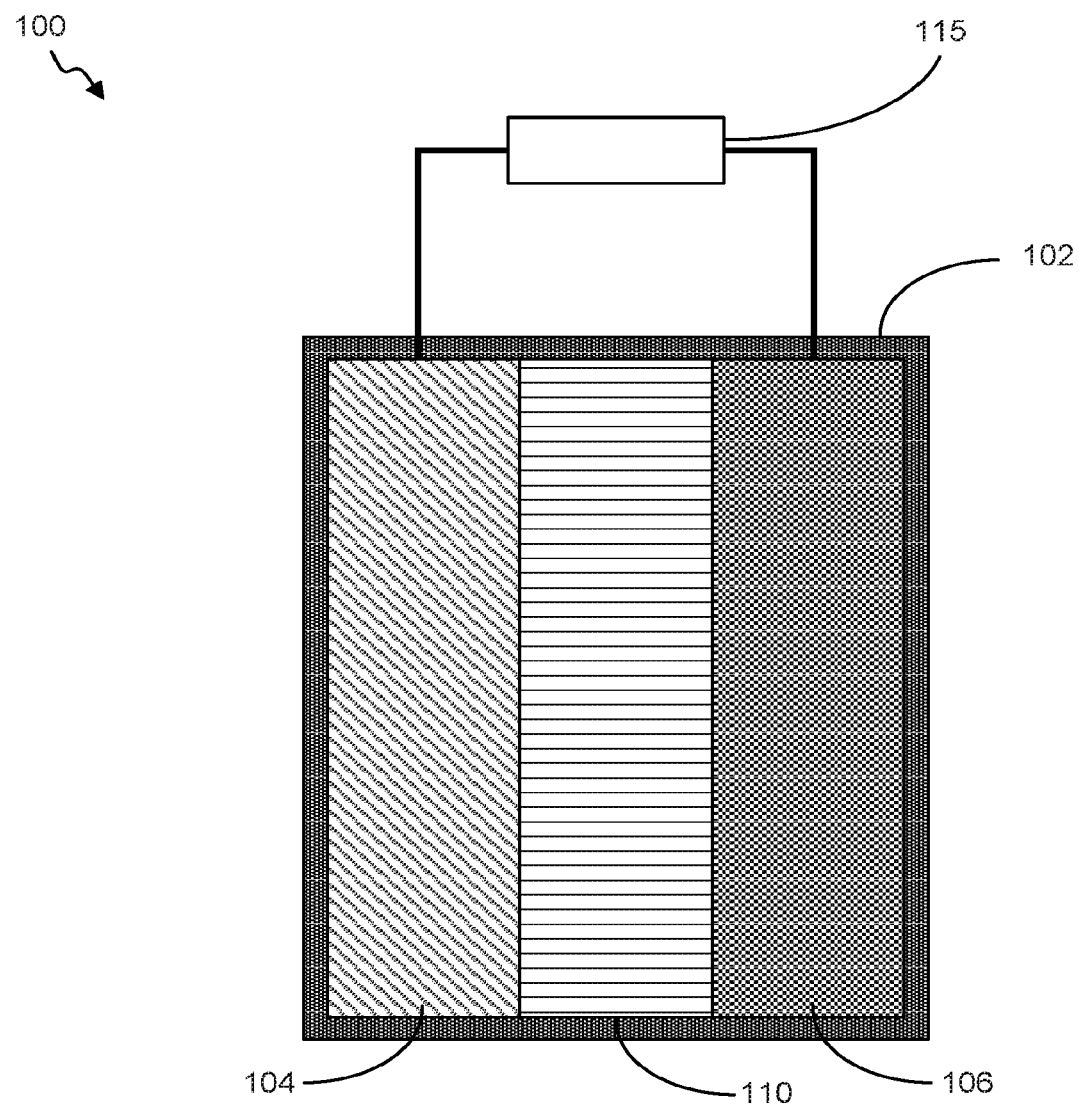
FIG. 2 is another simplified cutaway view of a lithium ion battery cell with the electrolyte substantially contained by the separator.

Without wishing to be bound by any theory, it is believed that the presence of acidic species in the cathode 104 or anode 106 and/or electrolyte 108 improves a surface affinity of the AMO material toward lithium ions, resulting in an improved ability to take up lithium ions during discharge and overall improvement to capacity as compared to a similar cell lacking acidic species or having a basified electrode or electrolyte (i.e., including basic species). Alternatively or additionally, the presence of acidic species may allow for additional active sites for lithium uptake in cathode 104. It should be understood that FIG. 1 is not to scale. A shown in FIG. 2, in most applications, the separator 110 occupies most or all of the space between the electrodes 104, 106 and is in contact with the electrodes 104, 106. In such case, the electrolyte 108 is contained within the separator 110 (but may also intrude into the pores or surface of the anode or cathode). FIG. 2 is also not necessarily to scale. The actual geometry of a cell can range from relatively thin and flat pouches, to canister type constructions, to button cells and others. Cell construction techniques such as winding, or bobbin or pin type assemblies may be used.

Current collectors known in the art and other components (not shown) may also be relied upon to form a cell 100 into a commercially viable package. Although overall shape or geometry may vary, a cell or battery will normally, at some location or cross section, contain the electrodes 104, 106 separated rather than touching, and have the electrolyte 108 and possibly separator 110 between them. Cells may also be constructed such that there are multiple layers of anodes and cathodes. Cells may be constructed such that two cathodes are on opposite sides of a single anode or vice versa.

A functional or operational battery intended for a specific purpose may comprise a plurality of cells arranged according to the needs of particular application. An example of such a battery is shown schematically in FIG. 3. Here the battery 300 comprises four lithium cells 100 arranged in series to increase voltage. Capacity can be increased at this voltage by providing additional stacks of four cells 100 in parallel with the stack shown. Different voltages can be achieved by altering the number of cells 100 arranged in series.

Figure 3:
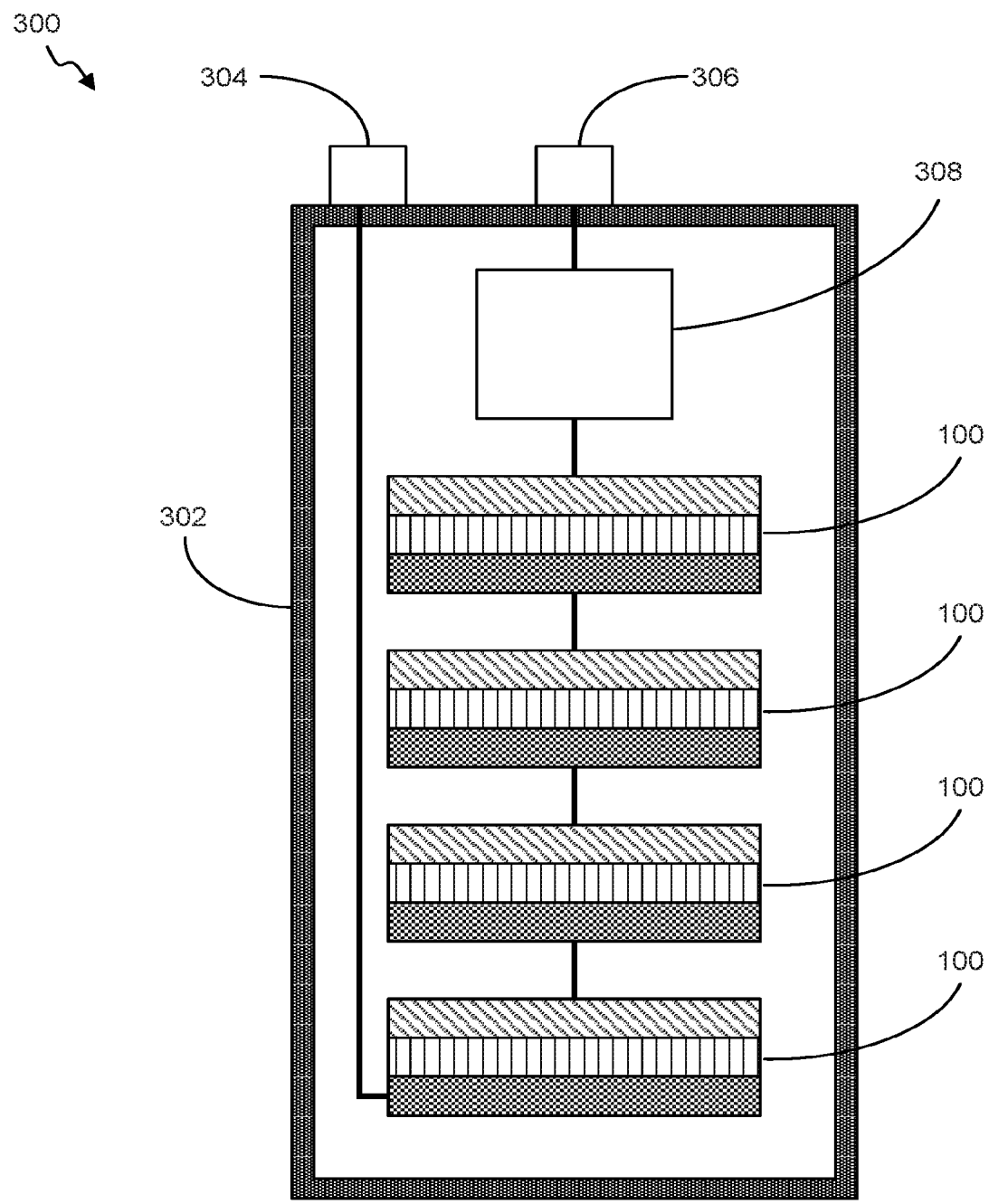
FIG. 3 is a schematic of a lithium ion battery comprising multiple cells.

A positive electrode 306 may be accessible on the outside of a casing 302 of the battery 300. A negative electrode 304 is also provided. The physical form factor of the electrodes 304, 306 may vary according to application. Various binders, glues, tapes and/or other securement mechanisms (not shown) may be employed within a battery casing 302 to stabilize the other components. Batteries based on lithium technology are generally operable, rechargeable, and storable in any orientation (if a secondary cell). As discussed above, cells 100 may take on various different geometric shapes. Thus, FIG. 3 is not meant to represent any particular physical form factor of the battery 300.

The battery 300 may also comprise various adjunct circuitry 308 interposing the positive electrode 306 and the lithium cells 100 within the casing 302 of the battery 300. In other embodiments, the adjust circuitry interposes the negative electrode 304 and the lithium cells 100 instead of, or in addition to, interposing the positive electrode 306 and the lithium cells 100. The adjunct circuitry 308 may include short circuit protection, overcharge protection, overheating shutdown and other circuitry as is known in the art to protect the battery 300, the cells 100, and/or any load attached to the battery 300.

The composition of materials chosen for the cathode 104, anode 106, and electrolyte are critical to the performance of the cell 100 and any battery of which it forms a part. In the context of the present disclosure, various examples of AMOs and methods for their production are provided in this regard. These AMOs are suitable for use in forming anodes or cathodes in half cells, cells, and batteries. The AMOs of the present disclosure are otherwise compatible with known lithium cell technology including existing anode and cathode compositions, electrolyte formulations, and separator compositions.

In the context of the present disclosure, various examples of AMOs and methods for their production and use are provided. These AMOs are suitable for use in forming cathodes or anodes in half cells, cells, and batteries. The disclosed AMOs are otherwise compatible with conventional lithium battery technology, including existing anode compositions, cathode compositions, electrolyte formulations, and separator compositions. It will be appreciated that the material of the anode 106 chosen for a cell or battery according to the present disclosure may be less electronegative than the material of the cathode to suitably complement the cathodic materials. In one particular embodiment, the disclosed AMOs are useful as a cathode in a cell having a lithium metal anode.

In various embodiments of the present disclosure, the cathode 104 comprises an AMO material having a surface that is acidic but not superacidic. This directly contrasts materials previously known and utilized as cathodes such as lithium cobalt or lithium manganese materials. The AMO materials of the present disclosure and methods for their production are described below. In other embodiments, the anode 106 comprises an AMO material of the present disclosure having a surface that is acidic but not super acidic.

The surfaces of metal oxides are ideally arrays of metal and oxygen centers, ordered according to the crystalline structure of the oxide. In reality, the arrays are imperfect, being prone to vacancies, distortion, and the effects of surface attachments. Regardless, any exposed metal centers are cationic (positively charged) and can accept electrons, thus functioning, by definition, as Lewis acid sites. Oxygen centers are anionic (negatively charged) and act as Lewis base sites to donate electrons. This allows metal oxide surfaces to behave in an amphoteric fashion.

Under normal atmospheric conditions, the presence of water vapor will adsorb to the metal oxide surface either molecularly (hydration) or dissociatively (hydroxylation). Both $OH^-$ and $H^+$ species can adsorb on the oxide surface. The negatively-charged hydroxyl species will attach at the metal, cationic (Lewis acid, electron accepting) centers, and the $H^+$ will attach at the oxygen, anionic (Lewis base, electron donating) centers. Both adsorptions lead to the presence of the same functional group—a hydroxyl—on the metal oxide surface.

These surface hydroxyl groups can serve as either Brønsted acids or as Brønsted bases, because the groups can either give up or accept a proton. The tendency of an individual hydroxyl group to be a proton donor or a proton acceptor is affected by the coordination of the metal cation or oxygen anion to which it is attached. Imperfections of the metal oxide surface such as oxygen vacancies, or coordination of the surface groups with other chemical species, mean that all cations and anions are not equally coordinated. Acid-base sites will vary in number and in strengths. When broadly "totaled" across the surface of the oxide, this can give the surface an overall acidic or basic character.

The quantity and strength of Lewis acid and base sites (from the exposed metal cations and oxygen anions, respectively) and Brønsted acid and base sites (from the surface hydroxyl groups)—add broad utility and functionality to the metal oxide and its use in both chemical reactions and device applications. The sites are a strong contributor to the chemical reactivity of the metal oxide. They can serve as anchor sites to which other chemical groups, and even additional metal oxides, may be attached. And they can affect surface charge, hydrophilicity and biocompatibility.

One way of altering the surface of metal oxides is to attach small chemical groups or electron-withdrawing groups ("EWGs") in a process known as surface functionalization. The EWG induces polarization of the hydroxide bonds and facilitates dissociation of hydrogen. For example, a stronger EWG should lead to a more polarized bond and therefore a more acidic proton. It will be appreciated that useful EWGs include groups other than hydroxide. The acidity of Lewis sites can be increased by inducing polarization that facilitates the donation of electrons to the site. When compounds so made are placed in water, the acidic protons will dissociate and reduce the aqueous pH measurement.

Though somewhat imprecise when working with solid acid/base systems rather than liquid ones, traditional methods of pH measurement utilizing titrations, pH paper, and pH probes can be used to evaluate the acidity of metal oxides dispersed in aqueous solution. These measurements can be supplemented by the use of techniques including but not limited to colorimetric indicators, infrared spectroscopy, and temperature programmed desorption data to establish the acidified nature of the metal oxide surface. Surface groups can be examined by standard analytical techniques including but not limited to x-ray photoelectron spectroscopy.

Surface functionalization can be accomplished post-synthesis, including, but not limited to, exposing the metal oxide to acidic solutions or to vapors containing the desired functional groups. It can also be accomplished via solid state methods, in which the metal oxide is mixed and/or milled with solids containing the desired functional groups. However, all of these methods require an additional surface functionalization step or steps beyond those required to synthesize the metal oxide itself.

Synthesis and surface functionalization of the AMO material may be accomplished in a "single-pot" hydrothermal synthesis method or its equivalent in which the surface of the metal oxide is functionalized as the metal oxide is being synthesized from appropriate precursors. A precursor salt containing an EWG is solubilized and the resulting solution is acidified using an acid containing a second EWG. This acidified solution is then basified and the basified solution is heated then washed. A drying step produces the solid AMO material.

By way of example, an example AMO form of tin oxide was synthesized and simultaneously surface functionalized using the following single-pot method:

1. Initially, seven grams (7 g) of a tin (II) chloride dihydrate ($SnCl_2 \cdot 2H_2O$) is dissolved in a solution of 35 mL of absolute ethanol and 77 mL distilled water.
2. The resulting solution is stirred for 30 minutes.
3. The solution is acidified by the addition of 7 mL of 1.2 M HCl, added dropwise, and the resulting solution is stirred for 15 minutes.
4. The solution is basified by the addition of 1 M of an aqueous base, added dropwise until the pH of the solution is about 8.5.
5. The resulting opaque white suspension is then placed in a hot-water bath (~60 to 90° C.) for at least 2 hours while under stirring.
6. The suspension is then washed with distilled water and with absolute ethanol.
7. The washed suspension is dried at 100° C. for 1 hour in air and then annealed at 200° C. for 4 hours in air.

This method results in an AMO of tin, surface-functionalized with chlorine, whose pH is approximately 2 when resuspended and measured in an aqueous solution at 5 wt. % and room temperature. By definition, its Hammet function, $H_0$ is greater than −12. Although an open system such as a flask is described here, a closed system such as an autoclave may also be used.

Utilizing the single pot method disclosed above, a number of AMOs have been synthesized. Table 1 below describes the precursors and acids that have been used, where Ac represents an acetate group with the chemical formula $C_2H_3O_2$ or $CH_3COO$. In some instances, a dopant is utilized as well.

| Precursor | Dopant | Acid |
|---|---|---|
| SnAc | | $CH_3COOH$ |
| SnAc | | $H_2SO_4$ |
| SnAc | | $HNO_3$ |
| SnAc | | $H_3PO_4$ |
| SnAc | | $C_6H_8O_7$ |
| SnAc | | $C_2H_2O_4$ |
| SnAc | FeAc | HCl |
| SnAc | FeAc | $H_2SO_4$ |
| SnAc | FeAc | HNO3 |
| SnAc | FeAc | $C_2H_2O_4$ |
| SnAc | FeAc | $H_3PO_4$ |
| SnAc | FeAc | $C_6H_8O_7$ |
| SnAc | HBr | |
| SnAc | $H_3BO_3$ | |
| $SnSO_4$ | $MnCl_2$ | $H_2SO_4$ |
| $SnCl_2$ | $MnCl_2$ | HCl |
| $SnCl_2$ | $FeCl_3$ & $AlCl_3$ | HCl |
| $FeCl_3$ | $SnCl_2$ | HCl |
| $Fe(NO_3)_3$ | | $HNO_3$ |
| $BiCl_3$ | | HCl |
| $Zr(SO_4)_2$ | | $H_2SO_4$ |
| $TiOSO_4$ | | $H_2SO_4$ |
| $Sb_2(SO_4)_3$ | | $H_2SO_4$ |
| $In(Cl)_3$ | | HCl |
| $In_2(SO_4)_3$ | | $H_2SO_4$ |
| In(III)Br | | HBr |
| $InCl_3$ | | HCl |
| LiAc & $FeCl_3$ | $SnCl_2$ | HCl |

In some embodiments, the electron withdrawing groups have a carbon chain length of 6 or less and/or an atomic mass of 200 AMU or less. In some embodiments, the electron withdrawing groups have a carbon chain length or 8 or less, or 10 or less, and/or an atomic mass of 500 AMU or less.

It will be appreciated that the method's parameters can be varied. These parameters include, but are not limited to, type and concentration of reagents, type and concentration of acid and base, reaction time, temperature and pressure, stir rate and time, number and types of washing steps, time and temperature of drying and calcination, and gas exposure during drying and calcination. Variations may be conducted singly, or in any combination, optionally using experimental design methodologies. Additionally, other metal oxide synthesis methods—e.g., spray pyrolysis methods, vapor phase growth methods, electrodeposition methods, solid state methods, and hydro- or solvo thermal process methods—may be useful for achieving the same or similar results as the method disclosed here.

A variety of annealing conditions are useful for preparing AMO nanomaterial. Example annealing temperatures may be below 300° C., such as from 100° C. to 300° C. Example annealing time may range from about 1 hours to about 8 hours, or more. Annealing may take place under a variety of atmospheric conditions. For example, annealing may occur in air at atmospheric pressure. Annealing may occur at elevated pressure (greater than atmospheric pressure) or reduced pressure (less than atmospheric pressure or in a vacuum). Annealing may alternatively occur in a controlled atmosphere, such as under an inert gas (e.g., nitrogen, helium, or argon) or in the presence of an oxidizing gas (e.g., oxygen or water).

A variety of drying conditions are useful for preparing AMO nanomaterials. Example drying temperatures may be from 50° C. to 150° C. Example drying time may range from about 0.5 hours to about 8 hours, or more. Drying may take place under a variety of atmospheric conditions. For example, drying may occur in air at atmospheric pressure. Drying may occur at elevated pressure (greater than atmospheric pressure) or reduced pressure (less than atmospheric pressure or in a vacuum). Drying may alternatively occur in a controlled atmosphere, such as under an inert gas (e.g., nitrogen, helium, or argon) or in the presence of an oxidizing gas (e.g., oxygen or water).

Figure 4:
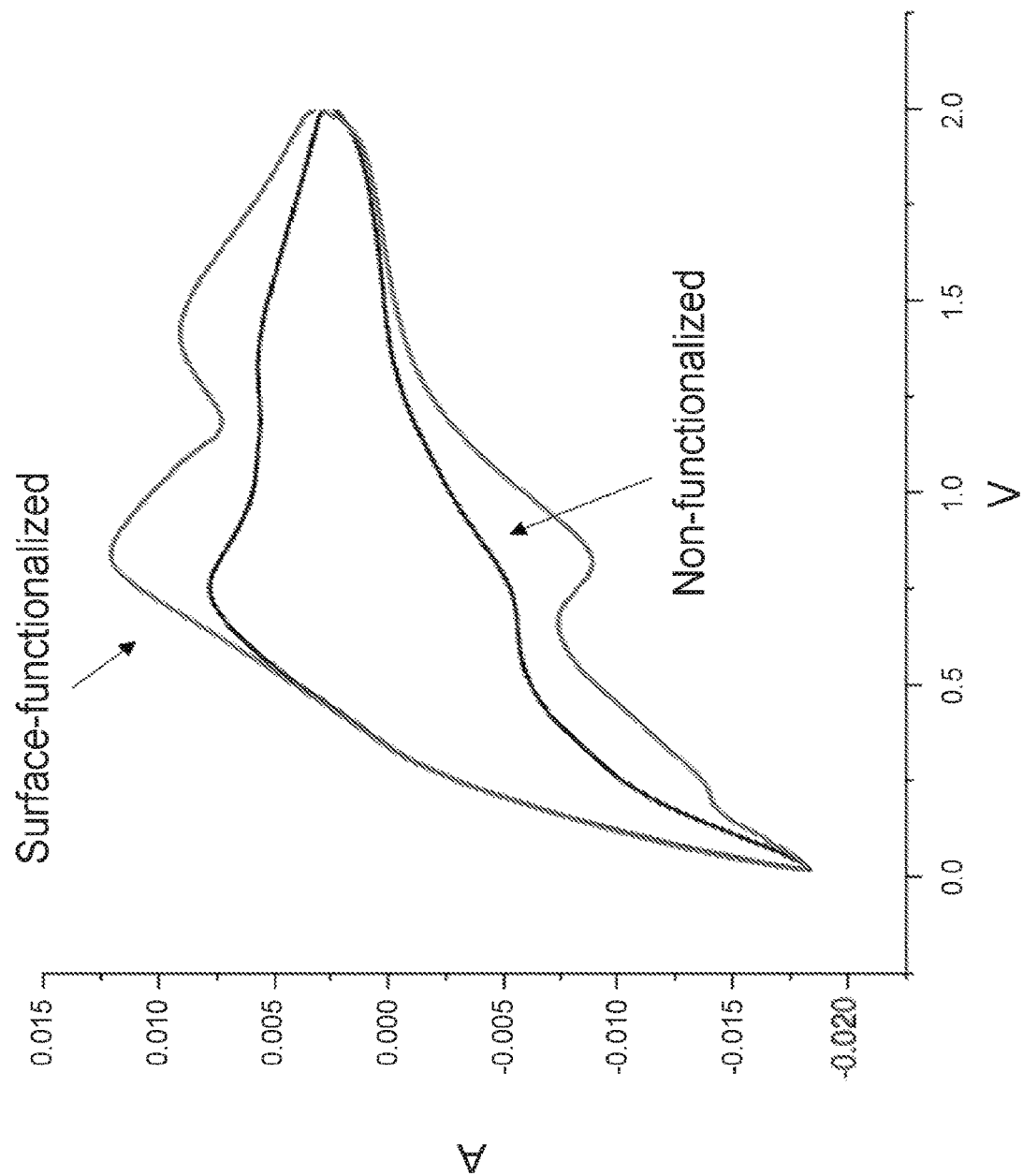
FIG. 4 provides a plot showing differences in the cyclic voltammogram of AMO tin prepared by the method disclosed herein relative to that of commercially available non-AMO tin, when cycled against Li.

The performance characteristics of the AMO nanomaterials differ from those of non-acidified metal oxide nanoparticles. As one example, FIG. 4 shows differences in the cyclic voltammogram (CV) of AMO tin prepared by the single-pot method relative to that of commercially available, non-AMO tin when cycled against lithium metal. For example, the surface-functionalized AMO material exhibits better reversibility than the non-AMO material. The presence of distinct peaks in the CV of the AMO material may indicate that multiple electron transfer steps are occurring during charging/discharging. For example, a peak at higher voltage may indicate direct oxidation/reduction of the AMO material, while a peak at lower voltage may originate due to changing the material structure of the AMO material (i.e., alloying).

Figure 5:
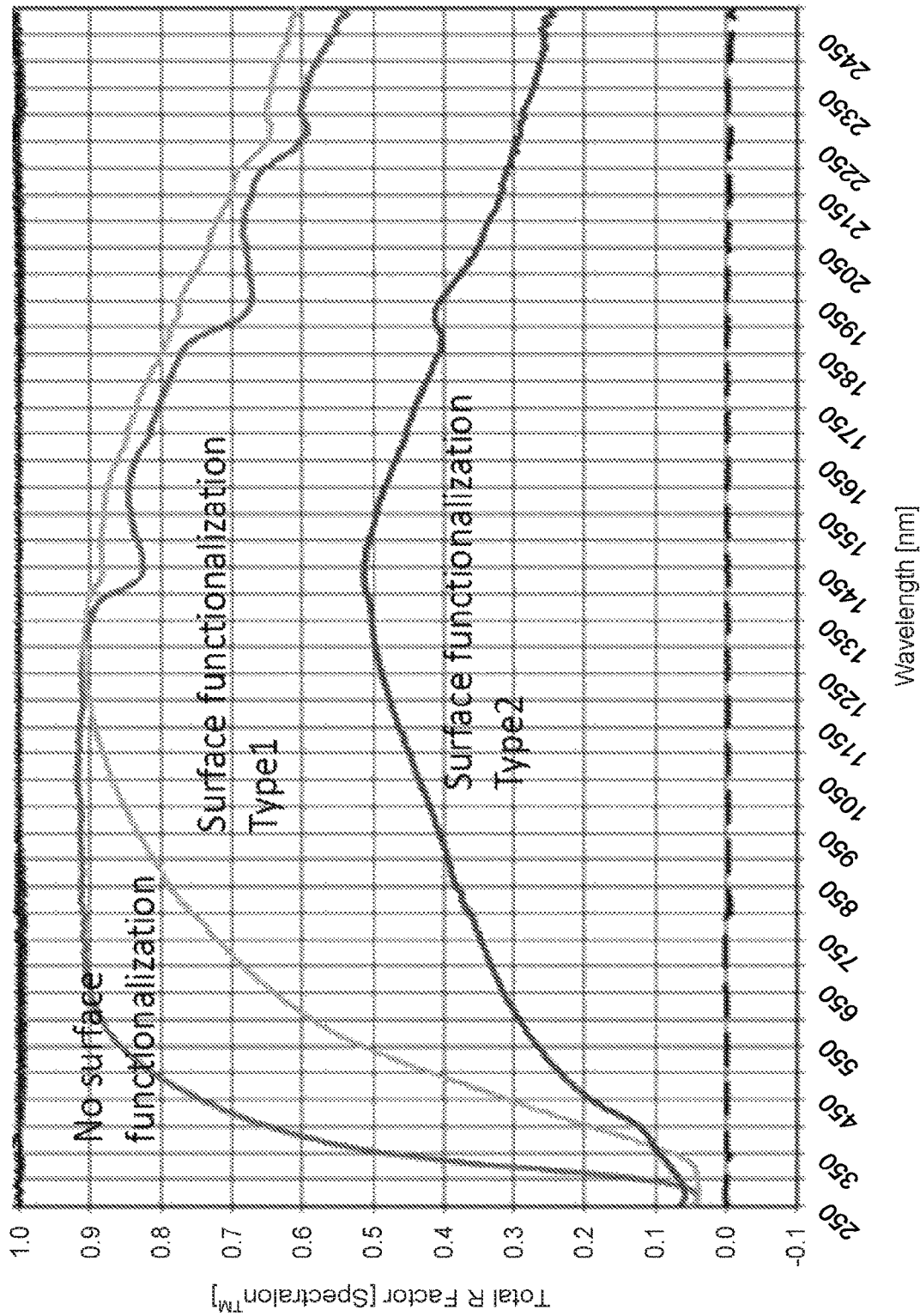
FIG. 5 provides a plot showing that the total reflectance of AMO tin oxide is different than that of commercially available non-AMO tin oxide.

As another example, FIG. 5 shows the total reflectance of AMO tin oxide is different than that of commercially available, non-AMO tin oxide. The data indicates that the AMO has a lower band gap and therefore more desirable properties as a component of a photovoltaic system in addition to use as an anode or a cathode according to the present disclosure.

The AMO material may optionally be represented by the formula $M_mO_x/G$ where $M_mO_x$ is the metal oxide, m being at least 1 and no greater than 5, x being at least 1 and no greater than 21; G is at least one EWG that is not hydroxide; and "/" makes a distinction between the metal oxide and the EWG, denoting no fixed mathematical relationship or ratio between the two. G may represent a single type of EWG, or more than one type of EWG.

Example AMOs are acidified tin oxides ($Sn_xO_y$), acidified titanium dioxides ($Ti_aO_b$), acidified iron oxides ($Fe_cO_d$), and acidified zirconium oxide ($Zr_eO_f$). Preferred electron-withdrawing groups ("EWGs") are Cl, Br, $BO_3$, $SO_4$, $PO_4$, $NO_3$, and $CH_3COO$. Regardless of the specific metal or EWG, according to the present disclosure, the AMO material is acidic but not superacidic, yielding a pH less than 7 when suspended in an aqueous solution at 5 wt. % and a Hammet function, $H_0$ greater than −12, at least on its surface.

The AMO material structure may be crystalline or amorphous (or a combination thereof), and may be utilized singly or as composites in combination with one another, with non-acidified metal oxides, or with other additives, binders, or conductive aids known in the art. In other words, an electrode prepared to take advantage of the AMOs of the present disclosure may or may not comprise other materials. In one embodiment, the AMO may be layered upon a conductive material to form the cathode 104. In some embodiments, the AMO material is added to a conductive aid material such as graphite, carbon black, or conductive carbon (or their equivalents) in a range of 5 wt. % to 90 wt. %, while the conductive aid and/or a binder material may be present in a range of 10 wt. % to 95%. Optionally, the AMO is added at 10 wt. %, 33 wt. %, 50 wt. %, or 80 wt. %.

To maximize the amount of overall surface area and amount of active sites for reaction of the active material available, the AMO may be present in nanoparticulate form (i.e., less than 1 micron in size) and substantially monodispersed. Optionally, the nanoparticulate size is less than 100 nm and, may be smaller still, such as less than 20 nm or 10 nm. It will be appreciated that nanoparticulate sizes ranging from 1 nm to 100 nm or 1000 nm may be useful with certain AMOs.

Mixed-metal AMOs, in which another metal or metal oxide is present in addition to the simple, or binary oxide, are useful in forming anodes and cathodes for half-cells, electrochemical cells, and batteries. These mixed-metal AMOs may be represented by the formula $M_mN_nO_x/G$ and $M_mN_nR_rO_x/G$ where M is a metal and m is at least 1 and no greater than 5; N is a metal and n is greater than zero and no greater than 5; R is a metal and r is greater than zero and no greater than 5; 0 is total oxygen associated with all metals and x is at least 1 and no greater than 21; "/" makes a distinction between the metal oxide and an EWG, denoting no fixed mathematical relationship or ratio between the two; and G is at least one EWG that is not hydroxide. G may represent a single type of EWG, or more than one type of EWG.

Some prior art mixed metal oxide systems, of which zeolites are the most prominent example, display strong acidity even though each simple oxide does not. Preferred embodiments of the mixed-metal AMO of this disclosure differ from those systems in that any embodiment must include at least one AMO which is acidic (but not superacidic) in simple $M_mO_x/G$ form. Example mixed metal and metal oxide systems include $Sn_xFe_cO_{y+d}$ and $Sn_xTiaO_{y+b}$, where y+d and y+b may be an integer or non-integer value.

Optionally, the mixed metal AMO material is produced via the single-pot method with one modification: synthesis begins with two metal precursor salts rather than one, in any proportion. For example, Step 1 of the single-pot method described above may be altered as follows: Initially, 3.8 g of tin (II) chloride dihydrate ($SnCl_2 \cdot 2H_2O$) and 0.2 g of lithium chloride (LiCl) are dissolved in a solution of 20 mL of absolute ethanol and 44 mL distilled water.

Three metal precursor salts, such as shown in Table 1, may optionally be used, in any proportion. The metal precursor salts may have the same or differing anionic groups, depending on the desired product. The metal precursor salts may be introduced at different points in the synthesis. The metal precursor salts may be introduced as solids or introduced in a solvent. In some embodiments, a first metal precursor salt may be used for the primary structure (i.e., larger proportion) of the resultant AMO, and a second (and optionally a third) metal precursor salt may be added as a dopant or as a minor component for the resultant AMO.

Experimentation with the single-pot method led to seven useful findings. First, in all cases both surface functionalization and acidity arise endogenously (see FIG. 6), rather than created post-synthesis. Unlike prior art surface functionalization methods, the single-pot method does not require any additional step or steps for surface functionalization beyond those required to synthesize the metal oxide itself, nor does it make use of hydroxyl-containing organic compounds or hydrogen peroxide.

Second, the method is broadly generalizable across a wide range of metal oxides and EWGs. Using the methods of the present disclosure, metal oxides of iron, tin, antimony, bismuth, titanium, zirconium, manganese, and indium have been synthesized and simultaneously surface-functionalized with chlorides, sulfates, acetates, nitrates, phosphates, citrates, oxalates, borates, and bromides. Mixed metal AMOs of tin and iron, tin and manganese, tin and manganese and iron, tin and titanium, indium and tin, antimony and tin, aluminum and tin, lithium and iron, and lithium and tin also have been synthesized. Additionally, surface functionalization can be accomplished using EWGs that are weaker than halogens and $SO_4$, yet still produce acidic but not super-acidic surfaces. For example, the method has also been used to synthesize AMOs surface-functionalized with acetate ($CH_3COO$), oxalate ($C_2O_4$), and citrate ($C_6H_5O_7$). A variety of Examples are described below.

Figure 7:
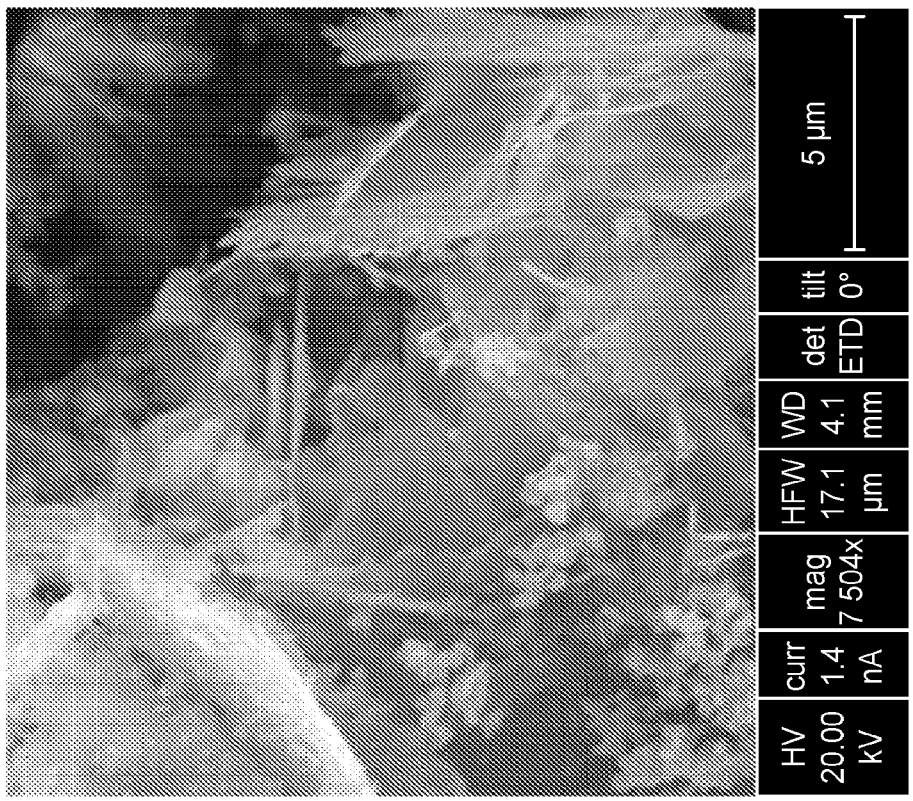
FIG. 7 provides electron micrograph images showing differences in morphology between AMO nanoparticles synthesized under identical conditions except for the use of a different group for functionalization.
Figure 7:
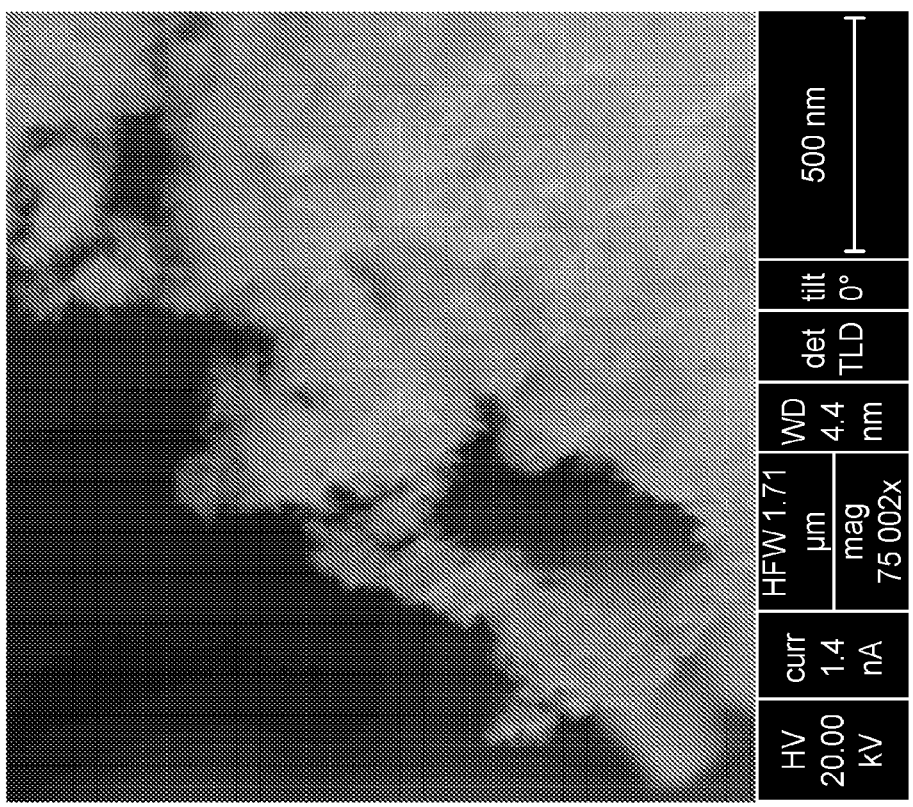

Third, there is a synergistic relationship between the EWG and other properties of the nanoparticles such as size, morphology (e.g., plate-like, spherical-like, needle- or rod-like), oxidation state, and crystallinity (amorphous, crystalline, or a mixture thereof). For example, differences in morphology can occur between AMO nanoparticles synthesized under identical conditions except for the use of a different EWG for surface functionalization, as illustrated in FIG. 7, which provides electron micrograph images of two AMOs generated using different EWGs. The surface functionalization may act to "pin" the dimensions of the nanoparticles, stopping their growth. This pinning may occur on only one dimension of the nanoparticle, or in more than one dimension, depending upon exact synthesis conditions.

Figure 8:
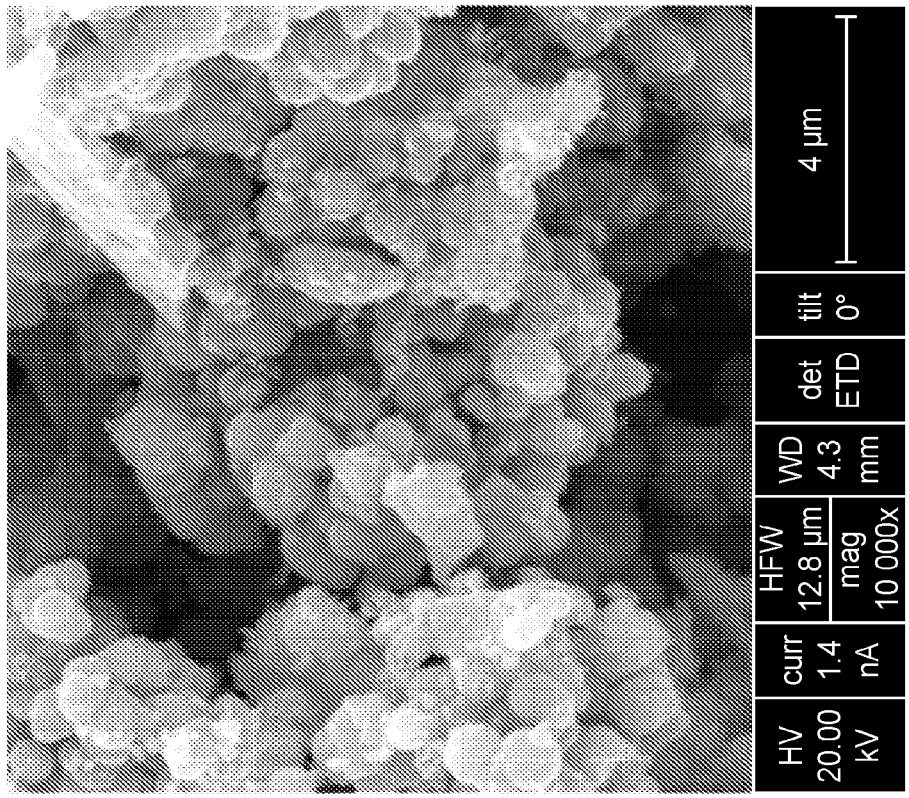
FIG. 8 provides electron micrograph images showing difference in morphology of AMO nanoparticles synthesized under identical conditions except for having two different total reaction times.
Figure 8:
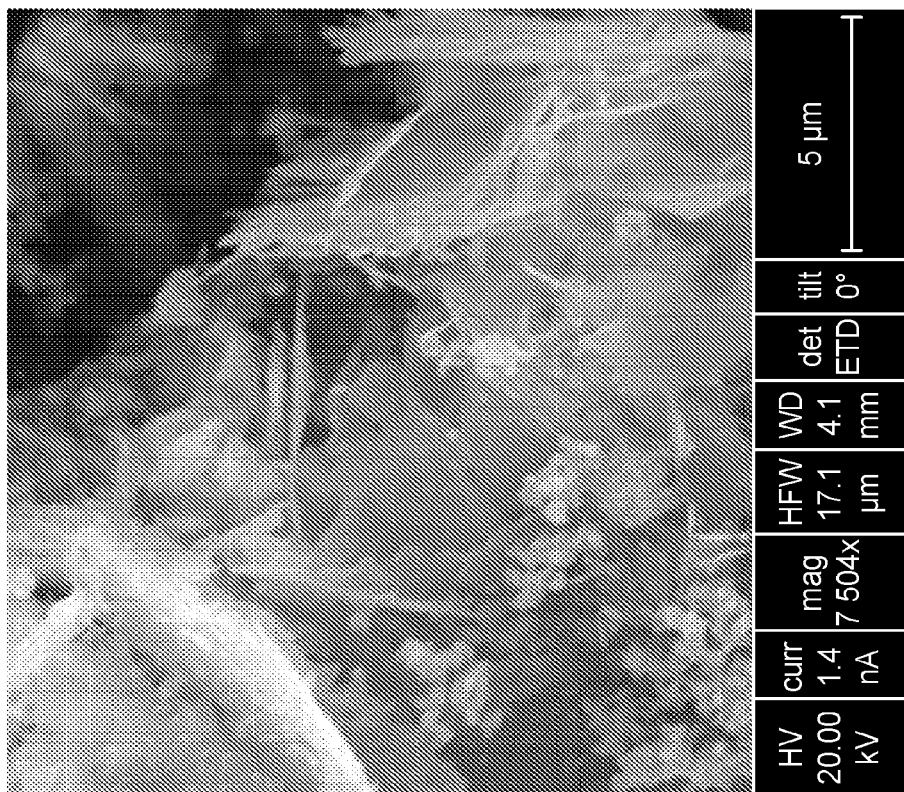
Figure 9:
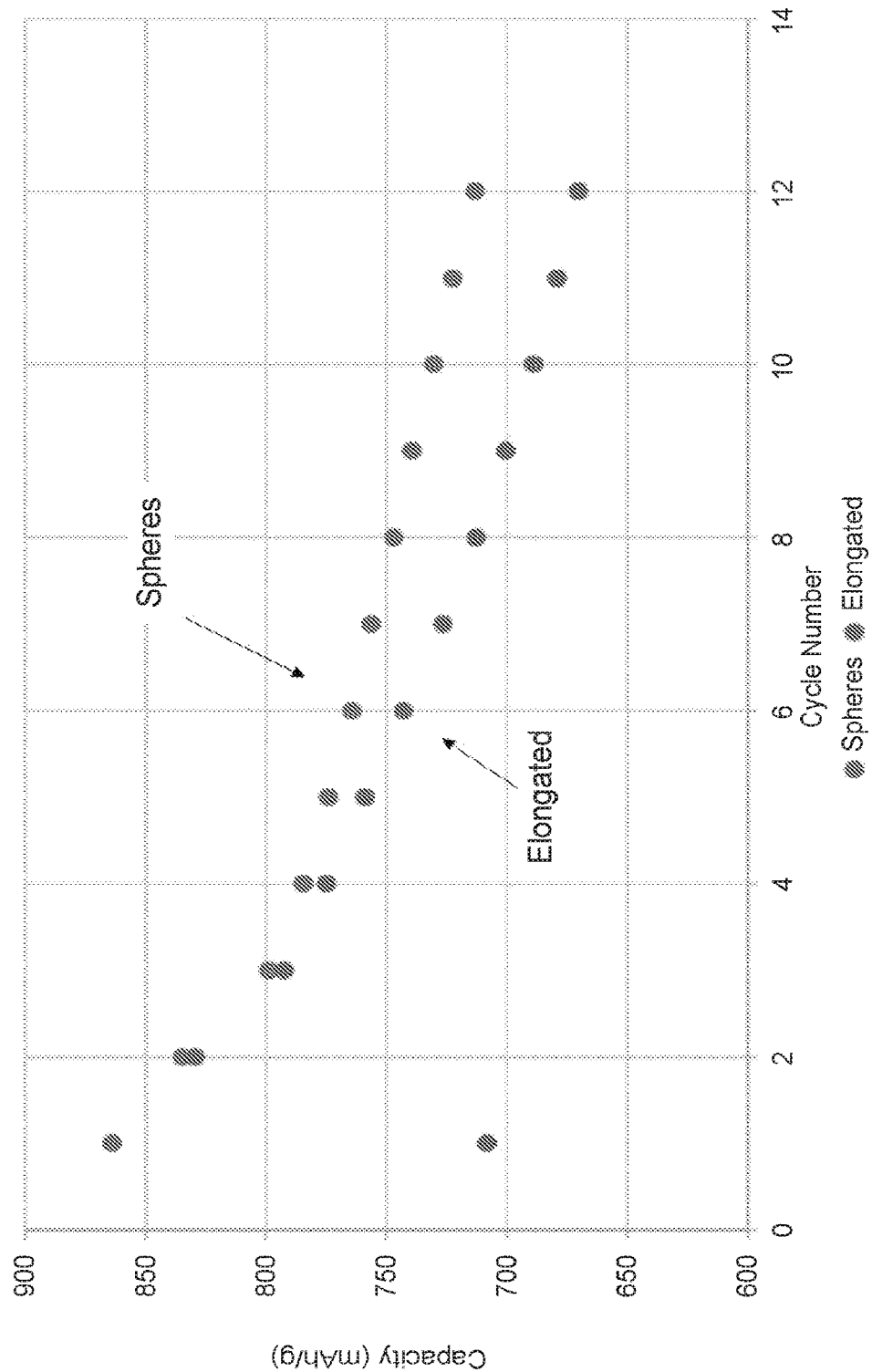
FIG. 9 provides representative half-cell data showing differences in behavior between spherical and elongated (needle-like or rod-like) AMOs upon cycling against lithium.

Fourth, the character of the AMO is very sensitive to synthesis conditions and procedures. For example, differences in morphology and performance of the AMO nanoparticles can occur when synthesized under identical conditions except for having two different total reaction times. For example, FIG. 8 provides electron micrograph images of two AMOs reacted for different total reaction times, and FIG. 9 provides a plot of capacity (mAh/g) versus cycle number, showing a comparison of cyclability of two AMOs reacted for different total reaction times exhibiting different morphology. Experimental design methodologies can be used to decide the best or optimal synthesis conditions and procedures to produce a desired characteristic or set of characteristics.

Fifth, both the anion present in the precursor salt and the anion present in the acid contribute to the surface functionalization of the AMO. In one embodiment, tin chloride precursors and hydrochloric acid are used in a synthesis of an AMO of tin. The performance of these particles differ from an embodiment in which tin chloride precursors and sulfuric acid are used, or from an embodiment in which tin sulfate precursors and hydrochloric acid are used. Matching the precursor anion and acid anion may be advantageous, for some embodiments.

Sixth, when utilizing a precursor with a weak EWG and an acid with a strong EWG, or vice versa, the strongly withdrawing anion will dominate the surface functionalization. This opens up a broader range of synthesis possibilities, allowing functionalization with ions that are not readily available in both precursor salts and acids. It may also permit mixed functionalization with both strong and weak EWGs. In one example, a tin acetate precursor and phosphoric acid are used to synthesize an AMO of tin. X-ray photoelectron spectroscopy analysis of the surface shows a greater atomic concentration of phosphorous than of the bonds associated with acetate groups (see FIG. 10).

Figure 11A:
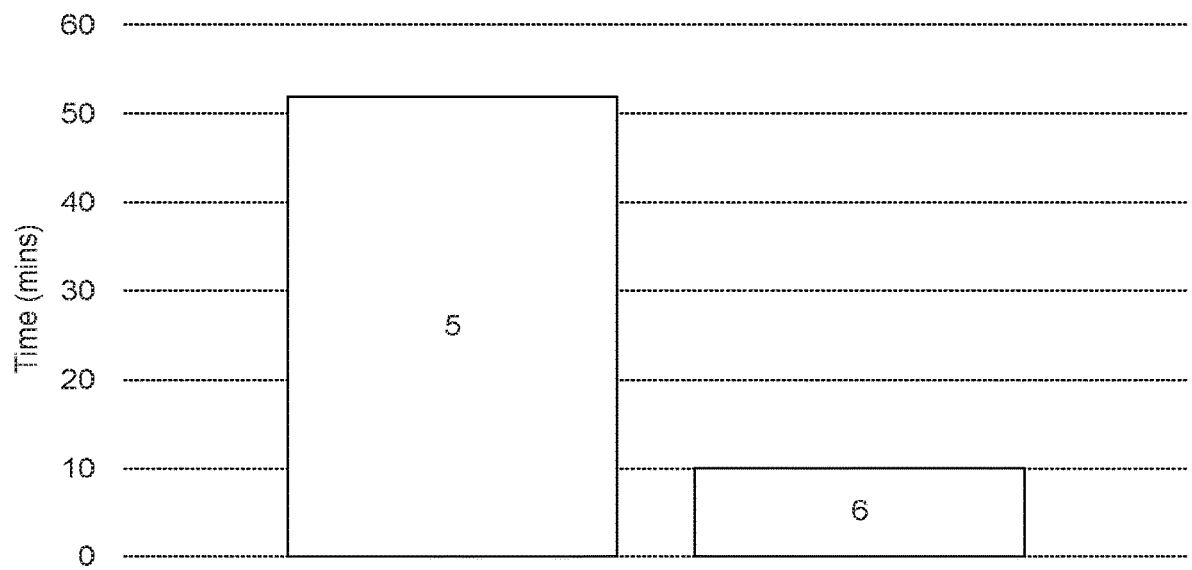
FIG. 11A provides data showing visible light activity degradation data for different AMOs.
Figure 11B:
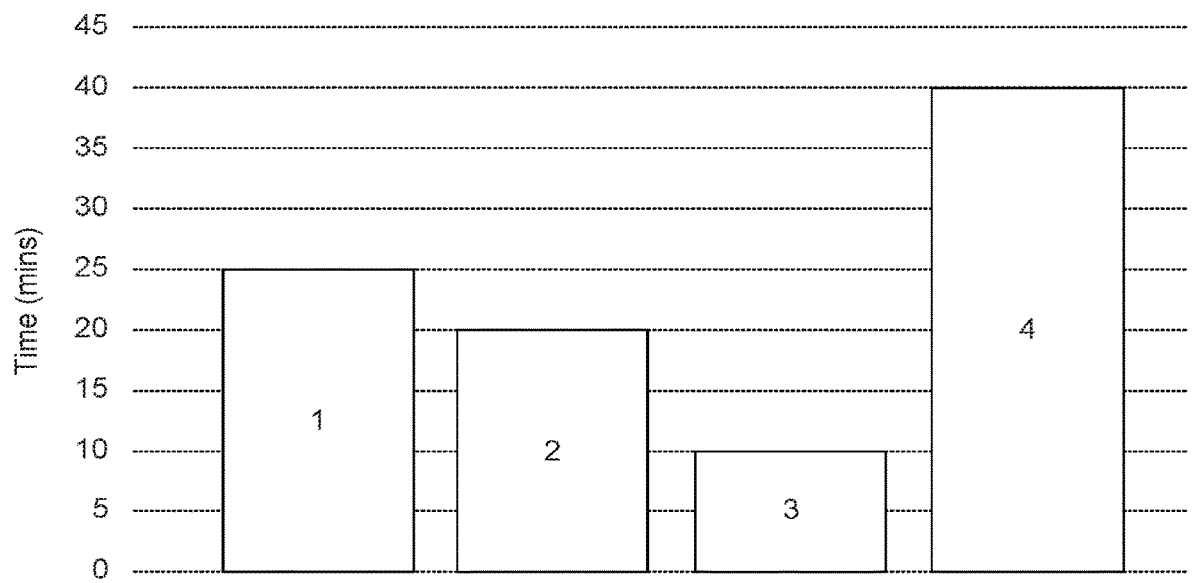
FIG. 11B provides data showing ultraviolet light activity degradation data for different AMOs.

Seventh, while the disclosed method is a general procedure for synthesis of AMOs, the synthesis procedures and conditions may be adjusted to yield sizes, morphologies, oxidation states, and crystalline states as are deemed to be desirable for different applications. As one example, catalytic applications might desire an AMO material which is more active in visible light or one which is more active in ultraviolet light. FIG. 11A provides visible light exposure degradation times of methylene blue when exposed to two different AMO materials. FIG. 11B provides ultraviolet light exposure degradation times of methylene blue when exposed to four different AMO materials.

Figure 12:
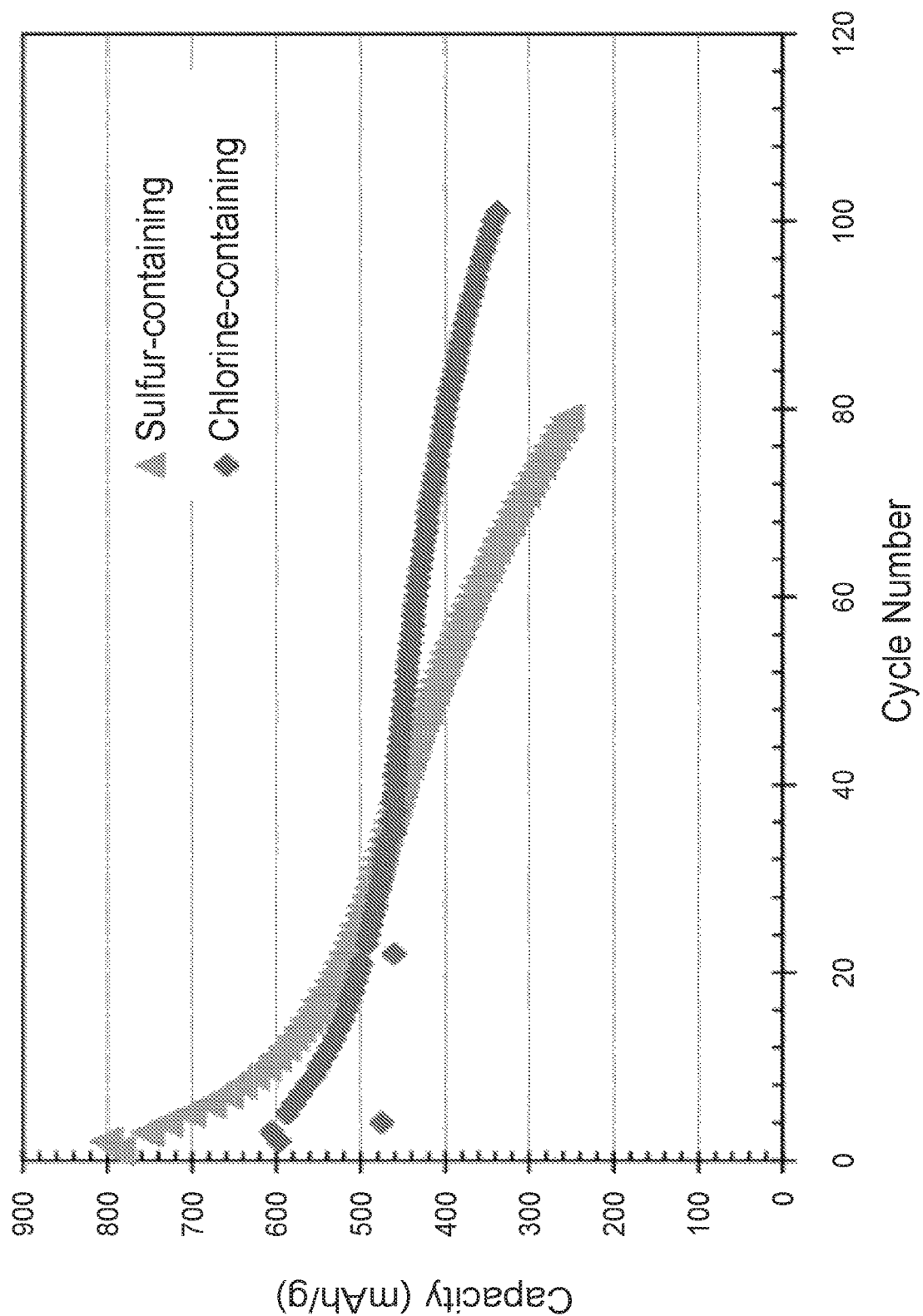
FIG. 12 provides data comparing two AMOs, one having higher capacity for use in a primary (single use) battery application and the other having higher cyclability for use in a secondary (rechargeable) battery application.

In another example, the AMO material may be used as a battery electrode. A primary (single-use) battery application might desire an AMO with characteristics that lead to the highest capacity, while a secondary (rechargeable) battery application might desire the same AMO but with characteristics that lead to the highest cyclability. FIG. 12 compares the cyclability of two different batteries constructed from AMO materials, including a chlorine containing AMO and a sulfur containing AMO. The AMO material can result in enhanced battery performance, without deterioration of battery components or gas generation (see FIG. 13). This is exactly opposite what the prior art teaches.

Figure 13:
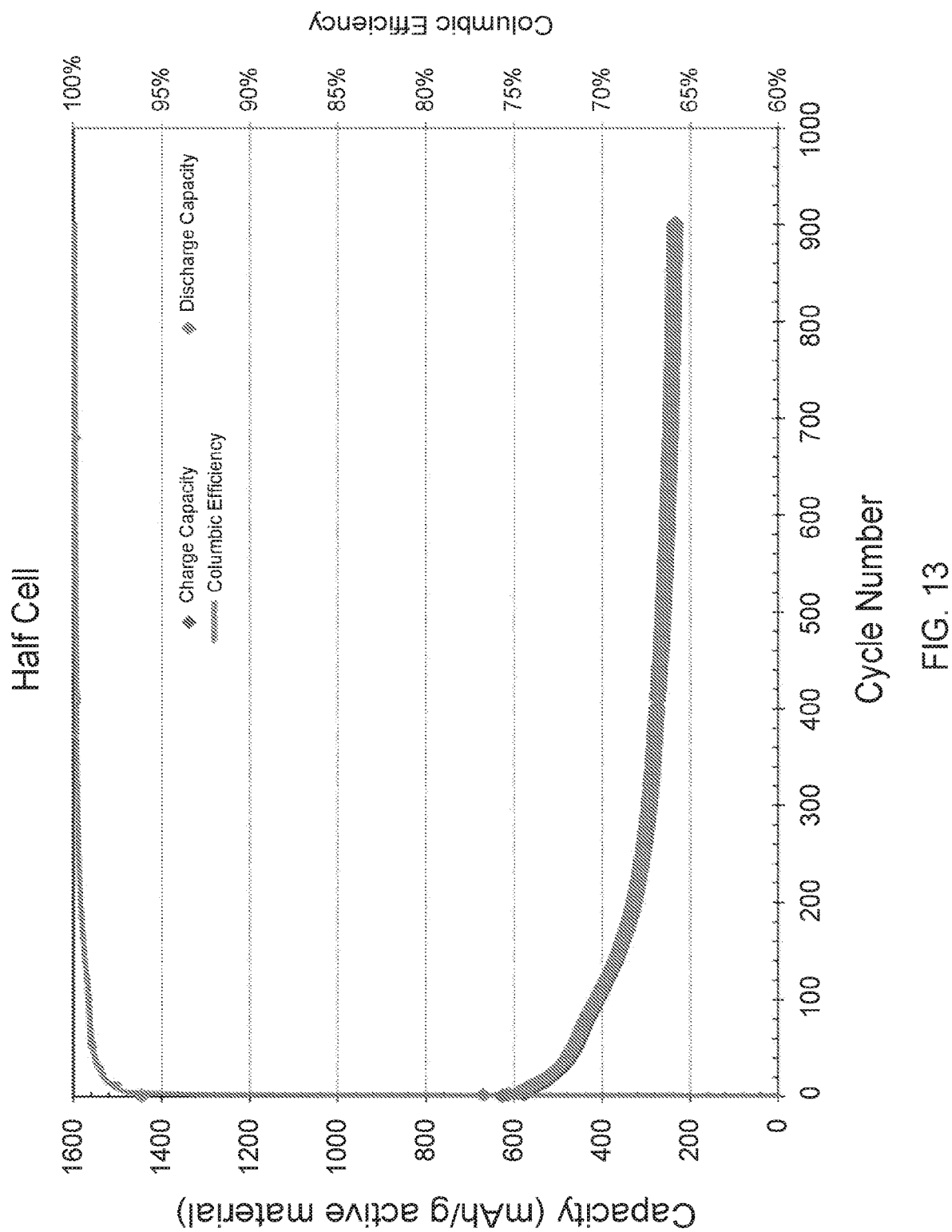
FIG. 13 provides charge and discharge capacity data and Columbic efficiency data, illustrating that AMOs can result in enhanced battery performance, without deterioration of battery components or gas generation.

In FIG. 13, the charge-discharge cyclability of a battery constructed as a cell of an AMO nanomaterial electrode versus lithium metal is shown, showing cyclability for up to 900 charge-discharge cycles, while still maintaining useful capacity and exceptional columbic efficiency. Such long cyclability is exceptional, particularly against the lithium metal reference electrode, as lithium metal is known to grow dendrites during even low cycle numbers, which can enlarge and result in dangerous and catastrophic failure of a battery cell.

According to the present disclosure, in a complete cell, the anode 106 comprising the disclosed AMO may be utilized with a known electrolyte 108 and a cathode 104 comprising known materials, such as lithium cobalt oxide ($LiCoO_2$). The material comprising the separator 110 may likewise be drawn from those currently known in the art.

In a complete cell, the cathode 104 comprising the disclosed AMO may be utilized with a known electrolyte 108 and an anode 106 comprising known materials such as carbon on copper foil, which display less electronegativity than AMOs of the present disclosure. Other anodic materials, such as lithium metal, sodium metal, magnesium metal, or other composite materials containing one or more of these metals, are also useful. In some embodiments, the anode 106, may consist of or consist essentially of lithium. The material comprising the separator 110 and electrolyte 108 may likewise be drawn from those currently known in the art as discussed above. Various layering and other enhancement techniques as are known in the art may be deployed to maximize capacity for holding lithium ions for powering the cell 100. It should also be understood that a battery based on an AMO cathode 104 according to the present disclosure can be deployed as a secondary (e.g., rechargeable) battery but can also serve as a primary battery. Although the AMO anodes of the present disclosure lend themselves to a reversible battery chemistry, a cell or battery constructed as described herein, may be satisfactorily deployed as a primary cell or battery.

In some contexts, the word "formation" is used to denote initial charge or discharge of the battery carried out at the manufacturing facility prior to the battery being made available for use. The formation process may be generally quite slow and may require multiple charge-discharge cycles directed at converting the active materials as-manufactured into a form that is more suitable for cell cycling. These conversions may be incorporate alterations of the structure, morphology, crystallinity, and/or stoichiometry of the active materials.

In contrast, cells and batteries constructed according to the present disclosure, in some embodiments, do not require initial formation and therefore are ready to use as primary cells or batteries upon assembly. In other cases, limited or rapid formation may be employed. Moreover, by deploying the cells and batteries of the present disclosure as primary cells that are not intended to be recharged, some of the safety issues that may be inherent with lithium battery chemistry are mitigated, as it is known in the art that the safety issues more frequently arise during battery cycling. However, following an initial primary discharge, cells and batteries disclosed herein are optionally suitable for use as secondary battery systems which may undergo many charge-discharge cycles, such as up to tens, hundreds, or even thousands of cycles.

In some embodiments, the cathode 104 comprises tin oxide ($SnO_2$) nanoparticles that have not been acidified in accordance with the AMOs described above. Known electrolytes 108, anodes 106, and separators 110, or those otherwise described in this disclosure may be utilized with such embodiments.

It will be appreciated that various battery constructions are possible using the AMO materials disclosed herein. For example, a battery may comprise a first electrode comprising an AMO nanomaterial, a second electrode, and an electrolyte positioned between the first electrode and the second electrode. As an example, in a lithium ion battery, the first electrode may operate as a cathode or an anode. For example, in operation of an AMO-based electrode as a cathode, the second electrode may correspond to lithium metal, graphite, or another anodic material. As another example, in operation of an AMO-based electrode as an anode, the second electrode may correspond to a $LiCoO_2$, $LiMn_2O_4$, $LiNiO_2$, or another cathodic material. Useful materials for the second electrode include, but are not limited to, graphite, lithium metal, sodium metal, lithium cobalt oxide, lithium titanate, lithium manganese oxide, lithium nickel manganese cobalt oxide (NMC), lithium iron phosphate, lithium nickel cobalt aluminum oxide (NCA), or any combination of these.

It will be appreciated that the AMO materials disclosed herein may also be added as dopants to conventional lithium ion cell anodes and/or cathodes, such as in amounts between 0.01 wt. % and 10 wt. %, or for example, an amount of about 1 wt. %, 5 wt. % or 10 wt. % of AMO material in an electrode. The disclosed AMO materials provide an incredible capacity for storing lithium atoms and by adding these materials to conventional lithium ion cell electrodes, the ability of these composites to store lithium atoms may increase. As one specific example, an electrode comprises $LiCoO_2$ and an AMO. As another example, an electrode comprises a carbonaceous material, such as graphite, and an AMO.

Advantageously, the AMO material may optionally be used with an acidic component, such as a binder, an acidic electrolyte, or an acidic electrolyte additive. This may be in the context of an anode, cathode, half-cell, complete cell, integrated battery, or other components. The inventors have surprisingly found that including acidic components and/or acidic species, such as organic acids or organic acid anhydrides, in a battery comprising an AMO material results in an increase in the capacity versus batteries where the acidic species are not included. Again, the prior art teaches against use of acidic species, as these species may degrade metal current collectors and housings and cause deterioration in other electrode components.

Figure 14:
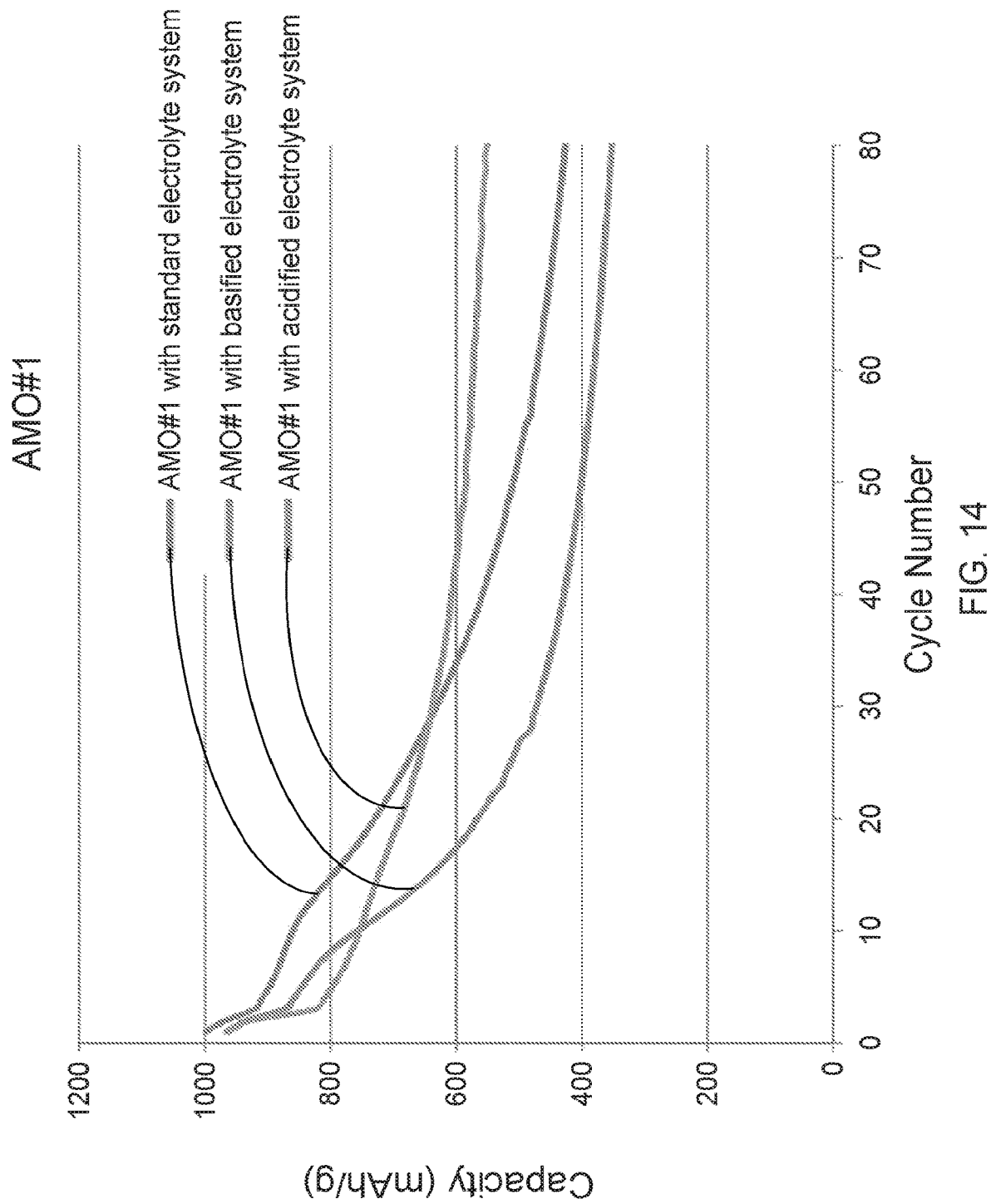
FIG. 14 shows capacity and cycling data for an AMO in standard, acidified, and basified electrolyte systems.

As shown in FIG. 14, which provides comparative cyclability data for AMO-based batteries formed of the same materials and structure except for one having a standard electrolyte, one having a basified electrolyte, and one having an acidified electrolyte. The batteries included a construction as follows: all cathodes included the same AMO material; all anodes were lithium metal; the standard electrolyte was a 1:1:1 mix of dimethylene carbonate, diethylene carbonate, and ethylene carbonate with 1 M $LiPF_6$; the acidified electrolyte was the standard electrolyte with 3 wt. % succinic anhydride; the basified electrolyte was the standard electrolyte with 3 wt. % dimethylacetamide. All batteries were cycled at the same discharge rate. As illustrated, the battery with the acidified electrolyte system exhibits the best cycling ability, maintaining the highest capacity over the largest number of cycles.

Figure 15:
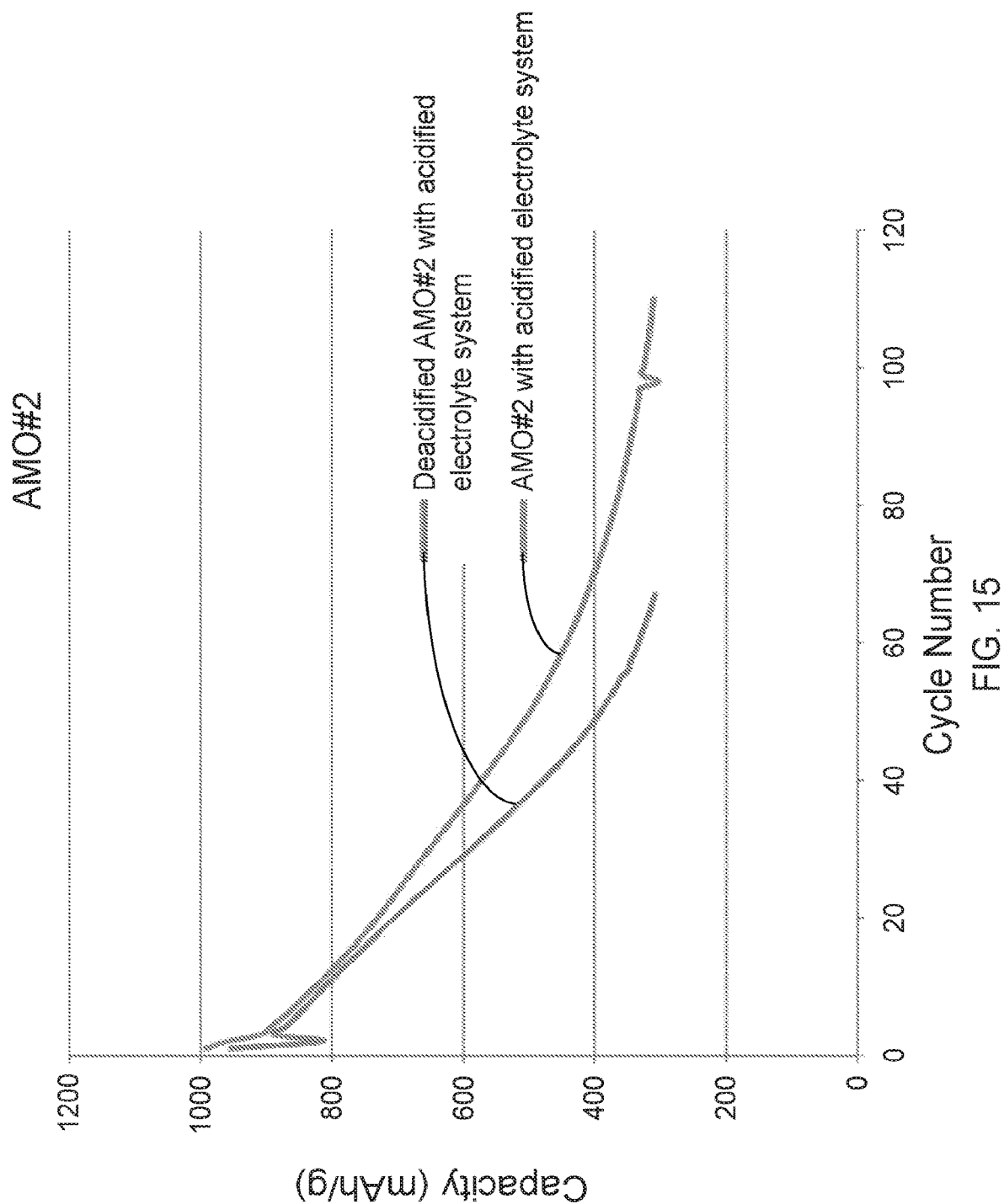
FIG. 15 shows capacity and cycling data for an AMO, and for the same AMO from which the acidification was removed by solvent washing.

FIG. 15 provides additional comparative cyclability data for two different batteries with the same battery construction including an acidified electrolyte, except that the AMO material of one battery is deacidified by washing with a solvent. The batteries included a construction as follows: the cathodes included the AMO material; the electrolyte was a 1:1:1 mix of dimethylene carbonate, diethylene carbonate, and ethylene carbonate with 1 M $LiPF_6$ and 3 wt. % succinic anhydride; the anodes were lithium metal. The batteries were cycled at the same discharge rate. The battery having the acidified AMO material exhibits higher capacity retention vs. cycle number, indicating that the acidified surface of the AMO may interact with the acidified electrolyte, providing enhanced performance. Several acidic electrolytes have been developed and/or tested and been found to operate advantageously with the cell chemistry described herein.

At the present time, lithium batteries are perceived to be a safety risk in certain situations. For example, airline regulations currently require partial discharge of lithium batteries in order to be carried in the cargo hold. Fires have been reported in devices utilizing lithium batteries, resulting from runaway exothermal reactions. Moreover, lithium fires can be difficult to extinguish with popularly deployed fire suppression systems and devices. For these reasons, lithium containing compounds rather than metallic lithium are used in many commercial battery cells.

Use of lithium containing compounds in an anode, rather than lithium metal, may, however, limit the amount of lithium available for reaction and incorporation into the cathode upon discharge, and may thus also limit the capacity of such cells. The presently disclosed AMO materials, however, show not only large uptake of lithium during discharge but also enhanced safety characteristics. For example, when battery cells comprising the AMO material in a cathode and a lithium metal electrode are subjected to safety tests, such as nail penetration tests, shorting tests, and overvoltage tests, the cells perform well and do not appear to pose an unacceptable risk of fire or explosion.

Several cells were constructed with a cathode comprising a $SnO_2$ AMO and an anode comprising a conductive carbon black (Ketjenblack), polyvinylidene fluoride (PVDF), and polyaryl amide (PAA) at a ratio of 63/10/26.1/0.9, by volume. Double-sided layers of this composition were prepared at 4 mg/cm² per side. Six of these layers made up the cathode. The size of the prepared cathode was 9 cm×4 cm. A 25 μm thick layer of polypropylene was obtained from Targray Technology International, Inc., and used as a separator. The separator size was 9.4 cm×4.4 cm. An electrolyte was prepared from 1 M $LiPF_6$ in a solvent of ethylene carbonate (EC), diethyl carbonate (DEC), and dimethylcarbonate (DMC) in a 1:1:1 ratio, by volume. The anode was a 50 μm thick layer of lithium metal with dimensions of 9.2 cm×4.2 cm.

Two of the constructed cells were discharged prior to a safety test and found to have an actual capacity of 1.7 Ah and a specific capacity of 1575 mAh/g $SnO_2$.

Figure 16:
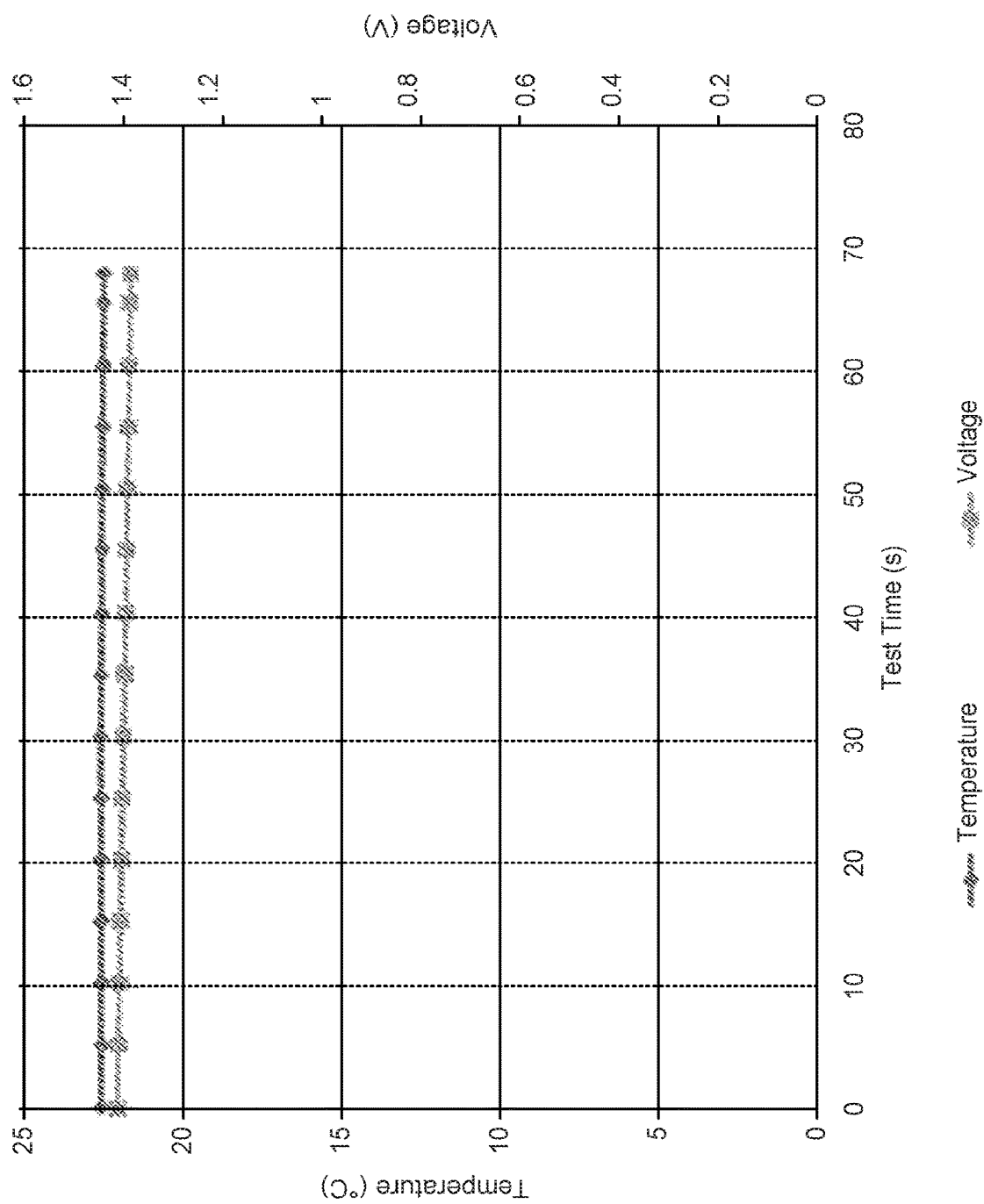
FIG. 16 provides data showing temperature and voltage as a function of time for a battery cell subjected to a nail penetration test.

FIG. 16 provides data showing temperature and voltage for a cell constructed as described above and subjected to a nail penetration test. The test was conducted at room temperature and no events (e.g., fires) were observed. It can also be seen that the temperature and voltage remained stable.

Figure 17A:
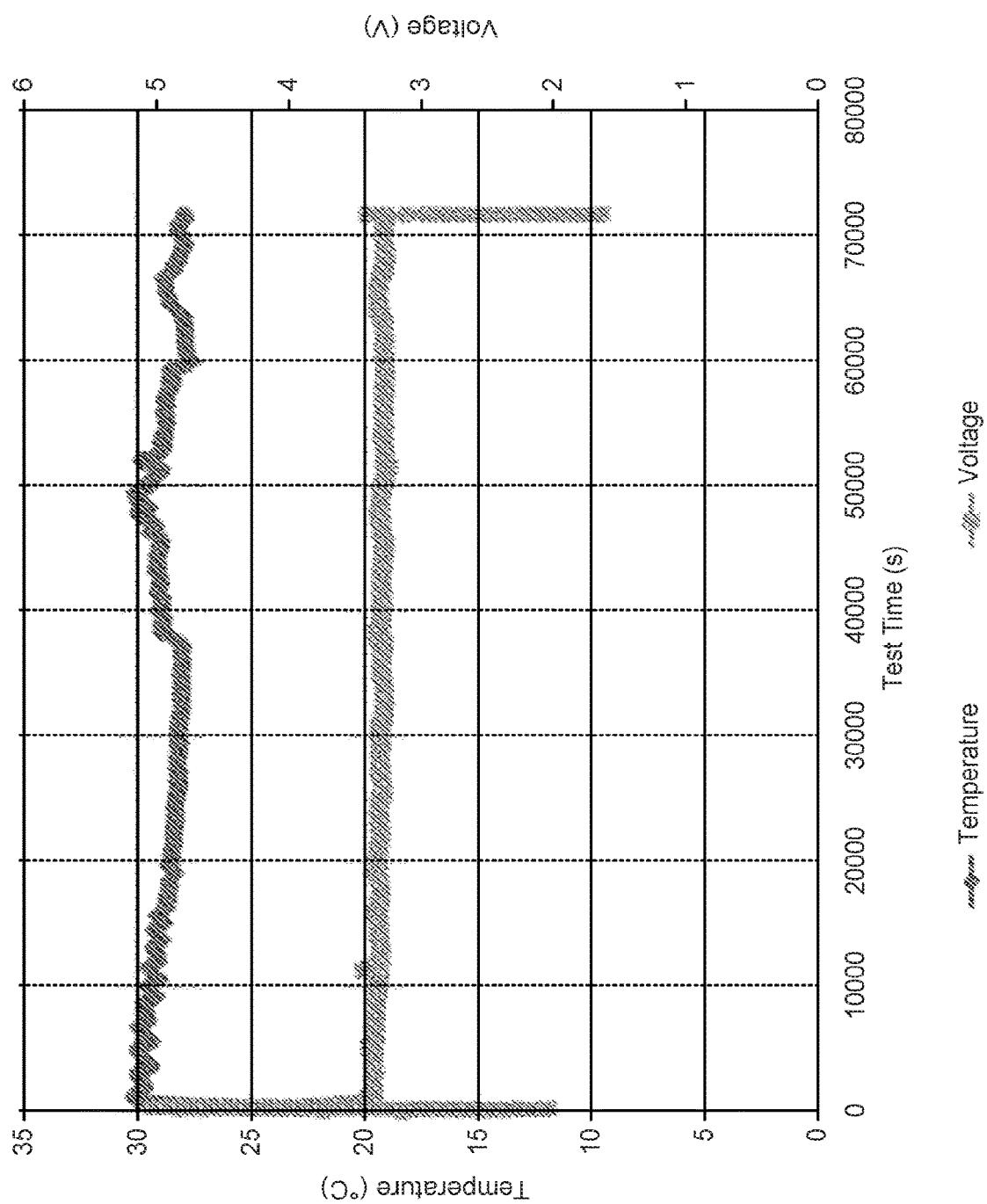
FIG. 17A provides data showing temperature and voltage as a function of time for a battery cell subjected to an overcharge test.
Figure 17B:
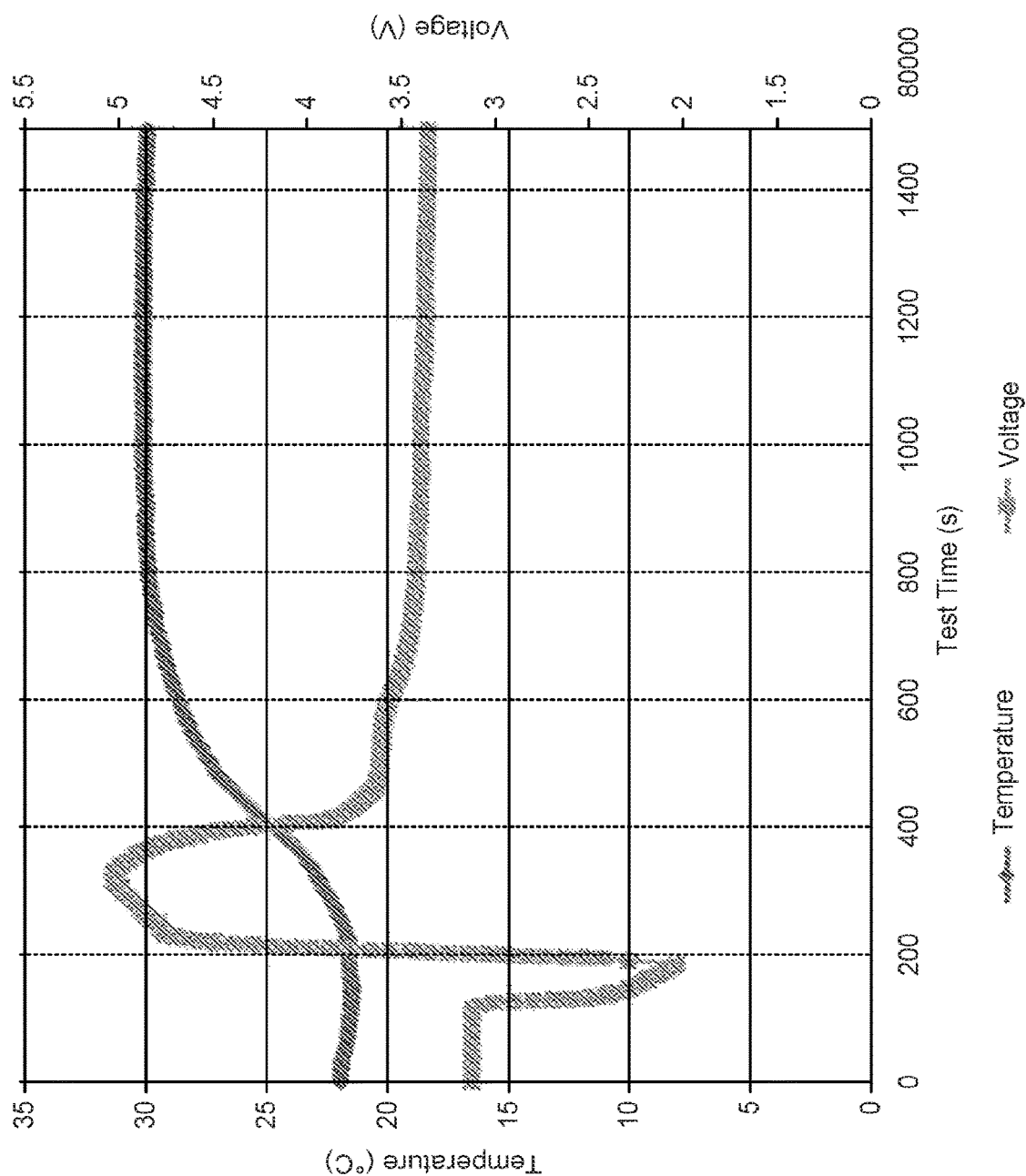
FIG. 17B provides an expanded view of the data shown in FIG. 18A for about the first 1400 seconds.

FIG. 17A provides data showing temperature and voltage for a cell constructed as described above and subjected to an overcharge test. A current of 1 A was applied. Apart from some gassing from the cell, no adverse events were observed over the timeframe of the test. FIG. 17B provides an expanded view of the overcharge test results of FIG. 17A focusing on the start of the test.

Embodiments of constructed electrochemical cells incorporating AMO material as a cathode and lithium as an electrode have been tested to successfully undergo up to 900 or more charge-discharge cycles without resulting in catastrophic and destructive failure. Stated another way, embodiments of constructed electrochemical cells incorporating AMO material as a cathode and lithium as an electrode have been tested to successfully undergo up to 900 or more charge-discharge cycles and still hold a charge and maintain useful capacity.

Without wishing to be bound by any theory, the enhanced safety provided by use of AMO-based cathode materials in lithium cells may arise from the ability of the AMO material to passivate the lithium metal and prevent dendrite formation. The inventors have observed that, upon cycling, the lithium metal anode did not appear to grow or otherwise form dendrites, but the lithium anode took on a softer and less crystalline appearing structure. In some embodiments, the lithium anode may be passivated, such as by cycling as a component of an electrochemical cell as described herein, and then removed from the electrochemical cell and used as an electrode in a new electrochemical cell with a different cathode. Additionally, cells constructed according to the present disclosure make use of low operating voltages, such as between 1 and 2 volts, which contrasts with the typical voltage of a lithium or lithium-ion battery cell, which operate commonly around 3-4.2 volts. Such a difference in operational voltage may, in part, account for the safety of the disclosed cells.

Figure 18:
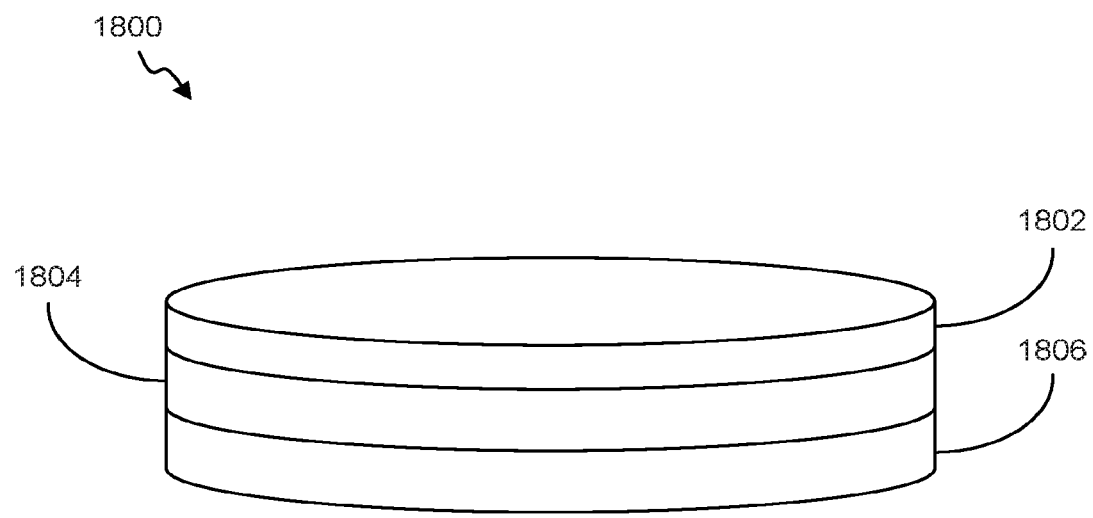
FIG. 18 provides a schematic illustration of an example battery cathode.

Referring now to FIG. 18, a schematic illustration of a cathode 1800 according to aspects of the present disclosure is provided. FIG. 18 is not to scale. The cathode 1800 comprises about 33.3% $SnO_2$ in AMO form. The AMO was prepared according to the methods described herein. To form a carbon layer 1804, a slurry of Ketjenblack EC-300J (SA: ~800 m²/g) was prepared using NMP solvent and coated on copper foil 1802 of thickness 10 μm as a current collector. The slurry composition was 80% Ketjenblack and 20% PVDF, by weight. The coated tape was dried in a vacuum oven at 100° C.

To form a carbon/$SnO_2$ electrode layer 1806, a mixture of AMO $SnO_2$, Ketjenblack, and PVDF, each 33.3% by weight, was prepared and a slurry was formed by adding NMP solvent. The slurry was coated on part of the Ketjenblack coated copper foil (1802, 1804). The resultant tape was dried in a vacuum oven at 100° C. (overnight) and calendared at room temperatures. The thickness of the tape was measured using a micrometer at the $SnO_2$/Ketjenblack coated area and the Ketjenblack only coated area. The thickness of the Ketjenblack layer 1704 was found to be about 8 μm, while the $SnO_2$ AMO-containing layer 1806 was found to be about 2 μm thick. The foil layer was about 10 μm thick, providing a total thickness of the cathode 1800 of about 18-20 μm.

The calendared tape was punched out into circular disks from the Ketjenblack only coated area and the $SnO_2$/Ketjenblack coated area. The mass of the Ketjenblack only coated disc was subtracted from the $SnO_2$/Ketjenblack coated disc to obtain the total mass of the electrode layer. In the case of one tested cell type, the total mass of the electrode material is 0.0005 g (after subtracting the equivalent of the Ketjenblack only coated disc mass), providing a total active material ($SnO_2$) mass of about 0.000167 g (33.3% of total mass).

Useful aspects of the cathode 1800 include the layering of carbonaceous layer and the AMO-containing layer, the use of Ketjenblack high surface area conductive carbon in both layers, a 33% active material content in the AMO-containing layer, the thickness of the AMO-containing layer, the use of PVDF as a binder, and the use of copper foil as a current collector. Each of these aspects may optionally be varied.

For example, carbons other than Ketjenblack may be used. It will be appreciated that the AMO materials used as the active material possess very small particle dimensions, such as on the order of 1-100 nm (e.g., 2-5 nm), with a narrow size distribution range. Although graphite may be useful as a carbon for cathodes of the present disclosure, Ketjenblack has a particle size much closer to the AMO particle size than does commercially available graphite, as well as some other conductive carbons. Ketjenblack particles may be, for example, about 30-300 nm in size, with a wider distribution than the AMO particles. In contrast, graphite particles tend to have a much larger size, such as on the order of 100 μm. Such close similarity in size may allow the mixture of Ketjenblack and AMO to have more uniformity on a local scale and allow more complete or better mixing and contact between the particles of carbon and particles of AMO.

As another example, the number of layers of the carbonaceous material layers and AMO-containing layers may be varied for forming the electrode. In the example described above, the electrode comprises one carbonaceous material layer and one AMO-containing layer. Optionally, additional carbonaceous material layers may be included. Optionally, additional AMO-containing layers may be included. Advantageously, a carbonaceous material layer may be placed directly on an AMO-containing layer, followed by another carbonaceous material layer, followed by another AMO-containing layer, etc. Examples are contemplated where any number of pairs of layers may be included in an electrode, such as 1-20 layer pairs. In addition, an acidic species may optionally be incorporated into the electrode and/or an electrode layer, as described above, and may be mixed with the carbonaceous material, the AMO, and/or the binder.

In some embodiments, however, distinct layers are not used in an AMO-containing electrode and the electrode may comprise the AMO, the carbonaceous material, and one or more binders (e.g., PVDF, PAA, etc.) in a single, mixed structure, with a similar composition as the overall structure of the layered electrodes described above. For example, an electrode may comprise separate carbonaceous layers (0% AMO) and AMO-containing layers (e.g., 33% AMO) to provide an overall composition having about 21% AMO. Alternatively, an electrode may comprise a single structure containing a 21% AMO mixture with carbonaceous materials (and binders). Optionally, the single mixed electrode structure may optionally be assembled as multiple layers, with each layer having a common composition of the mixed structure.

As another example, the percentage of active material may be varied. For example, in the above described multilayer electrode, the carbonaceous layers included no AMO, while the AMO-containing layers contained about 33%. When taken as a whole, such a composition of layers may amount to about 21% AMO overall, by weight. However, the AMO-containing layers and/or the electrode as a whole may include between 1% and 90% AMO, by weight, depending on the configuration. In some embodiments, a high AMO fraction may be useful, such as an amount of AMO of 50% by weight, or more.

In other embodiments, a low AMO fraction may be useful, such as an amount of AMO of 35% by weight, or less. Contrary to conventional thinking, where the amount of active material in an electrode is typically kept high (e.g., 80% or greater, by weight) to allow for maximum capacity and specific capacity of a cell incorporating the electrode, the inventors have found that lower active material (AMO) loading advantageously allows for creation of batteries with higher overall capacity and higher specific capacities. Without wishing to be bound by any theory, the high capacity of the disclosed cells incorporating AMO materials may be achieved by the particular affinity of the AMO material for lithium atoms. The incredible amount of lithium atoms that can be stored by electrodes incorporating the AMO materials may result in needing extra space in order to accommodate the uptaken lithium. By including lower fractions of active material, additional space for the lithium atoms may be achieved. In fact, fractions of AMO active material in an electrode overall or an electrode containing layer as low as 15% or 20% may exhibit even higher capacities and specific capacities than electrodes with considerably more AMO active material loading. In addition, the conductive carbon may be activated by the presence of the AMO material, and may provide for additional active sites for uptake of lithium during charging and/or discharging.

Due to its incredible affinity for lithium atoms, in some embodiments, the AMO may be added to a conventional lithium cell electrode or lithium ion electrode. In this way, conventional electrodes can have their lithiation capacity advantageously improved while altering the electrochemistry of the cell little or not at all. In some examples, AMOs may be added to conventional lithium cell electrodes or lithium ion electrode in amounts of up to 5%.

As another example, the thicknesses of the layers of an electrode comprising an AMO may be varied, such as to improve performance or to modify other properties of the electrode, such as an active material loading (i.e., weight percent AMO). As examples, the thickness of carbonaceous layers of an electrode may be from 0.5 µm to 50 µm, from 1.0 µm to 20 µm, or from 1.5 µm to 10 µm. As other examples, the thickness of AMO-containing layers of an electrode may be from 0.1 µm to 20 µm, from 1 µm to 15 µm, or from 5 µm to 10 µm. Values outside these ranges for a thickness of the electrode or an electrode may optionally be used, such as electrodes having thicknesses of up to 5 µm, 10 µm, 15 µm, 20 µm, 25 µm, 30 µm, 35 µm, 40 µm, 45 µm, or 50 µm, for example. However, the inventors have found that, for some embodiments, as described above, distinct carbonaceous and AMO-containing layers are not needed and that the electrode may optionally comprise a single or multiple AMO-containing layers or structures.

As another example, the amount and type of binder included in the electrode may be varied to achieve particular results. In some embodiments, large amounts of binder may be included in an electrode or an electrode layer. For example, the binder may be present in an electrode or an electrode layer at 10% to 50%, by weight, or in a similar amount as the carbonaceous material. The inventors have found that inclusion of a high or comparable amount of binder as the conductive carbon may be advantageous for forming good quality electrodes having useful structural and capacity characteristics. In some embodiments, the conductive carbon may have difficulty in forming a compacted structure on its own, and by including substantial amounts of binder, the ability to form useful carbonaceous and AMO-containing layers and/or electrodes may be improved.

As another example, a variety of current collector configurations may be used. As described above, a copper film current collector may be used. Other metal may alternatively be used, including aluminum, stainless steel, brass, titanium, etc. In addition, multiple current collectors may be used, such as in a configuration where the AMO-containing layers and/or carbonaceous layers may be positioned between the multiple current collectors. It will be appreciated that different current collectors may be used at the anode and the cathode. In addition, the current collector need not comprise a film, and may alternatively be constructed as a mesh, grid, pin, or other structure having any suitable thickness or dimensions. Current collectors may also be useful for temperature control, in some embodiments, and may serve as a heat sink or heat carrier for removal of excess thermal energy from the active material of a cell.

A coin-cell type battery cell was constructed and tested by repeated discharge-charge cycles. The cathode containing a $SnO_2$ AMO was assembled as described above using a glass separator, an electrolyte of 1 M $LiPF_6$ in 1:1:1 DEC/EC/DMC by volume, and a lithium metal anode. The cell was discharged from its as assembled open circuit voltage of 3.19 V to 0.01 V at a rate of C/10. The cell was then charged from 0.01 V to 1.5 V at a rate of C/10. After this the cell was repeatedly cycled from 1.5 V to 0.01 V and from 0.01 V to 1.5 V at a rate of C/5. While the voltages and charging rates here are merely examples, it will be appreciated that other charging and discharging rates may be used and that other charging and discharging voltages may be used. The cell was cycled for at least 111 charge-discharge cycles and the discharge capacity (mAh/g $SnO_2$ AMO) tabulated. Table 2, below, shows the discharge and charge capacities for each cycle.

TABLE 2

Discharge and charge capacities

| Cycle Number | Discharge Capacity (mAh/g) | Charge Capacity (mAh/g) |
|---|---|---|
| 1 | 10831.3 | 2662.62 |
| 2 | 2973.84 | 2421.68 |
| 3 | 2501.03 | 2222.64 |
| 4 | 2355.08 | 2174.04 |
| 5 | 2291.47 | 2139.19 |
| 6 | 2247.67 | 2111.76 |
| 7 | 2209.57 | 2087.83 |
| 8 | 2177.03 | 2065.89 |
| 9 | 2149.24 | 2047.6 |
| 10 | 2125.59 | 2030.36 |
| 11 | 2101.69 | 2013.46 |
| 12 | 2080.69 | 1997.5 |
| 13 | 2059.89 | 1981.24 |
| 14 | 2040.17 | 1966.72 |
| 15 | 2024.28 | 1953.37 |
| 16 | 2008.84 | 1942.08 |
| 17 | 1993.69 | 1929.4 |
| 18 | 1979.04 | 1917.43 |
| 19 | 1966.44 | 1908.6 |
| 20 | 1954.92 | 1898.9 |
| 21 | 1944.97 | 1891.23 |
| 22 | 1932.27 | 1880.72 |
| 23 | 1923.78 | 1874 |
| 24 | 1914.11 | 1866.1 |
| 25 | 1907.46 | 1860.21 |
| 26 | 1900.79 | 1855.01 |
| 27 | 1894.65 | 1850.32 |
| 28 | 1887.68 | 1844.6 |
| 29 | 1882.79 | 1840.91 |
| 30 | 1878.46 | 1837.21 |
| 31 | 1874.54 | 1835.35 |
| 32 | 1871.02 | 1831.98 |
| 33 | 1866.44 | 1827.26 |
| 34 | 1859.54 | 1822.82 |
| 35 | 1856.67 | 1821.53 |
| 36 | 1853.59 | 1819.6 |
| 37 | 1851.17 | 1816.69 |
| 38 | 1845.09 | 1812.14 |
| 39 | 1842.39 | 1810.32 |
| 40 | 1839.15 | 1807.1 |
| 41 | 1834.77 | 1803.97 |
| 42 | 1832.3 | 1802.13 |
| 43 | 1831.14 | 1801.41 |
| 44 | 1827.02 | 1797.32 |
| 45 | 1823.93 | 1795.17 |
| 46 | 1821.4 | 1793.15 |
| 47 | 1819.93 | 1792.26 |
| 48 | 1816.56 | 1788.62 |
| 49 | 1812.84 | 1785.92 |
| 50 | 1810.85 | 1783.93 |
| 51 | 1810.51 | 1783.87 |
| 52 | 1808.01 | 1781.22 |
| 53 | 1806.87 | 1780.98 |
| 54 | 1805.13 | 1779.63 |
| 55 | 1802.45 | 1777.16 |
| 56 | 1800.05 | 1775.29 |
| 57 | 1797.44 | 1773.06 |
| 58 | 1795.54 | 1771.9 |
| 59 | 1795.6 | 1771.34 |
| 60 | 1794.76 | 1770.37 |
| 61 | 1790.56 | 1767.23 |
| 62 | 1789.1 | 1765.94 |
| 63 | 1788.29 | 1765.07 |
| 64 | 1787.27 | 1764.56 |
| 65 | 1785.98 | 1762.92 |
| 66 | 1782.61 | 1760.38 |
| 67 | 1781.7 | 1758.88 |
| 68 | 1780.37 | 1757.5 |
| 69 | 1778.51 | 1756.19 |
| 70 | 1778.82 | 1756.4 |
| 71 | 1776.88 | 1754.59 |
| 72 | 1774.77 | 1753.22 |
| 73 | 1774.01 | 1752.07 |
| 74 | 1770.46 | 1749.82 |
| 75 | 1769.2 | 1748.57 |
| 76 | 1769.38 | 1748.77 |
| 77 | 1768.13 | 1747 |
| 78 | 1765.94 | 1745.88 |
| 79 | 1764.59 | 1744.82 |
| 80 | 1765.92 | 1746.01 |
| 81 | 1764.93 | 1745.57 |
| 82 | 1764.43 | 1744.88 |
| 83 | 1760.3 | 1741 |
| 84 | 1756.14 | 1737.34 |
| 85 | 1754.61 | 1736.06 |
| 86 | 1755.47 | 1736.32 |
| 87 | 1755.64 | 1736.73 |
| 88 | 1753.54 | 1735.07 |
| 89 | 1752.19 | 1734.21 |
| 90 | 1751.97 | 1733.89 |
| 91 | 1749.7 | 1731.48 |
| 92 | 1744.48 | 1726.11 |
| 93 | 1738.48 | 1721.23 |
| 94 | 1741.88 | 1723.88 |
| 95 | 1738.25 | 1719.81 |
| 96 | 1740.77 | 1722.4 |
| 97 | 1742.32 | 1723.85 |
| 98 | 1742.52 | 1723.86 |
| 99 | 1743.26 | 1724.59 |
| 100 | 1743.17 | 1723.9 |
| 101 | 1740.72 | 1722.31 |
| 102 | 1739.06 | 1721.01 |
| 103 | 1738.7 | 1720.81 |
| 104 | 1738.64 | 1721.39 |
| 105 | 1738.72 | 1720.88 |
| 106 | 1736.25 | 1717.86 |
| 107 | 1733.64 | 1716.71 |
| 108 | 1730.86 | 1714.26 |
| 109 | 1728.66 | 1712.09 |
| 110 | 1725.84 | 1710.23 |
| 111 | 1726.15 | 1709.76 |

Figure 19:
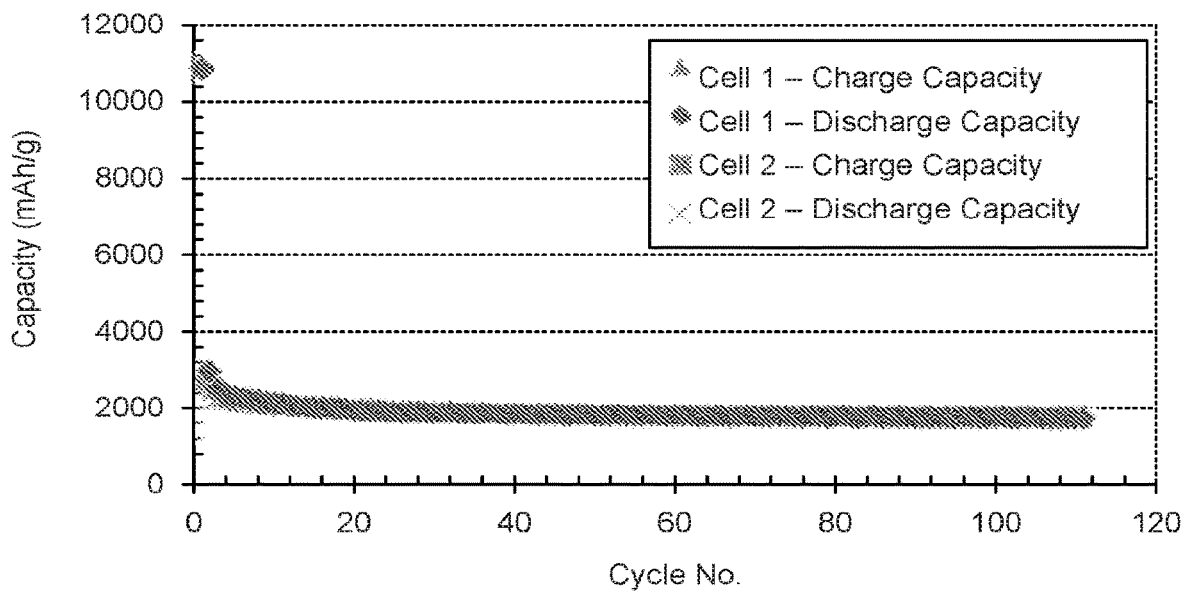
FIG. 19 provides data showing cell capacity as a function of the number of charge-discharge cycles obtained during cycling of the cell.
Figure 20:
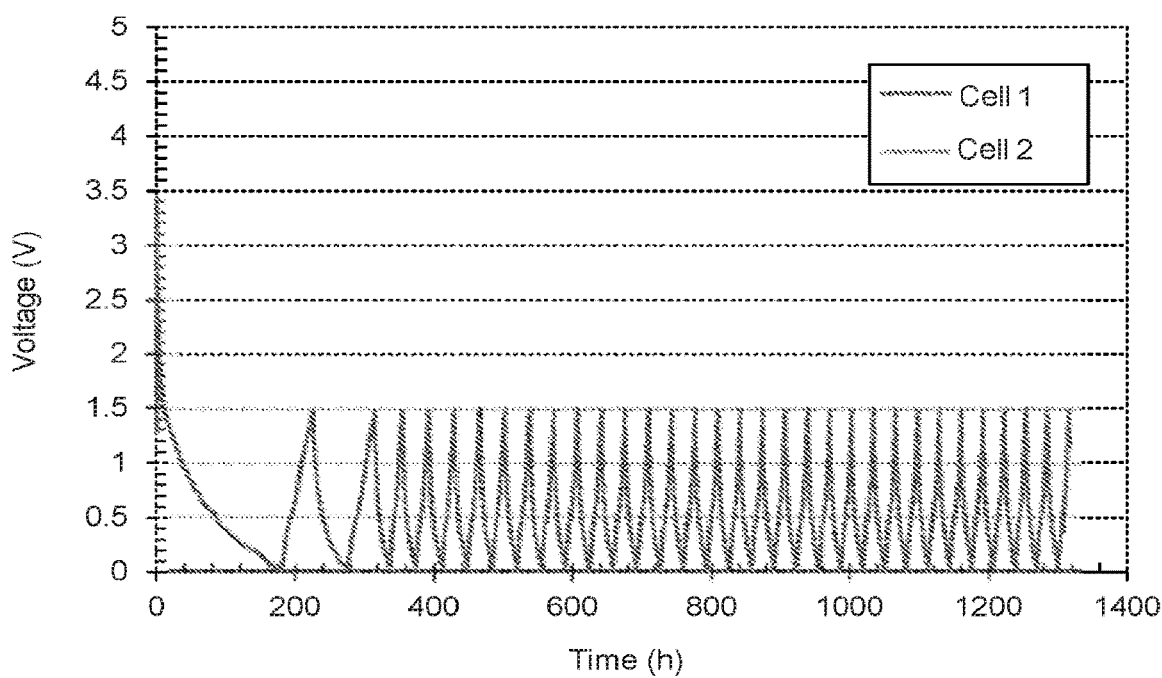
FIG. 20 provides data showing cell voltage as a function of time for a number of charge-discharge cycles obtained during cycling of the cell.

FIG. 19 provides data showing cell cycles as a function of observed charge capacity (CC) and discharge capacity (DC) in mAh/g $SnO_2$ AMO. As shown in Table 2 and FIG. 19, a very high initial discharge capacity of 10,831 mAh/g is seen. This initial discharge capacity includes irreversible lithiation capacity within the cell. The reversible delithiation capacity starts at 2,662 mAh/, as reflected in Table 2. It should be appreciated that this very large initial lithiation capacity would be available in any system deploying the cell for primary use from an as-assembled state. FIG. 20 provides a plot of voltage over time during cycling of a cell as constructed above.

It should also be appreciated that the initial discharge occurs from the open circuit voltage of about 3.2 volts to about 0.01 V, while the cycling of charging and discharging takes place between 0.01 V and 1.5 V. Optionally, cycling of charging and discharging may take place at higher upper limits, such as 2.0 V, 2.5 V, 3.0 V, or 3.2 V, for example. By cycling at higher upper voltage limits, although still below the as-assembled open circuit voltage, an amount of the capacity identified above as irreversible may be retained as reversible capacity.

The unusual capacities also posit a novel "hybrid" battery system featuring a very long first discharge cycle utilizing the high initial lithiation capacity, followed by shorter, but reversible, cycling at the lower delithiation capacity. There is no such system currently in the marketplace.

The capacities as revealed by testing roughly translate to an energy density of 12,584 Whr/kg $SnO_2$, depending on the voltage range selected for cycling. This is an energy density comparable to that of gasoline (12,889 Whr/kg) and is, to the inventor's knowledge, the highest energy density achieved in any battery material to date.

Figure 21:
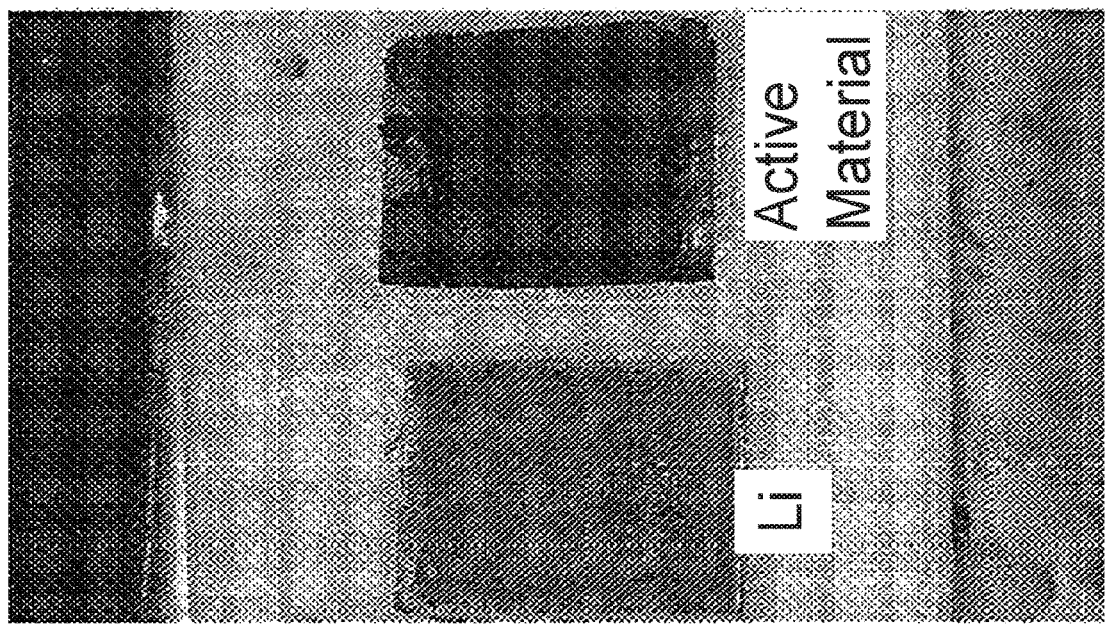
FIG. 21 provides photographs of components of a pouch-type cell disassembled after 103 charge-discharge cycles.
Figure 21:
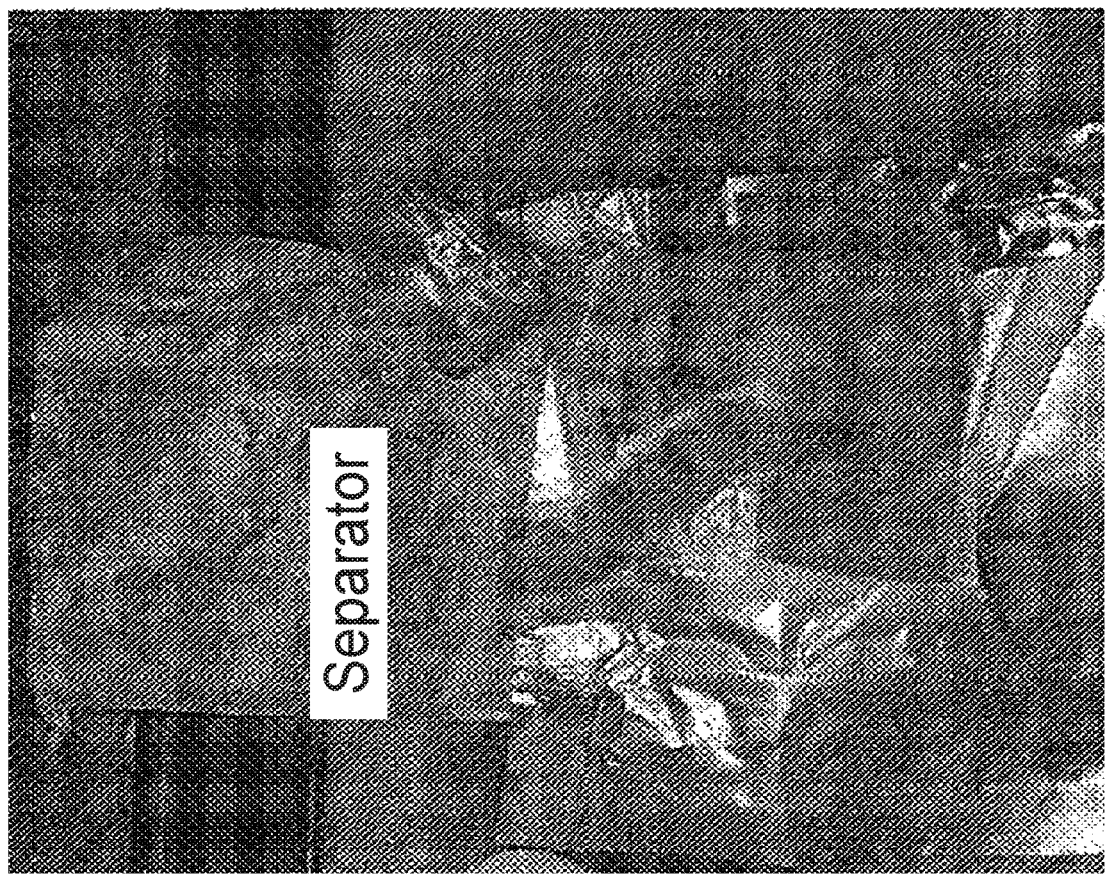

FIG. 21 provides an image of a pouch-type cell constructed as described above, which was disassembled after 103 cycles. The clear and intact separator shows that lithium plating is not occurring and cannot be the source of the excess capacity exhibited by the cells. The cathode (appears black on a copper current collector), comprising AMO $SnO_2$ is intact, remains well-attached to the current collector, and has not experienced mechanical degradation. This exceptional capacity measurement is in direct contrast the teaching of the scientific literature, which asserts that even capacities as high as about 1000 mAh/g in oxide materials leads to inevitable volumetric changes and subsequent mechanical breakdown of electrodes. In contrast, the embodiments disclosed herein exhibit capacities as large as 10× this capacity without exhibiting significant volumetric change and accompanying mechanical structural change.

Again, without wishing to be bound by any theory, the inventor believes that the structure of the disclosed cells having a lithium metal anode and a cathode comprising an AMO material with incredible lithiation capacity allow for such high capacities due, in part, to the low levels of active material (AMO) in the cathode, such as between 10% and 30%, by weight. The low active material loading may provide sufficient space for the large amount of lithium atoms to be taken up and stored in the cathode during discharge. An optimal loading of about 20-25% may represent a transition point where lower loadings do not provide sufficient active material or sufficient active sites for reaction and uptake of lithium atoms, while higher loadings may not provide suitable volume for lithium atoms to be taken up.

The specific energy densities of the disclosed AMO-based electrochemical cells described herein are novel and taught to be impossible by the scientific literature. Such results may be possible here because they proceed by a novel mechanism outside of those currently taught or understood by those of skill in the art, leading to the potential that even higher capacities than those disclosed herein can be achieved. The new availability of such energy density may inevitably lead to other electrodes and batteries, which may embody such things as unusual shapes and sizes, new electrolyte systems, separators, and current collectors. The disclosed and claimed electrodes, cells, and batteries should not be seen as limited to the ancillary components that are presently available in the open marketplace or disclosed herein or in the literature. Instead, it will be appreciated that the disclosed and claimed electrodes, cells, and batteries may take on any suitable shape, size, or configuration, incorporate any suitable electrolyte, current collector, or separator, and employ any suitable discharge and/or charge profile.

The invention may be further understood by reference to the following non-limiting examples, which describe formation of an electrode for an electrochemical cell including a first electrode comprising a metal oxide (i.e., an AMO) and a second electrode including metallic lithium. The first electrode was constructed to include 80 weight percent of the metal oxide, consistent with conventional practice for forming electrochemical cells in the battery industry. As described above, the capacities for such electrochemical cells may be significantly improved by reducing the amount of metal oxide in the first electrode to an amount less than 80 percent by weight, such as 5-15%, 20-35%, or 55-70%. The following examples are illustrative of example chemistries that may be optimized by construction of electrochemical cells with smaller metal oxide weight percents.

Example 1: AMO of Tin Oxide Functionalized by Acetate/Chloride

Figure 22:
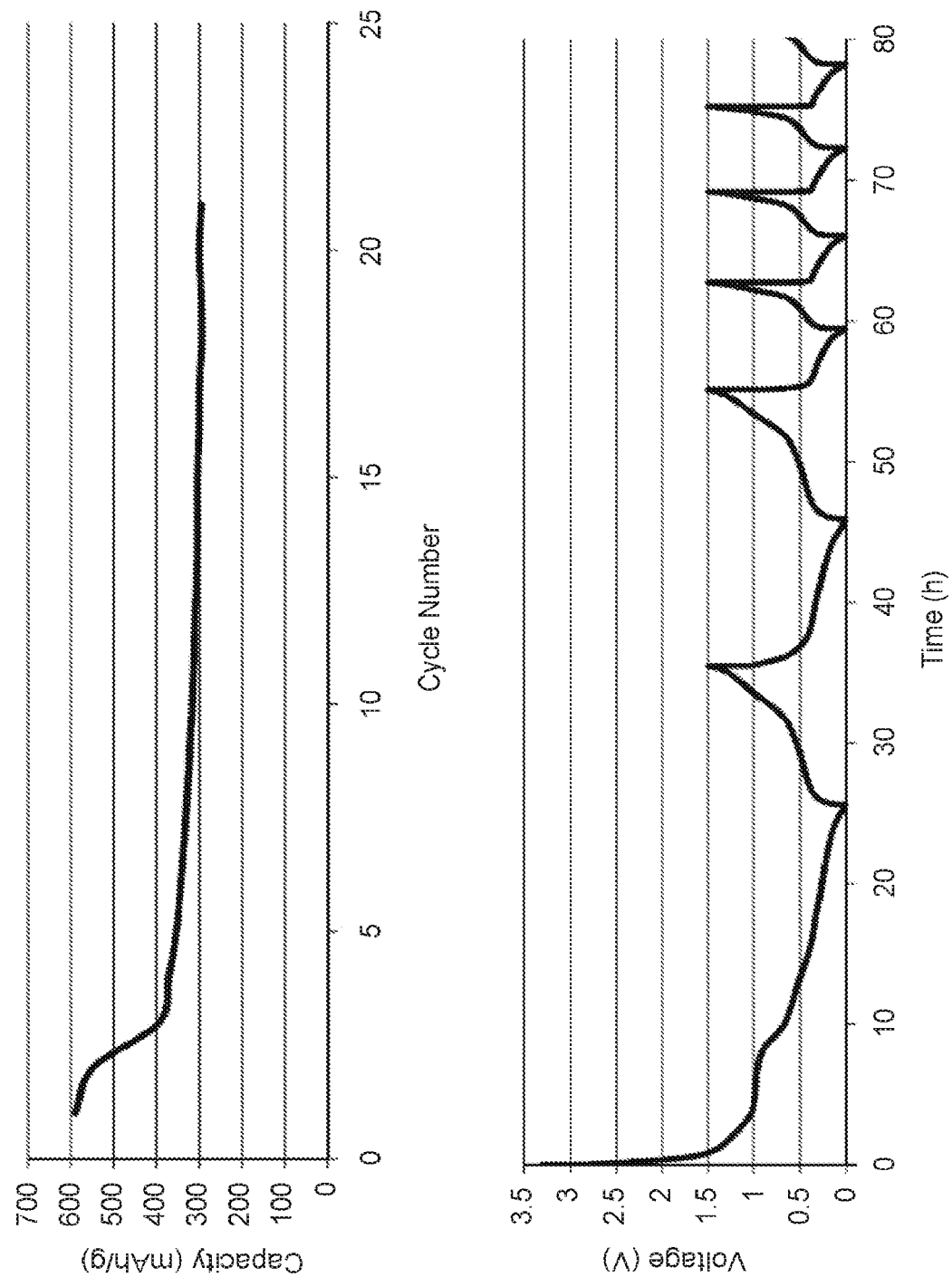
FIG. 22 provides data including a plot of measured capacity versus cycle number as well as a plot of the voltage as a function of time during cycling for a battery cell including an electrode comprising an AMO material.

A tin oxide AMO was synthesized using a single-pot hydrothermal synthesis method. Briefly, tin acetate (Sn $(CH_3COO)_2$) was dissolved in an ethanol/water solution and acidified by addition of hydrochloric acid (HCl). The resultant AMO nanomaterial was a soft, grey material and was formed into an electrode. The electrode was assembled in a battery cell against lithium metal and cycled by discharging to zero volts, followed by charging to 1.5 volts. FIG. 22 depicts a plot of the measured capacity versus cycle number, as well as a plot of the voltage as a function of time during cycling.

Example 2: AMO of Tin Oxide Functionalized by Acetate/sulfate

Figure 23:
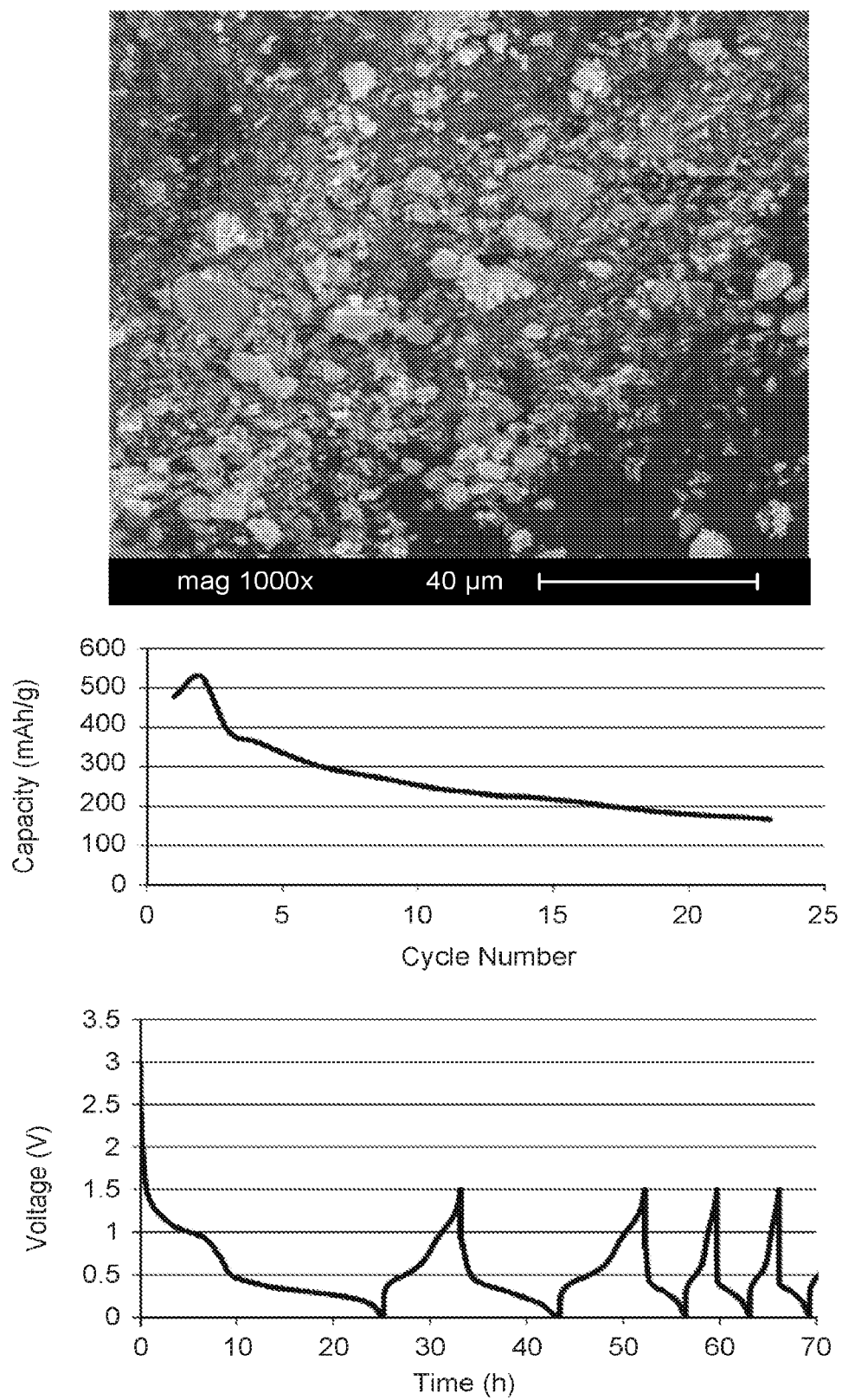
FIG. 23 provides an electron micrograph image of an AMO material and data including a plot of measured capacity versus cycle number as well as a plot of the voltage as a function of time during cycling for a battery cell including an electrode comprising the AMO material.

A tin oxide AMO was synthesized using a single-pot hydrothermal synthesis method. Briefly, tin acetate (Sn $(CH_3COO)_2$) was dissolved in an ethanol/water solution and acidified by addition of sulfuric acid ($H_2SO_4$). The resultant AMO nanomaterial was a grey, flaky material and was formed into an electrode. The electrode was assembled in a battery cell against lithium metal and cycled by discharging to zero volts, followed by charging to 1.5 volts. FIG. 23 depicts an electron micrograph image of the AMO nanomaterial, a plot of the measured capacity versus cycle number, as well as a plot of the voltage as a function of time during cycling.

Example 3: AMO of Tin Oxide Functionalized by Acetate/Nitrate

Figure 24:
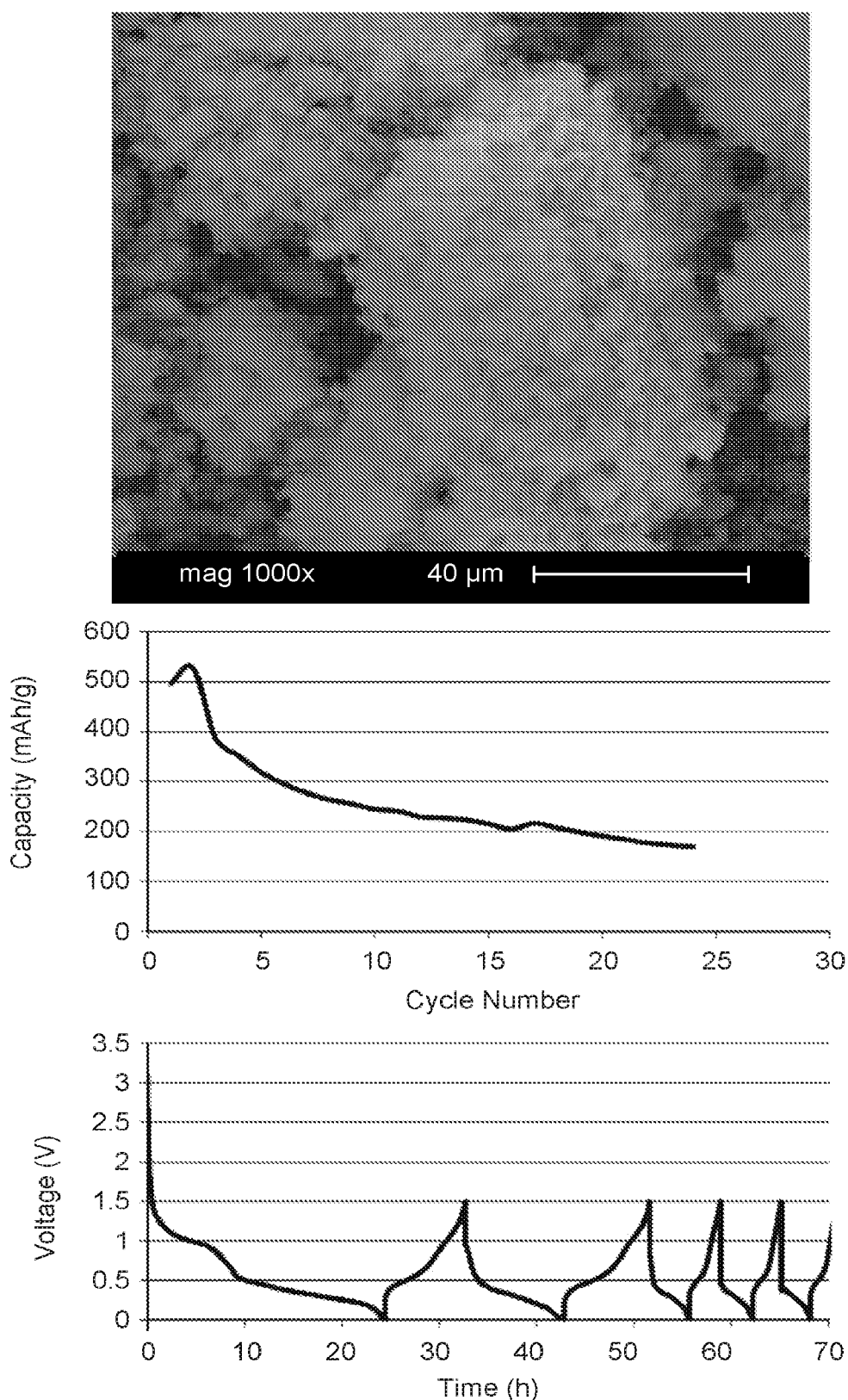
FIG. 24 provides an electron micrograph image of an AMO material and data including a plot of measured capacity versus cycle number as well as a plot of the voltage as a function of time during cycling for a battery cell including an electrode comprising the AMO material.

A tin oxide AMO was synthesized using a single-pot hydrothermal synthesis method. Briefly, tin acetate (Sn $(CH_3COO)_2$) was dissolved in an ethanol/water solution and acidified by addition of nitric acid ($HNO_3$). The resultant AMO nanomaterial was a grey, flaky material and was formed into an electrode. The electrode was assembled in a battery cell against lithium metal and cycled by discharging to zero volts, followed by charging to 1.5 volts. FIG. 24 depicts an electron micrograph image of the AMO nanomaterial, a plot of the measured capacity versus cycle number, as well as a plot of the voltage as a function of time during cycling.

Example 4: AMO of Tin Oxide Functionalized by Acetate/Phosphate

Figure 25:
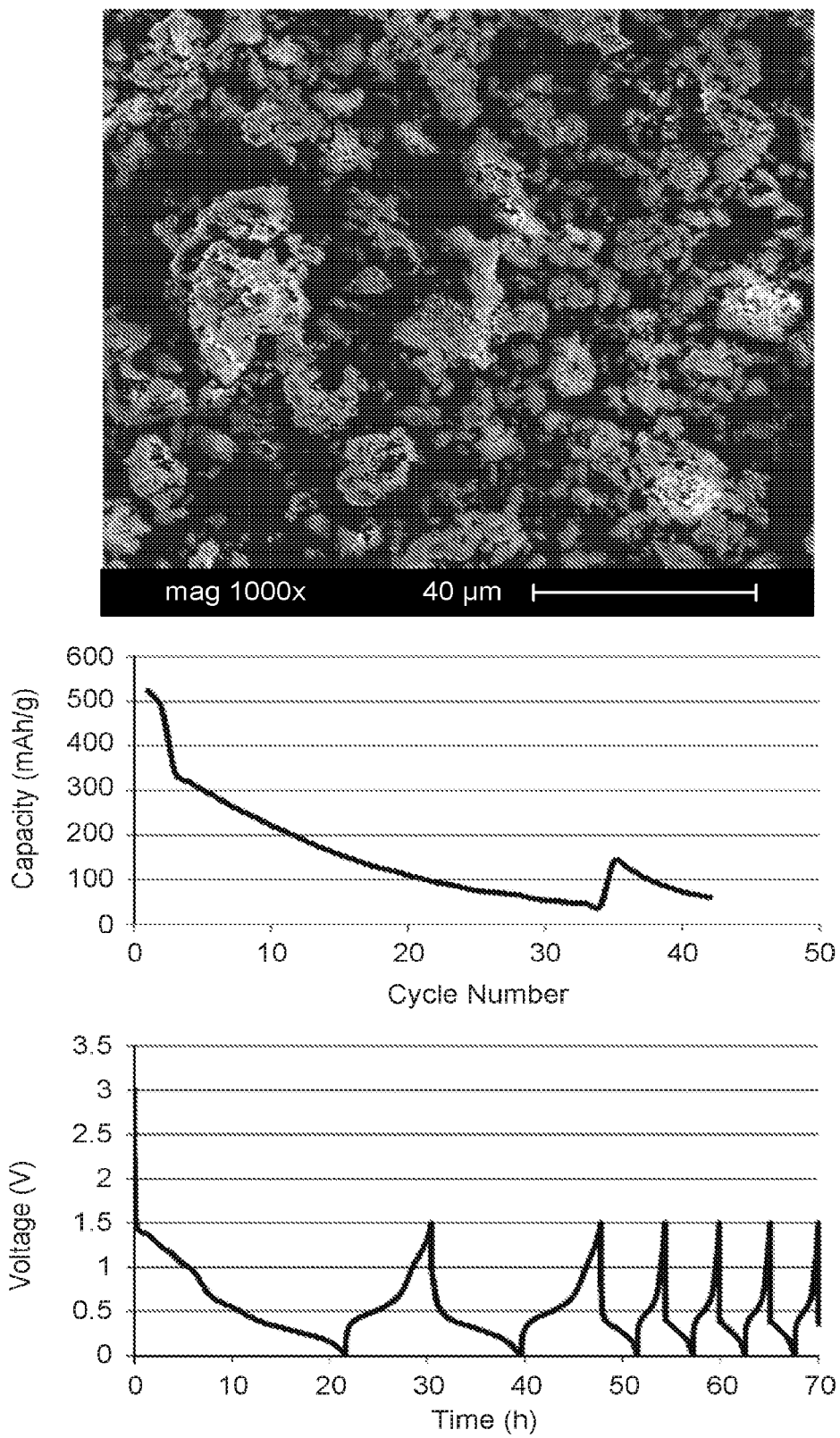
FIG. 25 provides an electron micrograph image of an AMO material and data including a plot of measured capacity versus cycle number as well as a plot of the voltage as a function of time during cycling for a battery cell including an electrode comprising the AMO material.

A tin oxide AMO was synthesized using a single-pot hydrothermal synthesis method. Briefly, tin acetate (Sn $(CH_3COO)_2$) was dissolved in an ethanol/water solution and acidified by addition of phosphoric acid ($H_3PO_4$). The resultant AMO nanomaterial was a brown, soft, flaky material and was formed into an electrode. The electrode was assembled in a battery cell against lithium metal and cycled by discharging to zero volts, followed by charging to 1.5 volts. FIG. 25 depicts an electron micrograph image of the AMO nanomaterial, a plot of the measured capacity versus cycle number, as well as a plot of the voltage as a function of time during cycling.

Example 5: AMO of Tin Oxide Functionalized by Acetate/Citrate

Figure 26:
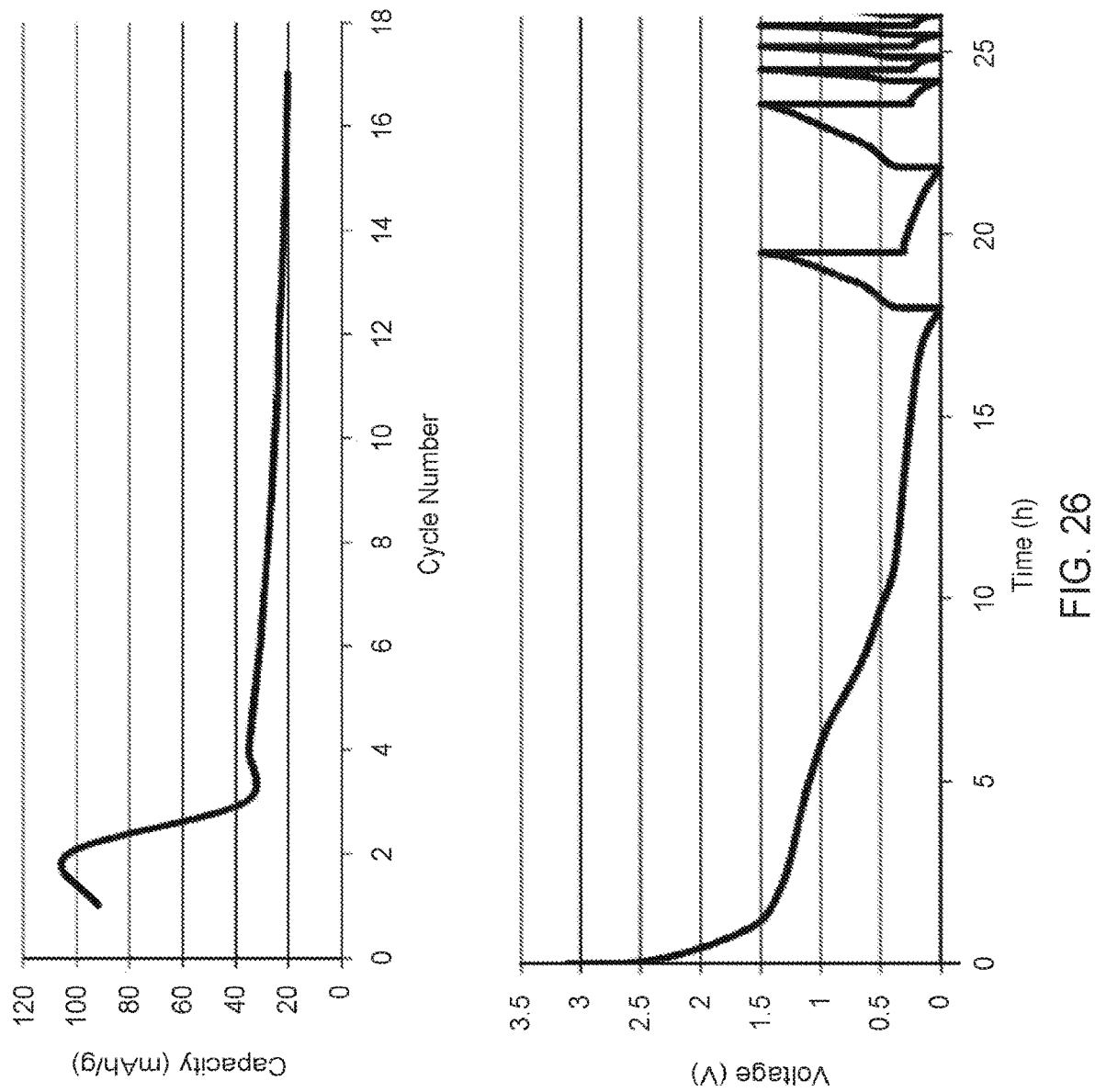
FIG. 26 provides data including a plot of measured capacity versus cycle number as well as a plot of the voltage as a function of time during cycling for a battery cell including an electrode comprising an AMO material.

A tin oxide AMO was synthesized using a single-pot hydrothermal synthesis method. Briefly, tin acetate (Sn(CH$_3$COO)$_2$) was dissolved in an ethanol/water solution and acidified by addition of citric acid (C$_6$H$_8$O$_7$). The resultant AMO nanomaterial was a brown, flaky material and was formed into an electrode. The electrode was assembled in a battery cell against lithium metal and cycled by discharging to zero volts, followed by charging to 1.5 volts. FIG. 26 depicts a plot of the measured capacity versus cycle number, as well as a plot of the voltage as a function of time during cycling.

Example 6: AMO of Tin Oxide Functionalized by Acetate/Citrate

Figure 27:
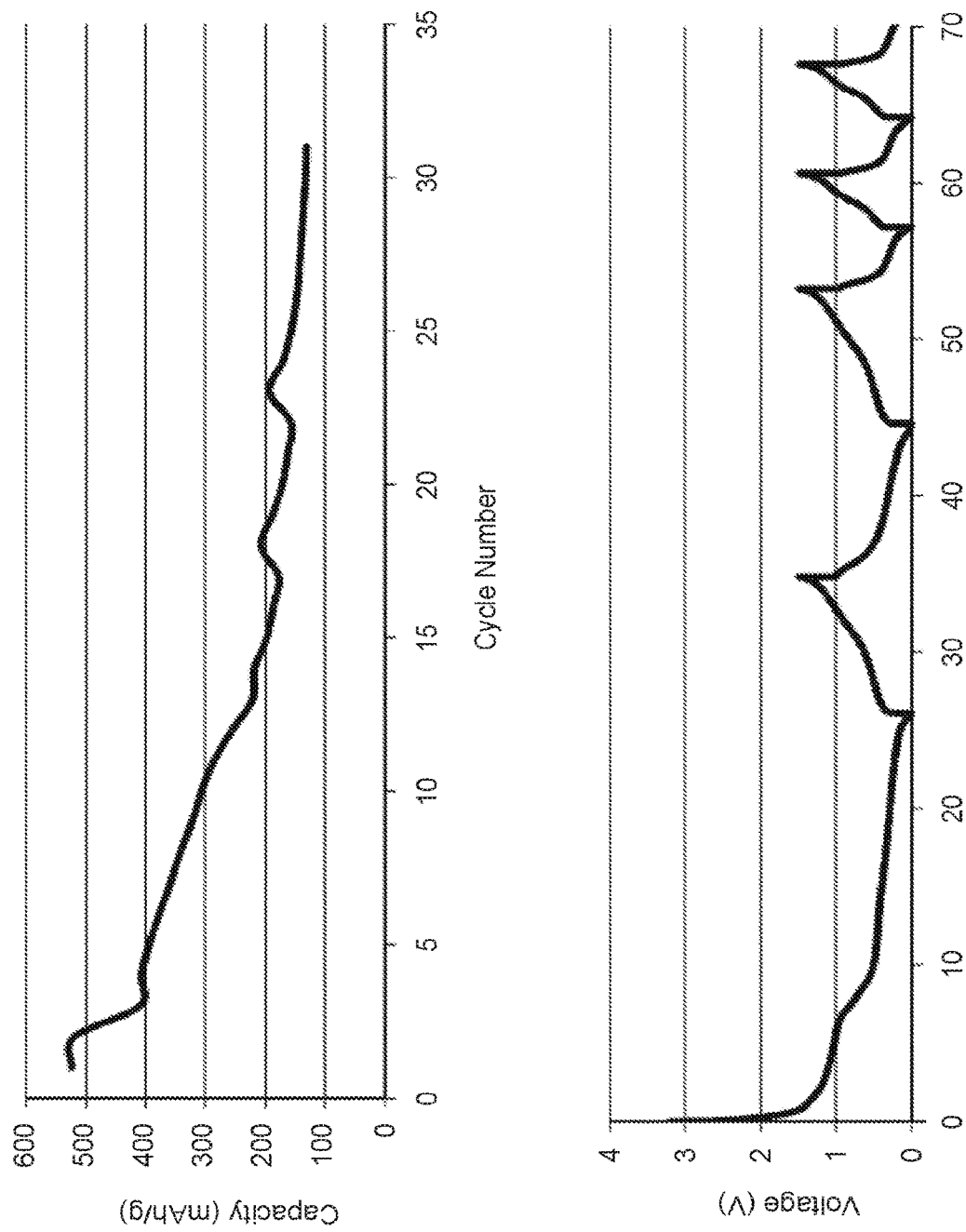
FIG. 27 provides data including a plot of measured capacity versus cycle number as well as a plot of the voltage as a function of time during cycling for a battery cell including an electrode comprising an AMO material.

A tin oxide AMO was synthesized using a single-pot hydrothermal synthesis method. Briefly, tin acetate (Sn(CH$_3$COO)$_2$) was dissolved in an ethanol/water solution and acidified by addition of oxalic acid (C$_2$H$_2$O$_4$). The resultant AMO nanomaterial was a taupe, flaky material and was formed into an electrode. The electrode was assembled in a battery cell against lithium metal and cycled by discharging to zero volts, followed by charging to 1.5 volts. FIG. 27 depicts a plot of the measured capacity versus cycle number, as well as a plot of the voltage as a function of time during cycling.

Figure 28:
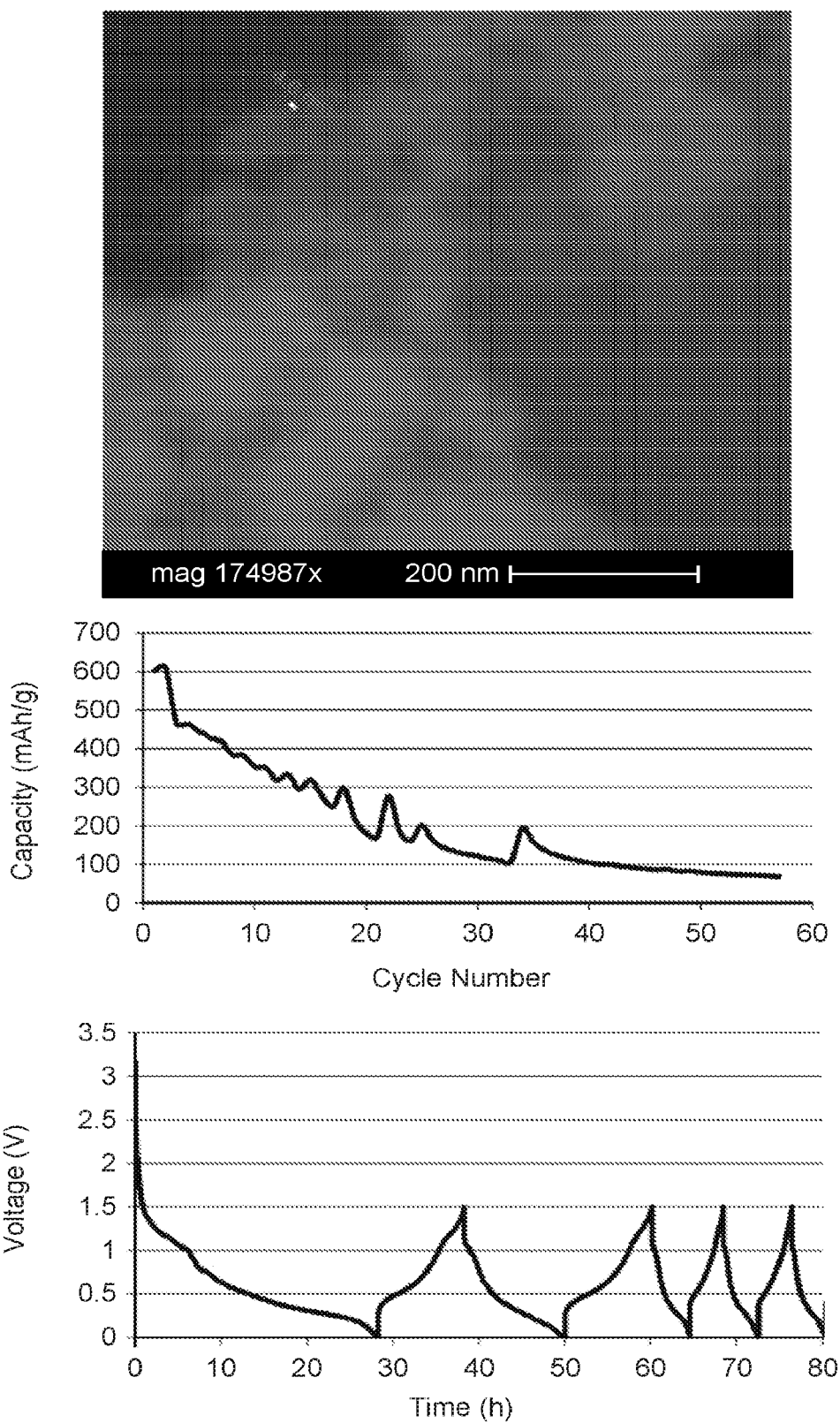
FIG. 28 provides an electron micrograph image of an AMO material and data including a plot of measured capacity versus cycle number as well as a plot of the voltage as a function of time during cycling for a battery cell including an electrode comprising the AMO material.

Example 7: AMO of Tin Oxide Doped with Iron Oxide and Functionalized by Acetate/Chloride A doped tin oxide AMO was synthesized using a single-pot hydrothermal synthesis method. Briefly, tin acetate (Sn(CH$_3$COO)$_2$) was dissolved in an ethanol/water solution with a lesser amount of iron acetate. The solution was acidified by addition of hydrochloric acid (HCl). The resultant AMO nanomaterial was a soft and flaky, creamy grey material and was formed into an electrode. The electrode was assembled in a battery cell against lithium metal and cycled by discharging to zero volts, followed by charging to 1.5 volts. FIG. 28 depicts an electron micrograph image of the AMO nanomaterial, a plot of the measured capacity versus cycle number, as well as a plot of the voltage as a function of time during cycling.

Figure 29:
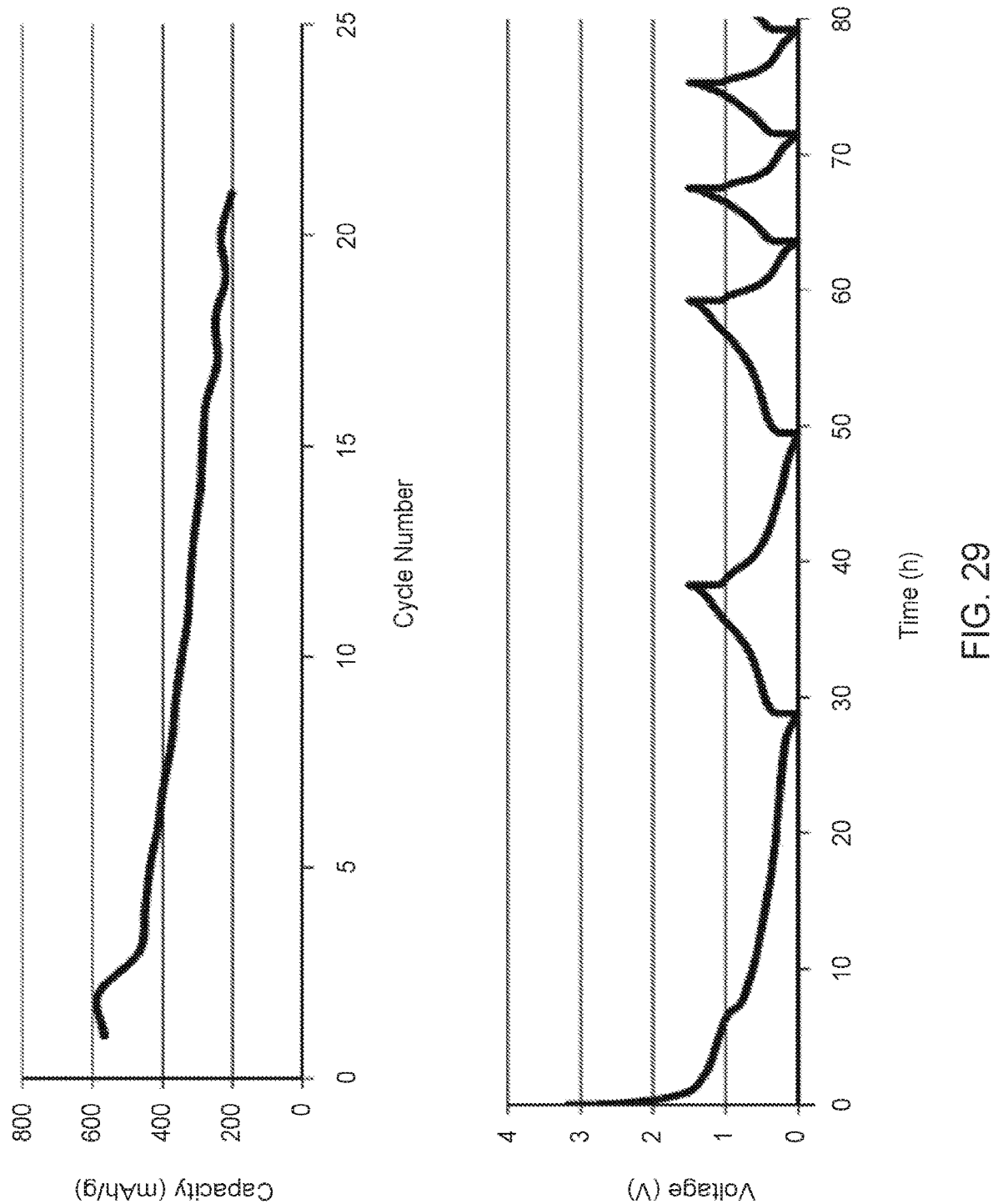
FIG. 29 provides data including a plot of measured capacity versus cycle number as well as a plot of the voltage as a function of time during cycling for a battery cell including an electrode comprising an AMO material.

Example 8: AMO of Tin Oxide Doped with Iron Oxide and Functionalized by Acetate/Sulfate A doped tin oxide AMO was synthesized using a single-pot hydrothermal synthesis method. Briefly, tin acetate (Sn(CH$_3$COO)$_2$) was dissolved in an ethanol/water solution with a lesser amount of iron acetate. The solution was acidified by addition of sulfuric acid (H$_2$SO$_4$). The resultant AMO nanomaterial was a pale, taupe colored, soft, flaky material and was formed into an electrode. The electrode was assembled in a battery cell against lithium metal and cycled by discharging to zero volts, followed by charging to 1.5 volts. FIG. 29 depicts a plot of the measured capacity versus cycle number, as well as a plot of the voltage as a function of time during cycling.

Figure 30:
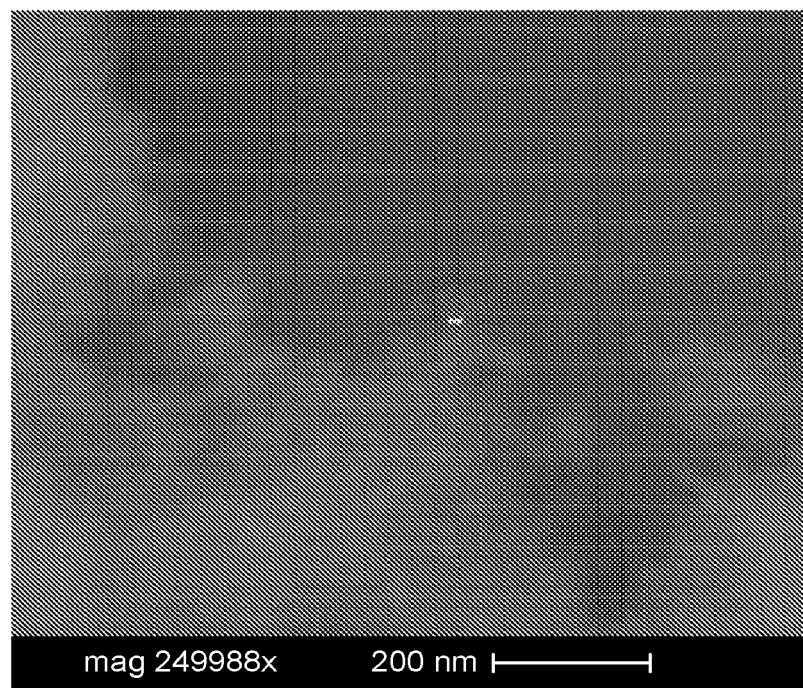
FIG. 30 provides an electron micrograph image of an AMO material and data including a plot of measured capacity versus cycle number as well as a plot of the voltage as a function of time during cycling for a battery cell including an electrode comprising the AMO material.
Figure 30:
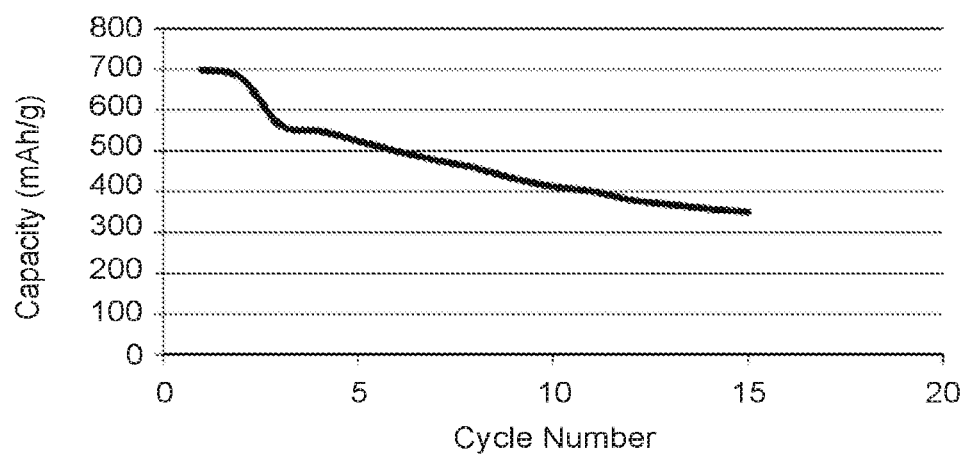
Figure 30:
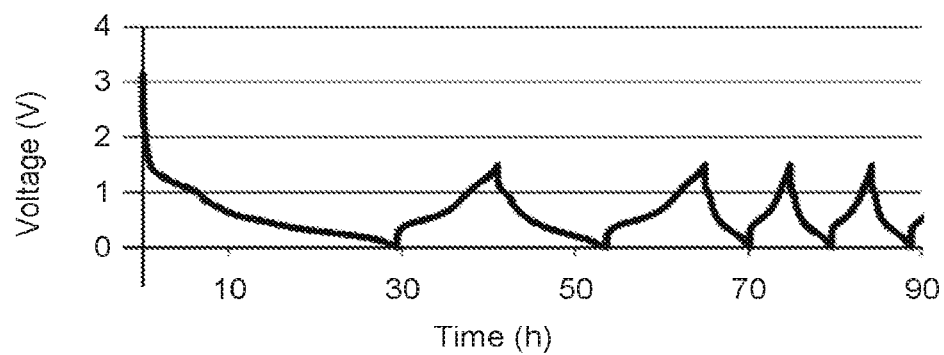

Example 9: AMO of Tin Oxide Doped with Iron Oxide and Functionalized by Acetate/Nitrate Two doped tin oxide AMO samples were synthesized using a single-pot hydrothermal synthesis method. Briefly, tin acetate (Sn(CH$_3$COO)$_2$) was dissolved in an ethanol/water solution with a lesser amount of iron acetate (Fe(CH$_3$COO)$_3$). The solution was acidified by addition of nitric acid (HNO$_3$). The resultant AMO nanomaterial was a soft, white material and was formed into an electrode. The electrode was assembled in a battery cell against lithium metal and cycled by discharging to zero volts, followed by charging to 1.5 volts. FIG. 30 depicts an electron micrograph image of the AMO nanomaterial, a plot of the measured capacity versus cycle number, as well as a plot of the voltage as a function of time during cycling.

Figure 31:
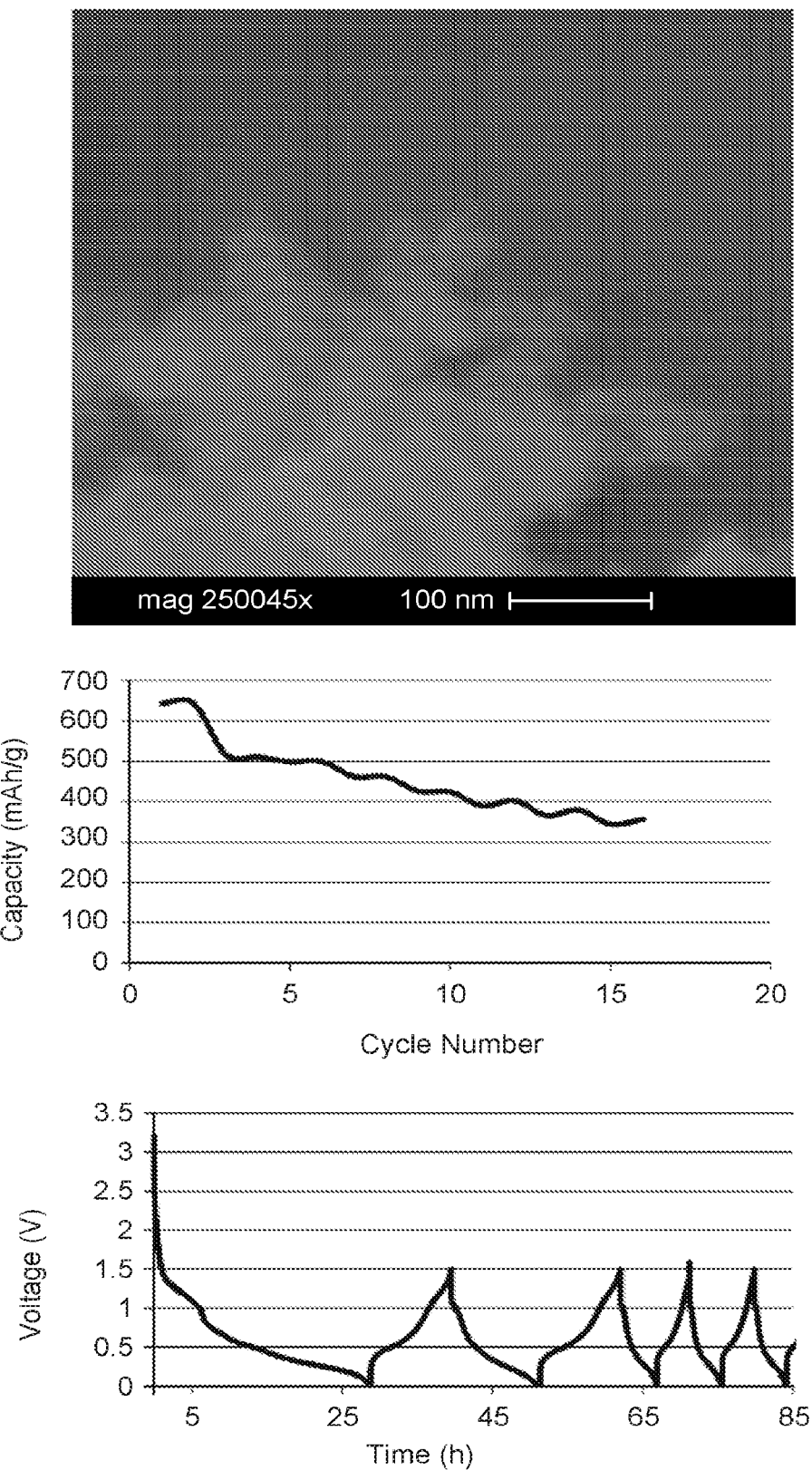
FIG. 31 provides an electron micrograph image of an AMO material and data including a plot of measured capacity versus cycle number as well as a plot of the voltage as a function of time during cycling for a battery cell including an electrode comprising the AMO material.

Example 10: AMO of Tin Oxide Doped with Iron Oxide and Functionalized by Acetate/Oxalate A doped tin oxide AMO was synthesized using a single-pot hydrothermal synthesis method. Briefly, tin acetate (Sn(CH$_3$COO)$_2$) was dissolved in an ethanol/water solution with a lesser amount of iron acetate (Fe(CH$_3$COO)$_3$). The solution was acidified by addition of oxalic acid (C$_2$H$_2$O$_4$). The resultant AMO nanomaterial was a soft, white material and was formed into an electrode. The electrode was assembled in a battery cell against lithium metal and cycled by discharging to zero volts, followed by charging to 1.5 volts. FIG. 31 depicts an electron micrograph image of the AMO nanomaterial, a plot of the measured capacity versus cycle number, as well as a plot of the voltage as a function of time during cycling.

Figure 32:
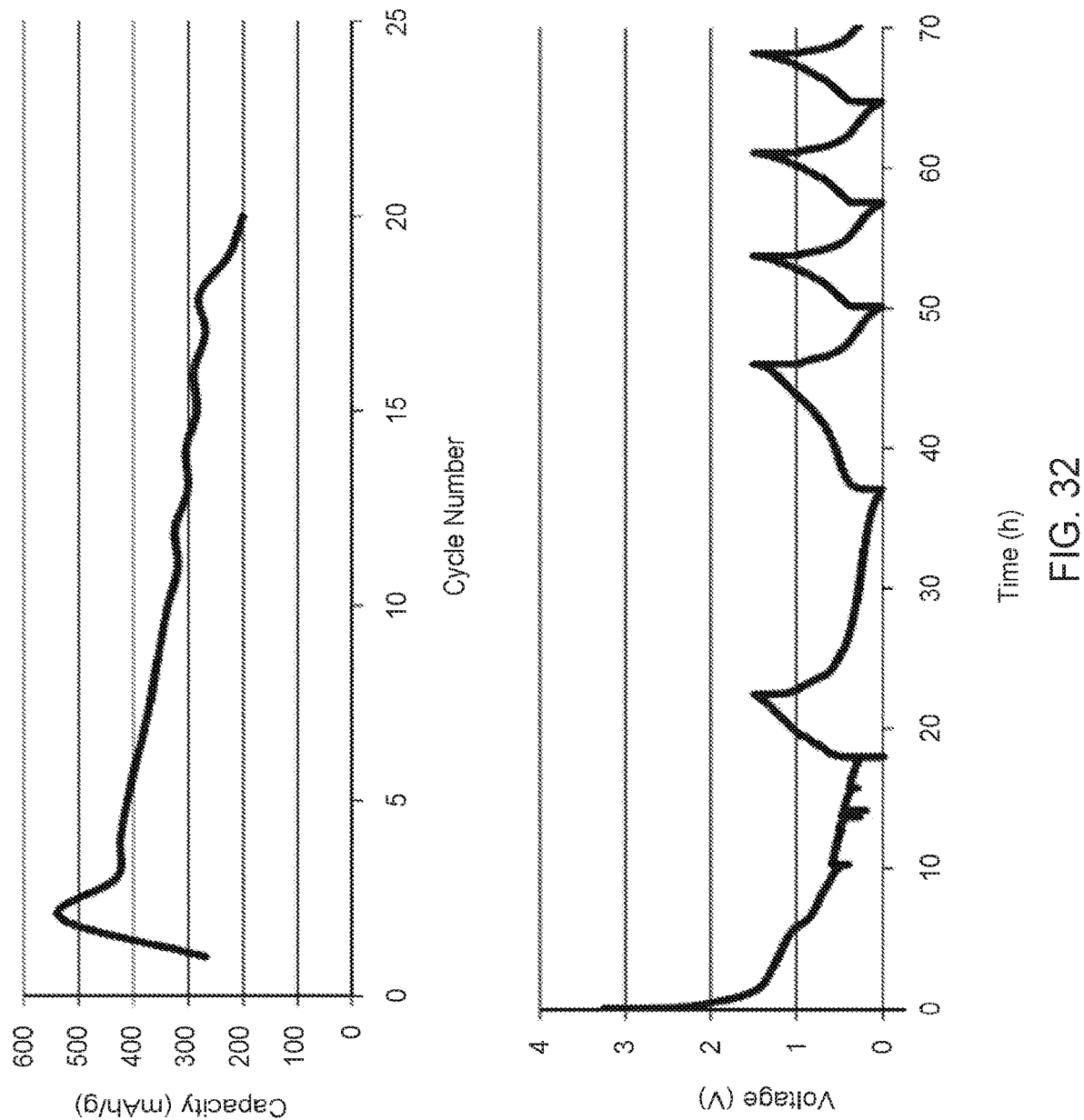
FIG. 32 provides data including a plot of measured capacity versus cycle number as well as a plot of the voltage as a function of time during cycling for a battery cell including an electrode comprising an AMO material.

Example 11: AMO of Tin Oxide Doped with Iron Oxide and Functionalized by Acetate/Phosphate A doped tin oxide AMO was synthesized using a single-pot hydrothermal synthesis method. Briefly, tin acetate (Sn(CH$_3$COO)$_2$) was dissolved in an ethanol/water solution with a lesser amount of iron acetate (Fe(CH$_3$COO)$_3$). The solution was acidified by addition of phosphoric acid (H$_2$SO$_4$). The resultant AMO nanomaterial was a white, flaky material and was formed into an electrode. The electrode was assembled in a battery cell against lithium metal and cycled by discharging to zero volts, followed by charging to 1.5 volts. FIG. 32 depicts a plot of the measured capacity versus cycle number, as well as a plot of the voltage as a function of time during cycling.

Figure 33:
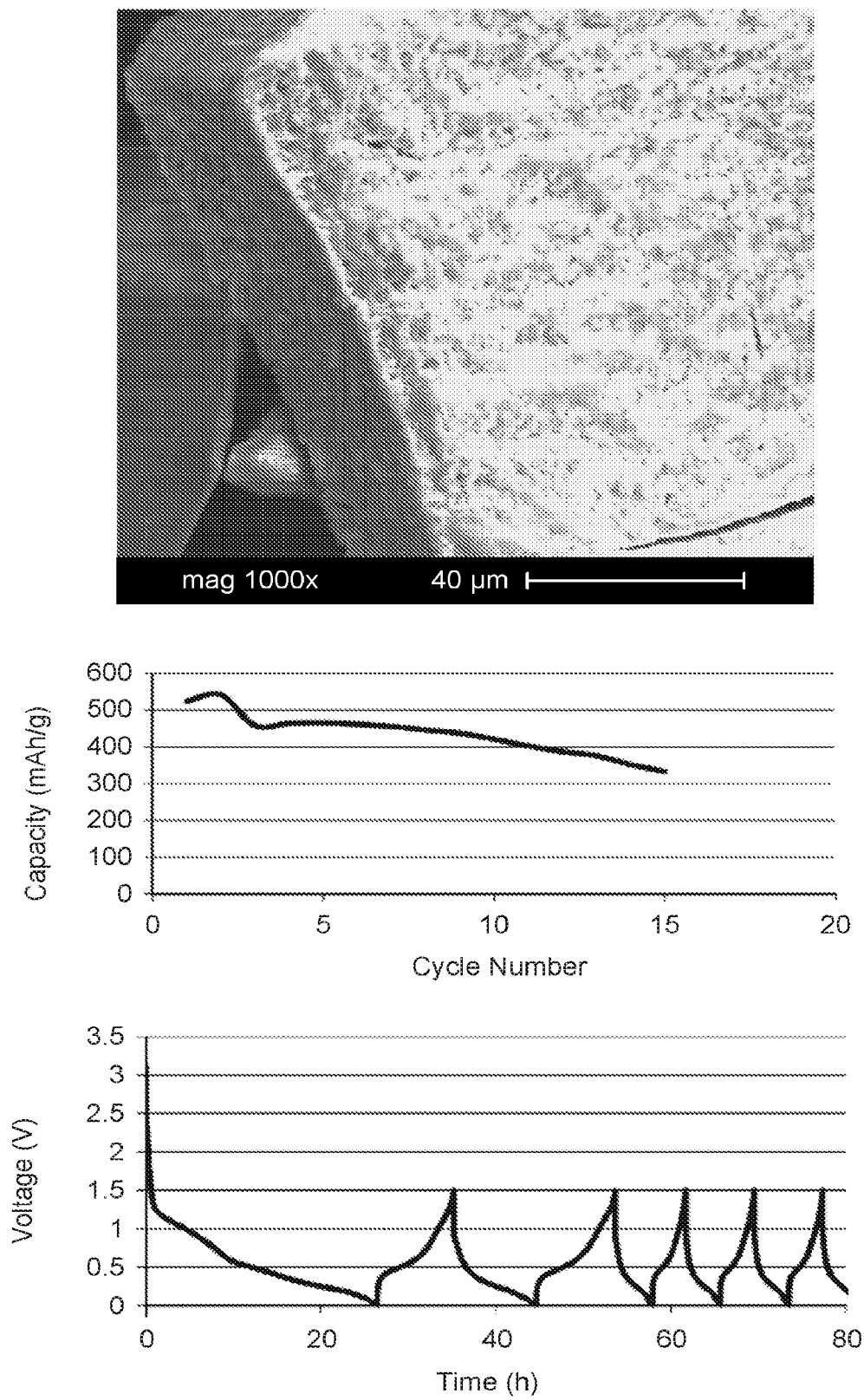
FIG. 33 provides an electron micrograph image of a synthesized material and data including a plot of measured capacity versus cycle number as well as a plot of the voltage as a function of time during cycling for a battery cell including an electrode comprising the synthesized material.

Example 12: TIN Oxide Doped with Iron Oxide and Functionalized by Acetate/Citrate A doped tin oxide was synthesized using a single-pot hydrothermal synthesis method. Briefly, tin acetate (Sn(CH$_3$COO)$_2$) was dissolved in an ethanol/water solution with a lesser amount of iron acetate (Fe(CH$_3$COO)$_3$). The solution was acidified by addition of citric acid (C$_6$H$_8$O$_7$). The resultant material did not form particles, and was a yellow, glassy hard material, which was formed into an electrode. The electrode was assembled in a battery cell against lithium metal and cycled by discharging to zero volts, followed by charging to 1.5 volts. FIG. 33 depicts an electron micrograph image of the AMO nanomaterial, a plot of the measured capacity versus cycle number, as well as a plot of the voltage as a function of time during cycling.

Example 13: AMO of Tin Oxide Functionalized by Acetate/Bromide

Figure 34:
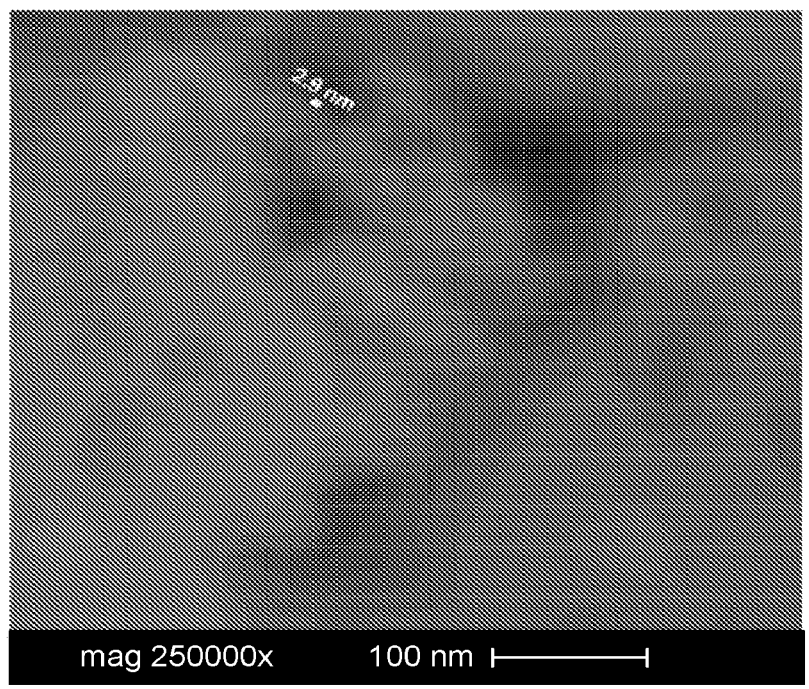
FIG. 34 provides an electron micrograph image of an AMO material and data including a plot of measured capacity versus cycle number as well as a plot of the voltage as a function of time during cycling for a battery cell including an electrode comprising the AMO material.
Figure 34:
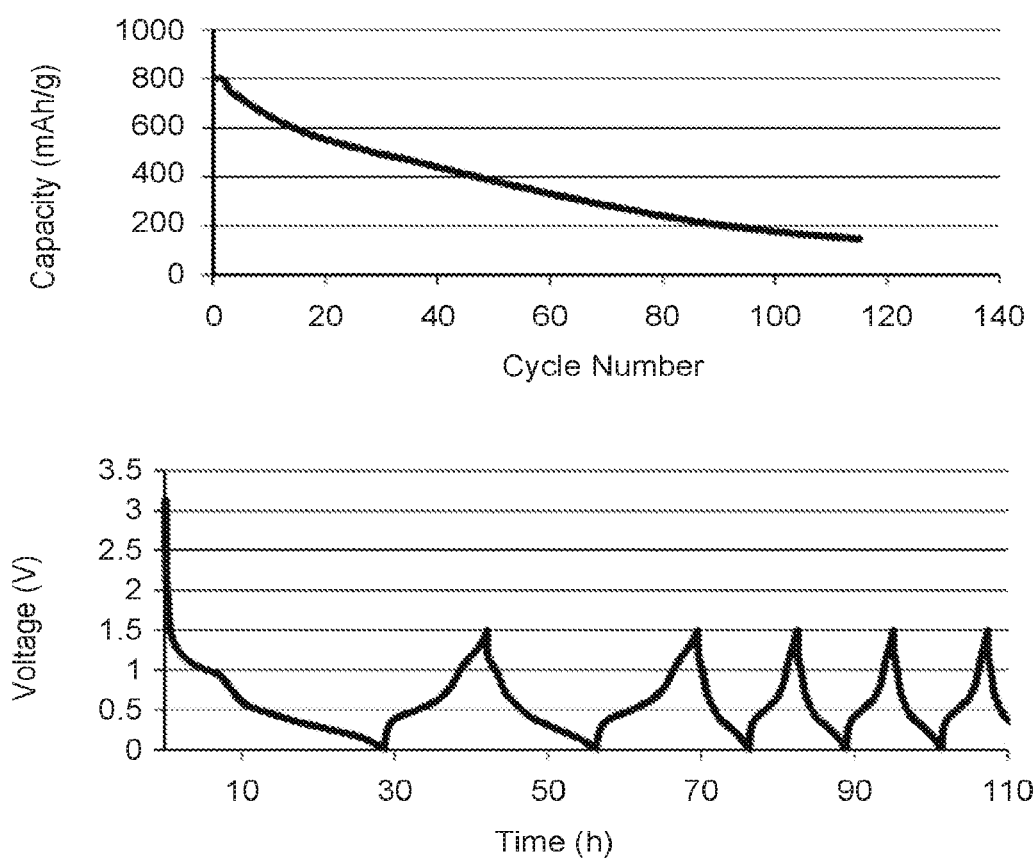

A tin oxide AMO was synthesized using a single-pot hydrothermal synthesis method. Briefly, tin acetate (Sn ($CH_3COO)_2$) was dissolved in an ethanol/water solution and acidified by addition of hydrobromic acid (HBr). The resultant AMO nanomaterial was a grey, soft, powdery material and was formed into an electrode. The electrode was assembled in a battery cell against lithium metal and cycled by discharging to zero volts, followed by charging to 1.5 volts. FIG. 34 depicts an electron micrograph image of the AMO nanomaterial, a plot of the measured capacity versus cycle number, as well as a plot of the voltage as a function of time during cycling.

Example 14: AMO of Tin Oxide Functionalized by Acetate/Borate

Figure 35:
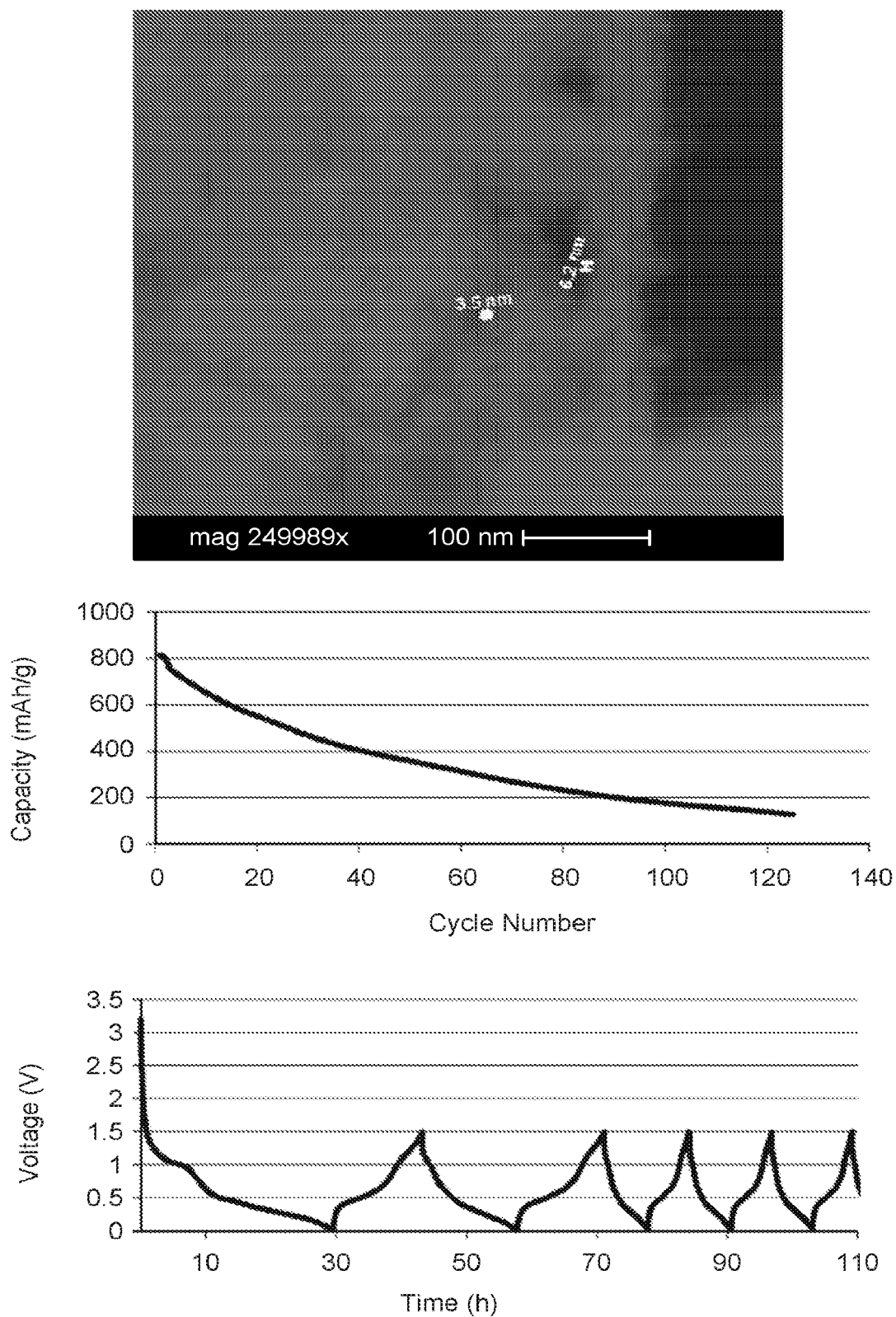
FIG. 35 provides an electron micrograph image of an AMO material and data including a plot of measured capacity versus cycle number as well as a plot of the voltage as a function of time during cycling for a battery cell including an electrode comprising the AMO material.

A tin oxide AMO was synthesized using a single-pot hydrothermal synthesis method. Briefly, tin acetate (Sn($CH_3COO)_2$) was dissolved in an ethanol/water solution and acidified by addition of boric acid ($H_3BO_3$). The resultant AMO nanomaterial was a grey, flaky material and was formed into an electrode. The electrode was assembled in a battery cell against lithium metal and cycled by discharging to zero volts, followed by charging to 1.5 volts. FIG. 35 depicts an electron micrograph image of the AMO nanomaterial, a plot of the measured capacity versus cycle number, as well as a plot of the voltage as a function of time during cycling.

Figure 36:
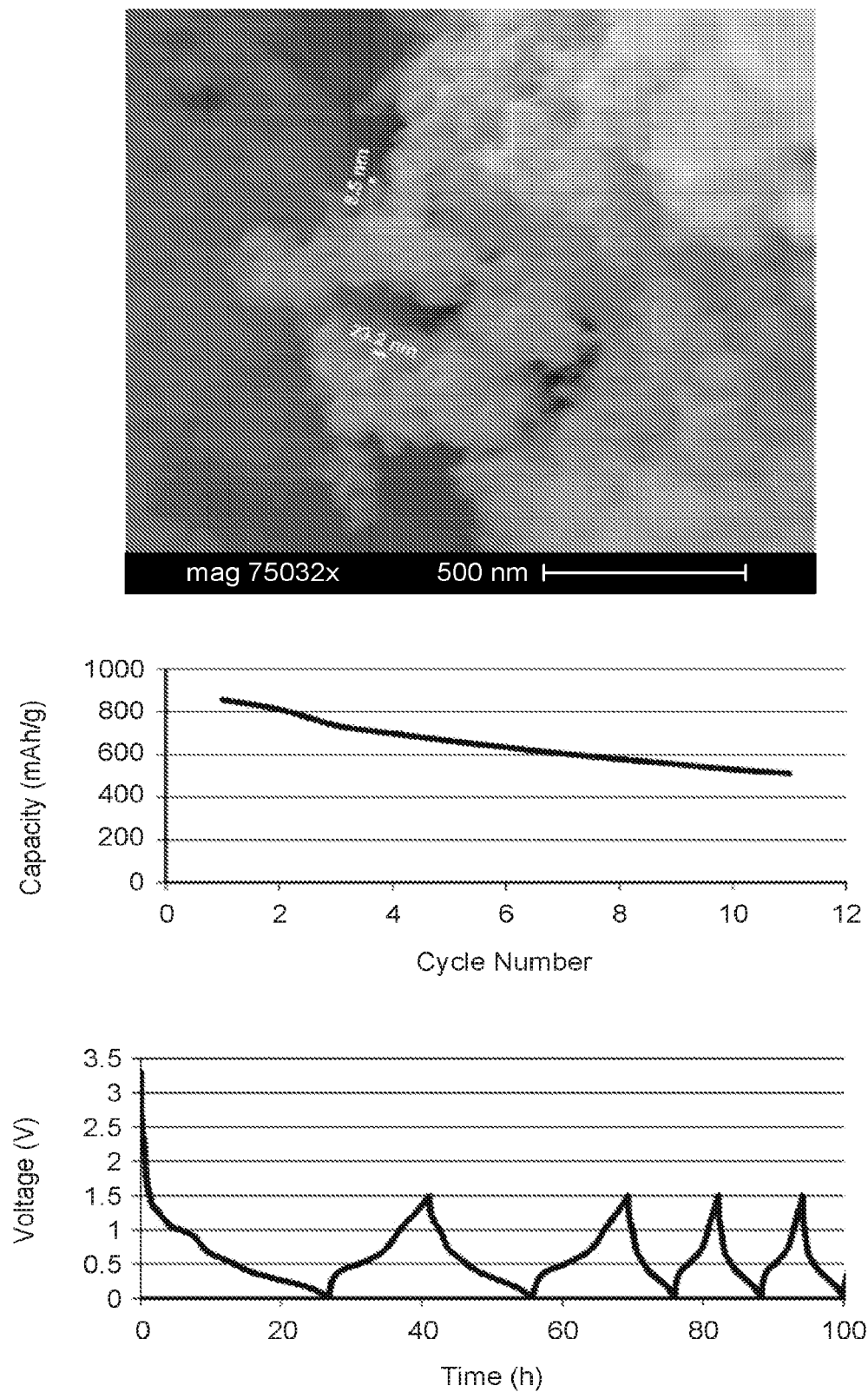
FIG. 36 provides an electron micrograph image of an AMO material and data including a plot of measured capacity versus cycle number as well as a plot of the voltage as a function of time during cycling for a battery cell including an electrode comprising the AMO material.

Example 15: AMO of Tin Oxide Doped with Manganese Oxide and Functionalized by Sulfate/Chloride A doped tin oxide AMO was synthesized using a single-pot hydrothermal synthesis method. Briefly, tin sulfate ($SnSO_4$) was dissolved in an ethanol/water solution with a lesser amount of manganese chloride ($MnCl_2$). The solution was acidified by addition of sulfuric acid ($H_2SO_4$). The resultant AMO nanomaterial was a very soft, tan material and was formed into an electrode. The electrode was assembled in a battery cell against lithium metal and cycled by discharging to zero volts, followed by charging to 1.5 volts. FIG. 36 depicts an electron micrograph image of the AMO nanomaterial, a plot of the measured capacity versus cycle number, as well as a plot of the voltage as a function of time during cycling.

Figure 37:
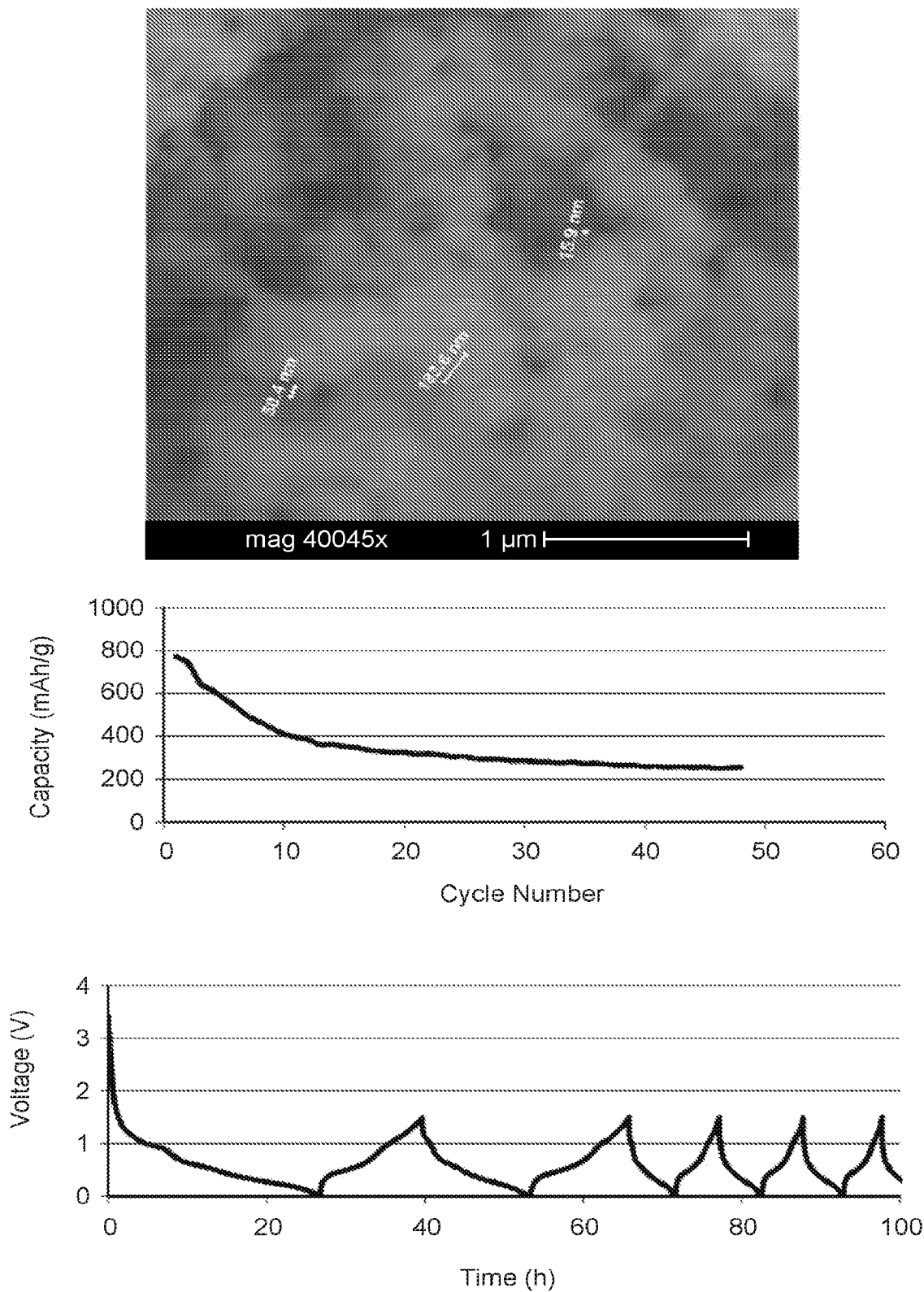
FIG. 37 provides an electron micrograph image of an AMO material and data including a plot of measured capacity versus cycle number as well as a plot of the voltage as a function of time during cycling for a battery cell including an electrode comprising the AMO material.

Example 16: AMO of Tin Oxide Doped with Manganese Oxide and Functionalized by Chloride A doped tin oxide AMO was synthesized using a single-pot hydrothermal synthesis method. Briefly, tin chloride ($SnCl_2$) was dissolved in an ethanol/water solution with a lesser amount of manganese chloride ($MnCl_2$). The solution was acidified by addition of hydrochloric acid (HCl). The resultant AMO nanomaterial was a soft, greyish brown material and was formed into an electrode. The electrode was assembled in a battery cell against lithium metal and cycled by discharging to zero volts, followed by charging to 1.5 volts. FIG. 37 depicts an electron micrograph image of the AMO nanomaterial, a plot of the measured capacity versus cycle number, as well as a plot of the voltage as a function of time during cycling.

Figure 38:
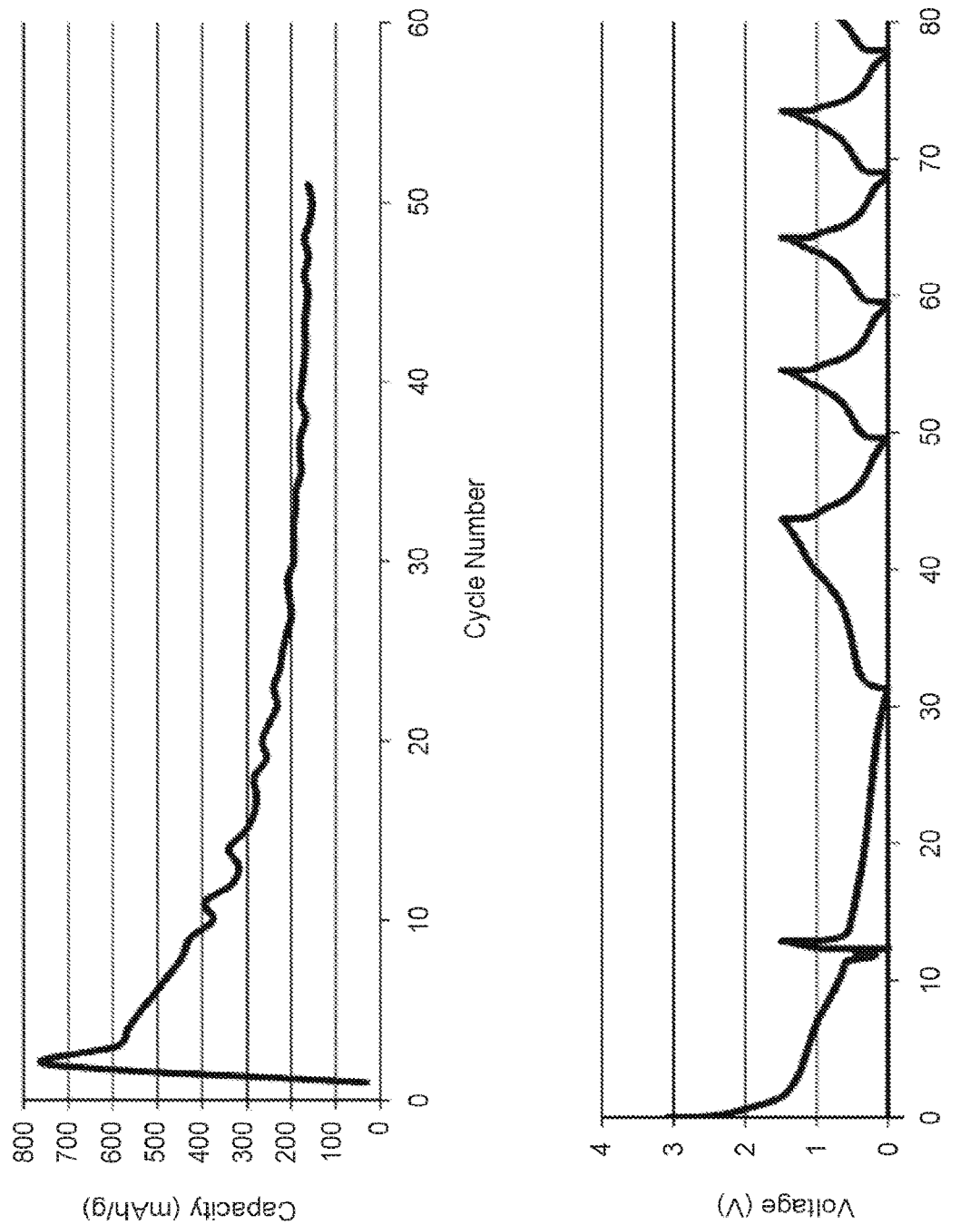
FIG. 38 provides data including a plot of measured capacity versus cycle number as well as a plot of the voltage as a function of time during cycling for a battery cell including an electrode comprising an AMO material.

Example 17: AMO of Tin Oxide Doped with Iron Oxide and Aluminum Oxide and Functionalized by Chloride Two doped tin oxide AMO samples were synthesized using a single-pot hydrothermal synthesis method. Briefly, tin chloride ($SnCl_2$) was dissolved in an ethanol/water solution with lesser amounts of both iron chloride ($FeCl_3$) and aluminum chloride ($AlCl_3$). The solution was acidified by addition of hydrochloric acid (HCl). The resultant AMO nanomaterial for the first sample was a light tan, flaky material and was formed into an electrode. The electrode was assembled in a battery cell against lithium metal and cycled by discharging to zero volts, followed by charging to 1.5 volts. FIG. 38 depicts a plot of the measured capacity versus cycle number, as well as a plot of the voltage as a function of time during cycling. The resultant AMO nanomaterial for the second sample was a light grey, flaky material.

Figure 39:
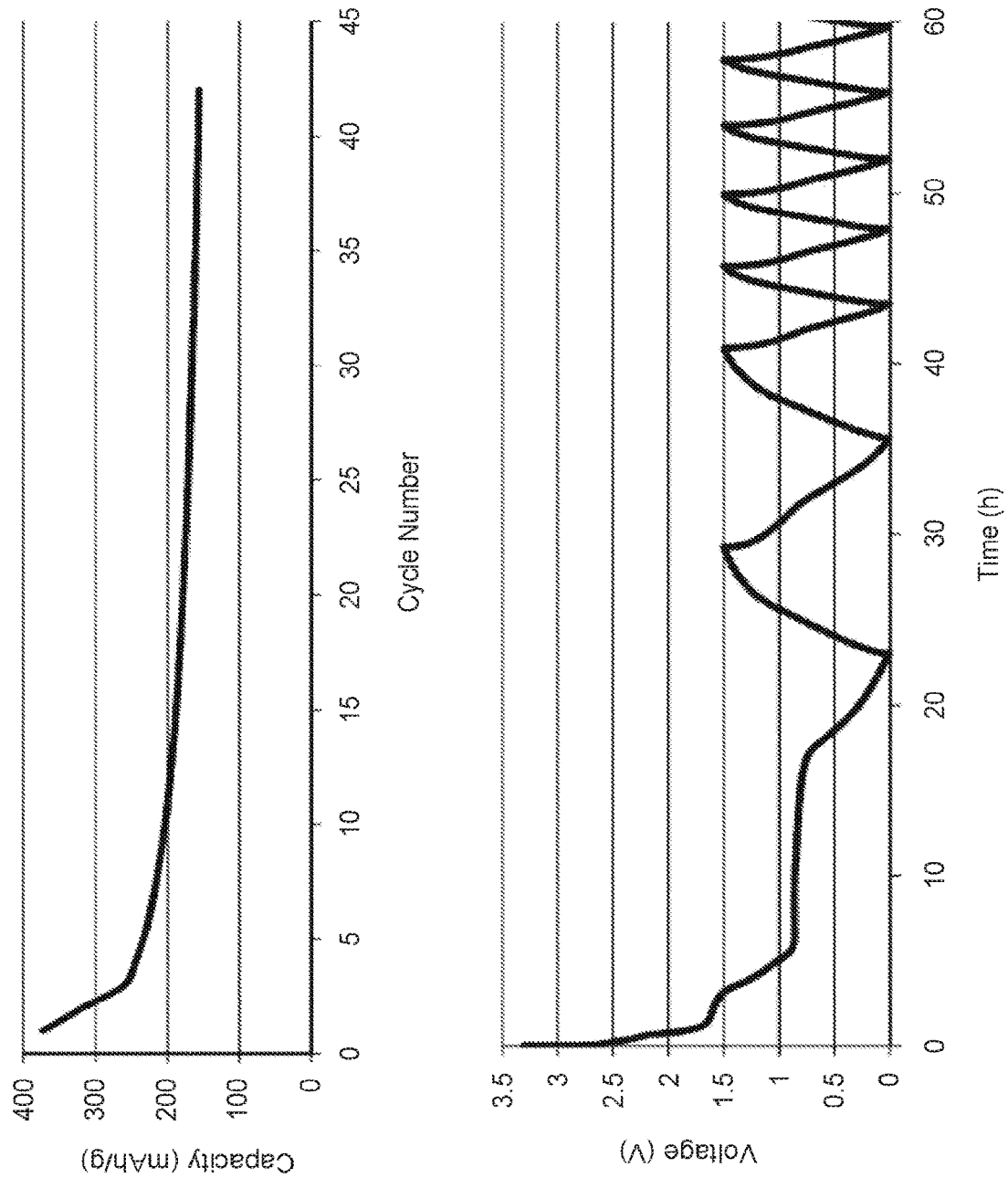
FIG. 39 provides data including a plot of measured capacity versus cycle number as well as a plot of the voltage as a function of time during cycling for a battery cell including an electrode comprising an AMO material.

Example 18: AMO of Iron Oxide Doped with Tin Oxide and Functionalized by Chloride A doped iron oxide AMO was synthesized using a single-pot hydrothermal synthesis method. Briefly, iron chloride ($FeCl_3$) was dissolved in an ethanol/water solution with a lesser amount of tin chloride ($SnCl_2$). The ratio of iron to tin was 95:5. The solution was acidified by addition of hydrochloric acid (HCl). The resultant AMO nanomaterial was a soft, red material and was formed into an electrode. The electrode was assembled in a battery cell against lithium metal and cycled by discharging to zero volts, followed by charging to 1.5 volts. FIG. 39 depicts a plot of the measured capacity versus cycle number, as well as a plot of the voltage as a function of time during cycling.

Figure 40:
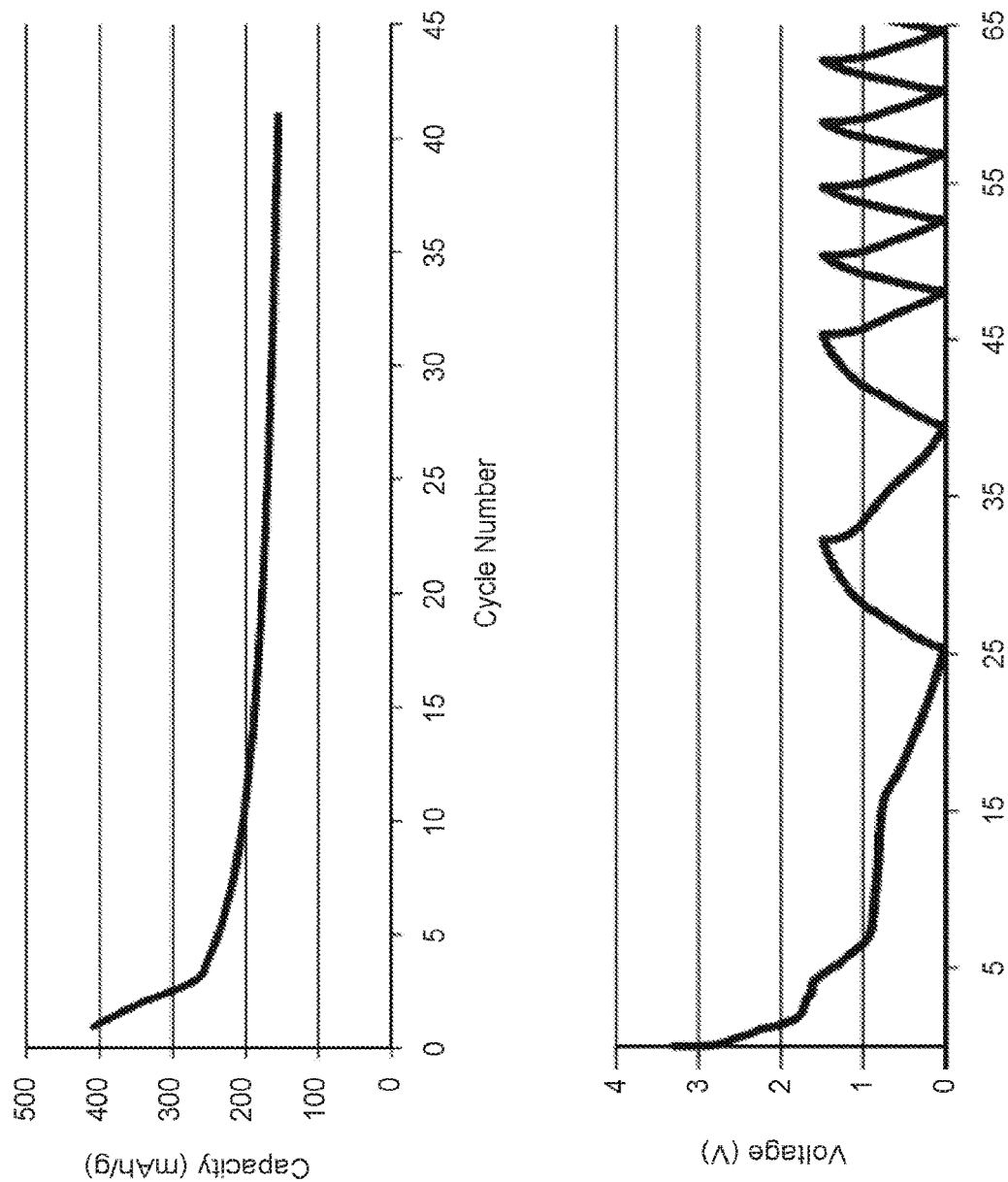
FIG. 40 provides data including a plot of measured capacity versus cycle number as well as a plot of the voltage as a function of time during cycling for a battery cell including an electrode comprising an AMO material.

Example 19: AMO of Iron Oxide Doped with Tin Oxide and Functionalized by Chloride A doped iron oxide AMO was synthesized using a single-pot hydrothermal synthesis method. Briefly, iron chloride ($FeCl_3$) was dissolved in an ethanol/water solution with a lesser amount of tin chloride ($SnCl_2$). The ratio of iron to tin was 95:5. The solution was acidified by addition of hydrochloric acid (HCl). The resultant AMO nanomaterial was a black, glassy material and was formed into an electrode. The electrode was assembled in a battery cell against lithium metal and cycled by discharging to zero volts, followed by charging to 1.5 volts. FIG. 40 depicts a plot of the measured capacity versus cycle number, as well as a plot of the voltage as a function of time during cycling.

Example 20: AMO of Iron Oxide Functionalized by Nitrate

Figure 41:
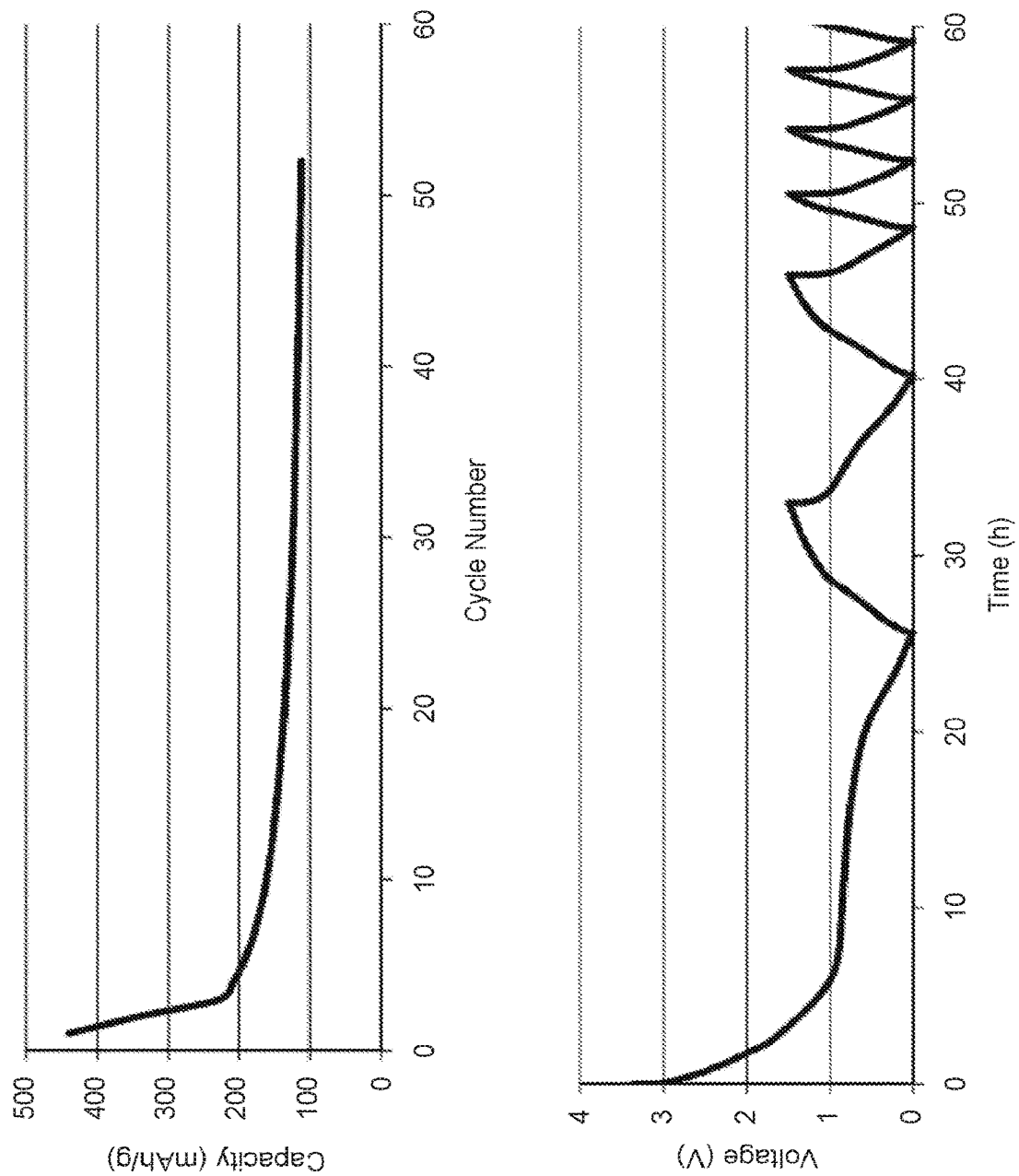
FIG. 41 provides data including a plot of measured capacity versus cycle number as well as a plot of the voltage as a function of time during cycling for a battery cell including an electrode comprising an AMO material.

An iron oxide AMO was synthesized using a single-pot hydrothermal synthesis method. Briefly, iron nitrate Fe($NO_3)_3$ was dissolved in an ethanol/water solution and acidified by addition of nitric acid ($HNO_3$). The resultant AMO nanomaterial was a black, glassy material and was formed into an electrode. The electrode was assembled in a battery cell against lithium metal and cycled by discharging to zero volts, followed by charging to 1.5 volts. FIG. 41 depicts a plot of the measured capacity versus cycle number, as well as a plot of the voltage as a function of time during cycling.

Example 21: AMO of Bismuth Oxide Functionalized by Chloride

Figure 42:
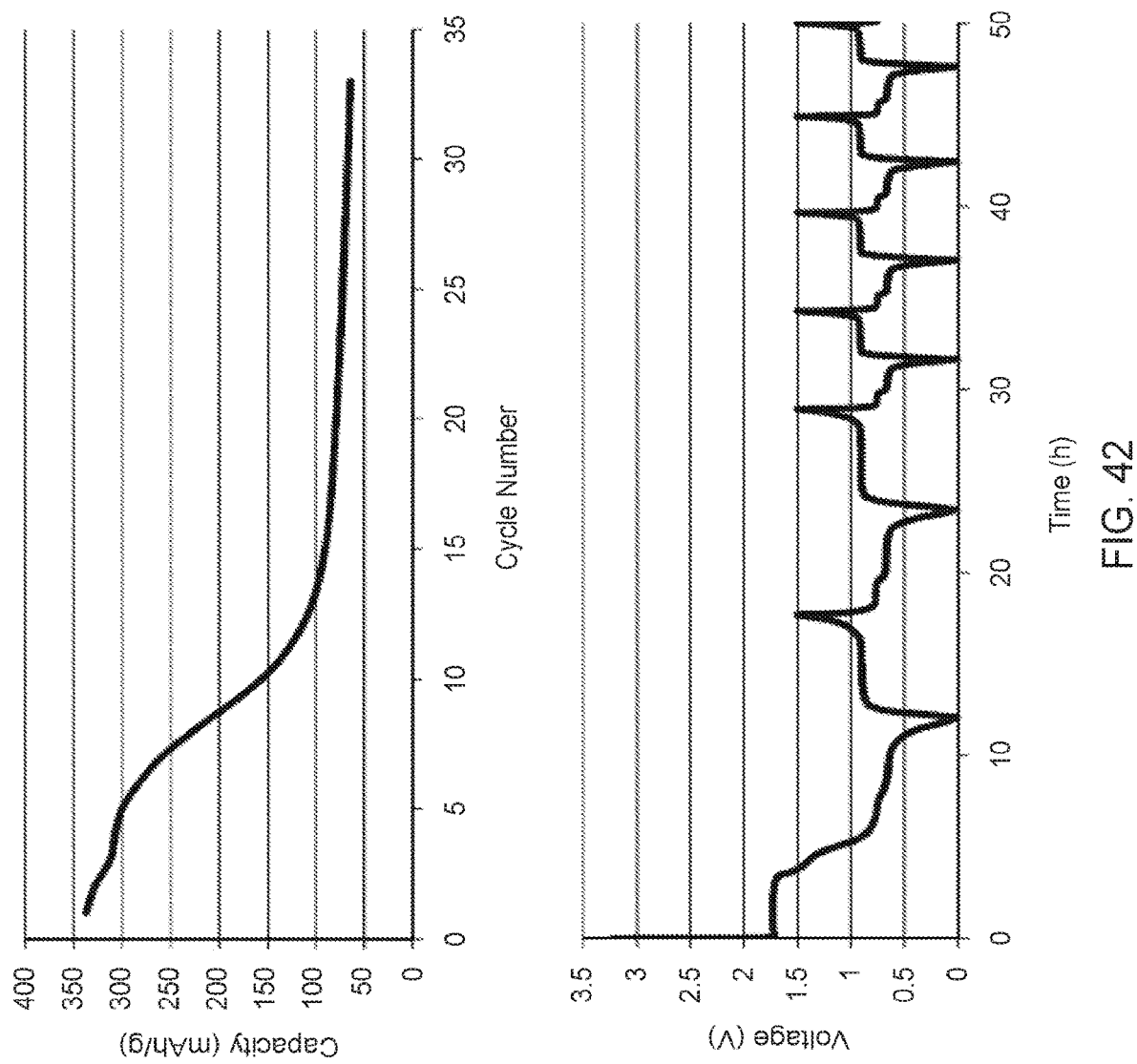
FIG. 42 provides data including a plot of measured capacity versus cycle number as well as a plot of the voltage as a function of time during cycling for a battery cell including an electrode comprising an AMO material.

A bismuth oxide AMO was synthesized using a single-pot hydrothermal synthesis method. Briefly, bismuth chloride ($BiCl_3$) was dissolved in an ethanol/water solution and acidified by addition of hydrochloric acid (HCl). The resultant AMO nanomaterial was a soft, white material and was formed into an electrode. The electrode was assembled in a battery cell against lithium metal and cycled by discharging to zero volts, followed by charging to 1.5 volts. FIG. 42 depicts a plot of the measured capacity versus cycle number, as well as a plot of the voltage as a function of time during cycling.

Example 22: AMO of Zirconium Oxide Functionalized by Sulfate

Figure 43:
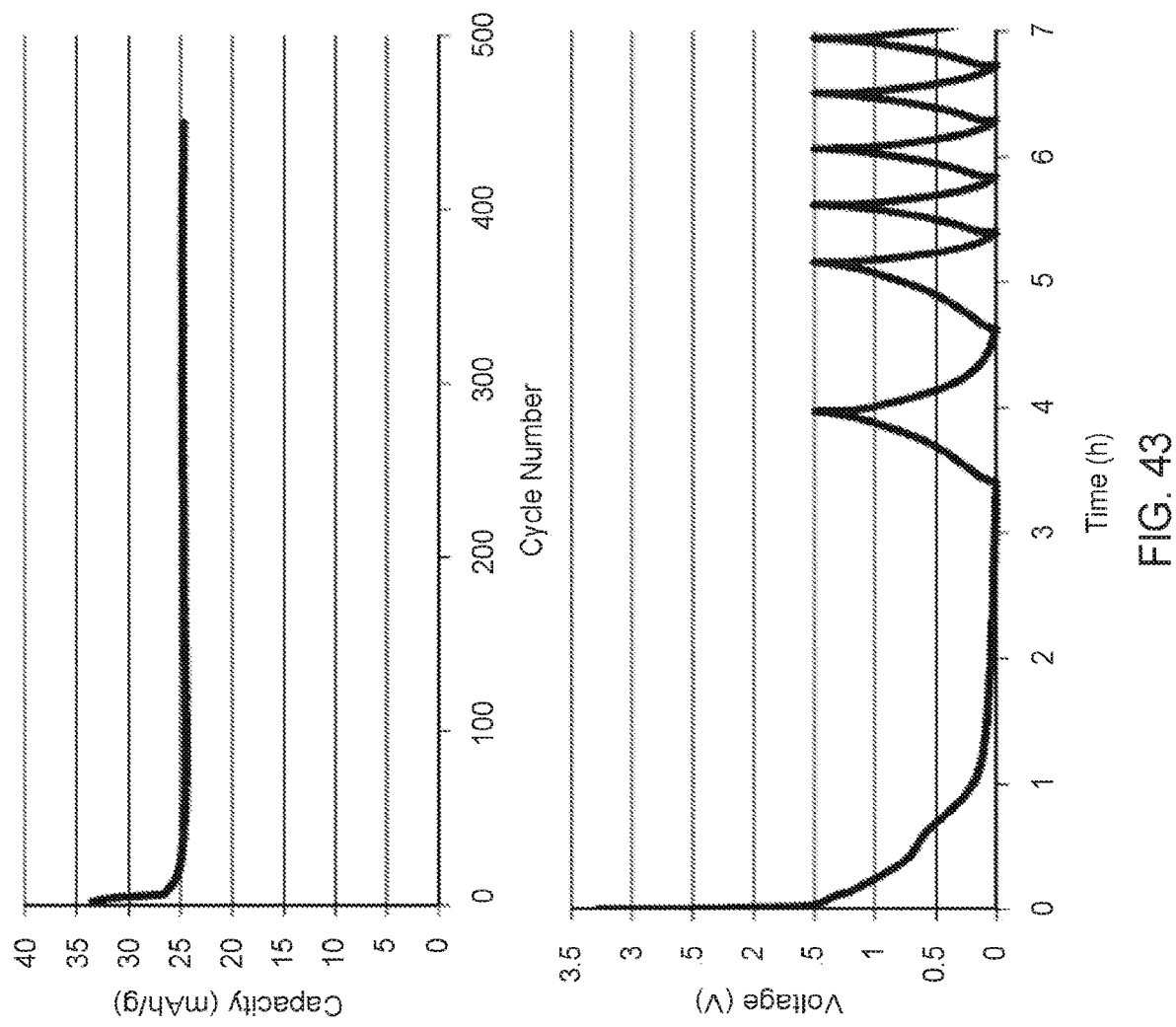
FIG. 43 provides data including a plot of measured capacity versus cycle number as well as a plot of the voltage as a function of time during cycling for a battery cell including an electrode comprising an AMO material.

A zirconium oxide AMO was synthesized using a single-pot hydrothermal synthesis method. Briefly, zirconium sulfate ($Zr(SO_4)_2$) was dissolved in an ethanol/water solution and acidified by addition of sulfuric acid ($H_2SO_4$). The resultant AMO nanomaterial was a flaky, white material and was formed into an electrode. The electrode was assembled in a battery cell against lithium metal and cycled by discharging to zero volts, followed by charging to 1.5 volts. FIG. 43 depicts a plot of the measured capacity versus cycle number, as well as a plot of the voltage as a function of time during cycling.

Example 23: AMO of Titanium Oxide Functionalized by Sulfate

Figure 44:
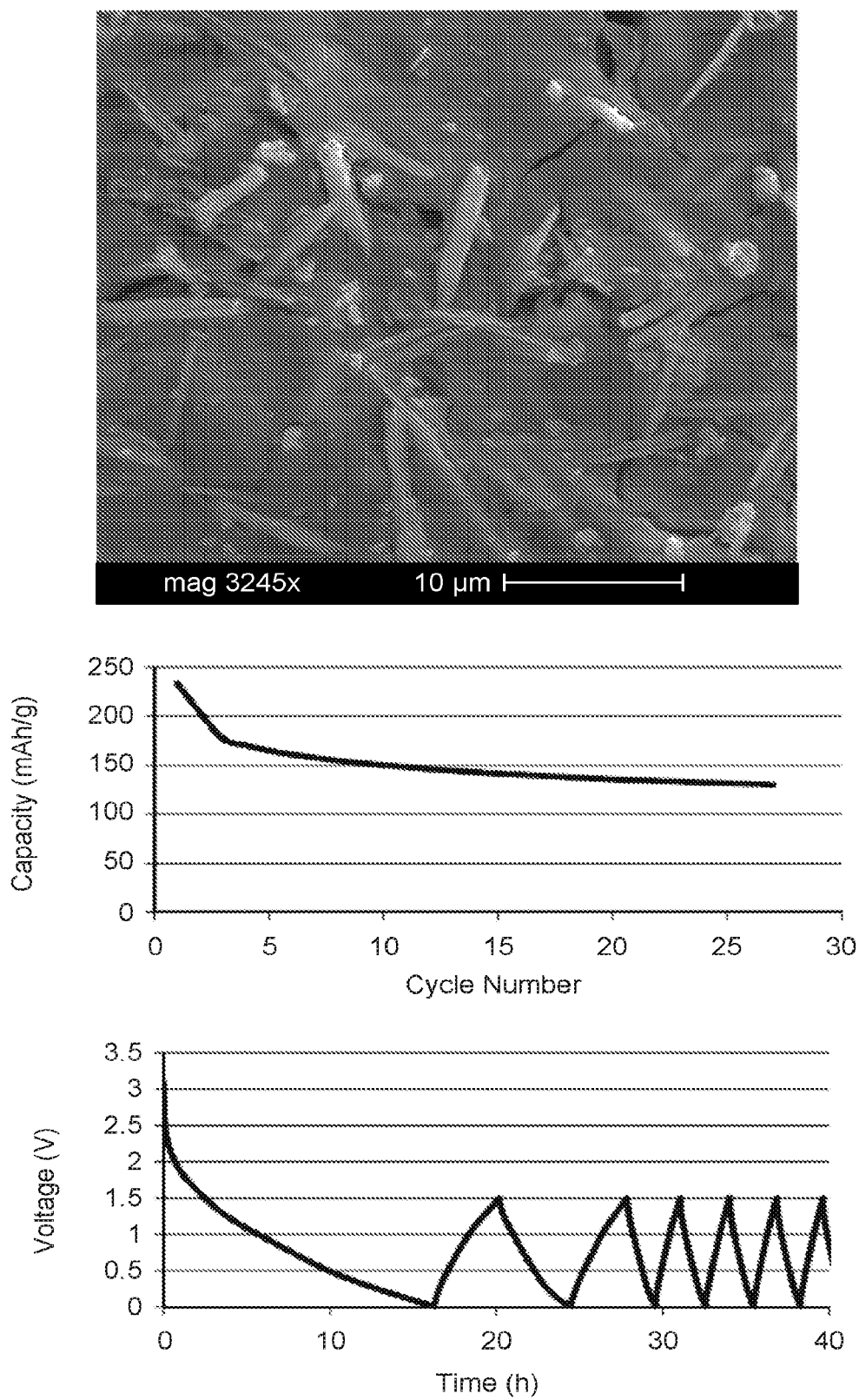
FIG. 44 provides an electron micrograph image of an AMO material and data including a plot of measured capacity versus cycle number as well as a plot of the voltage as a function of time during cycling for a battery cell including an electrode comprising the AMO material.

A titanium oxide AMO was synthesized using a single-pot hydrothermal synthesis method. Briefly, titanium oxysulfate ($TiOSO_4$) was dissolved in an ethanol/water solution and acidified by addition of sulfuric acid ($H_2SO_4$). The resultant AMO nanomaterial was a white, flaky material and was formed into an electrode. The electrode was assembled in a battery cell against lithium metal and cycled by discharging to zero volts, followed by charging to 1.5 volts. FIG. 44 depicts an electron micrograph image of the AMO nanomaterial, a plot of the measured capacity versus cycle number, as well as a plot of the voltage as a function of time during cycling.

Example 24: AMO of Antimony Oxide Functionalized by Sulfate

Figure 45:
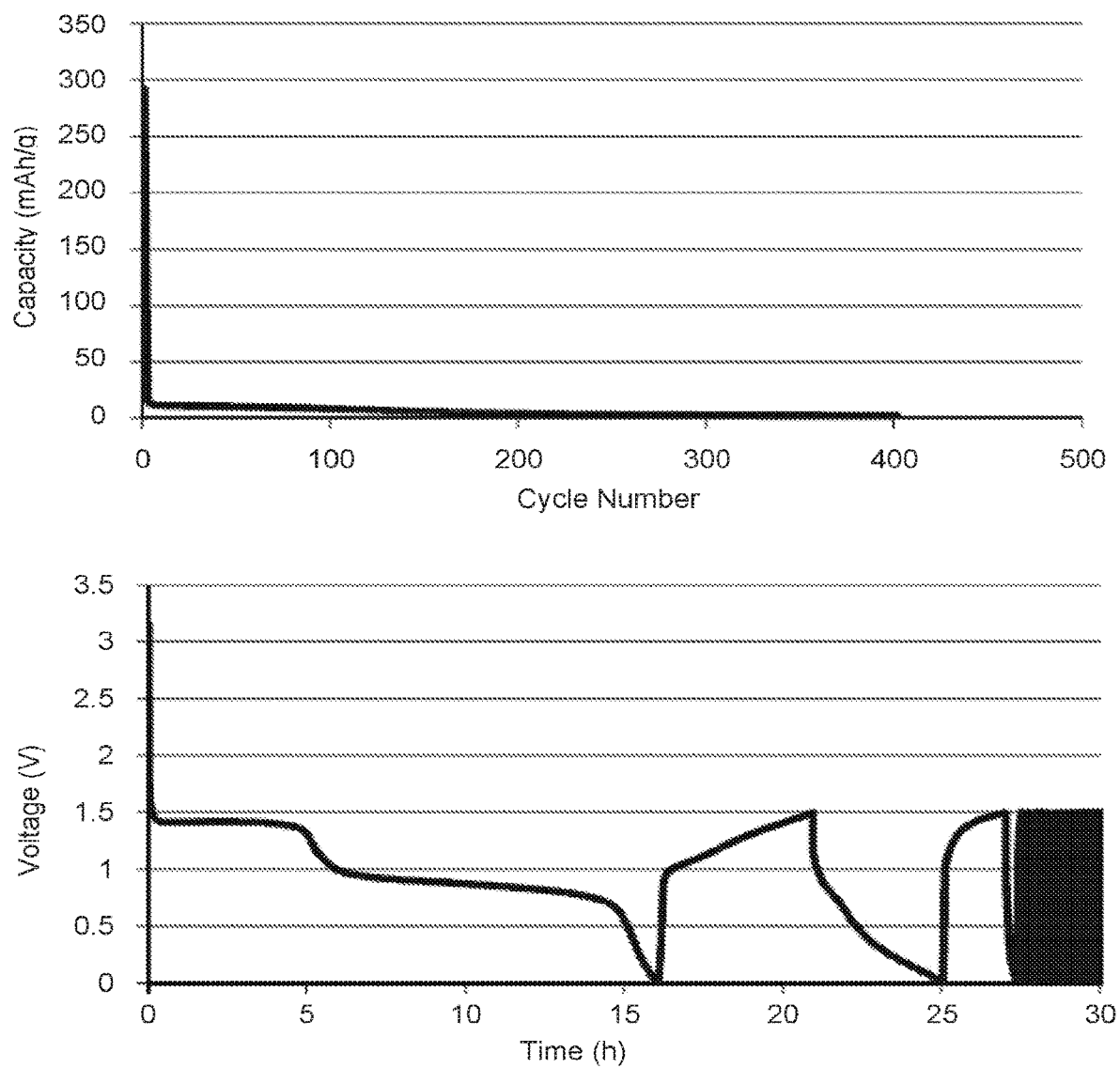
FIG. 45 provides data including a plot of measured capacity versus cycle number as well as a plot of the voltage as a function of time during cycling for a battery cell including an electrode comprising an AMO material.

An antimony oxide AMO was synthesized using a single-pot hydrothermal synthesis method. Briefly, antimony sulfate ($Sb_2(SO_4)_3$) was dissolved in an ethanol/water solution and acidified by addition of sulfuric acid ($H_2SO_4$). The resultant AMO nanomaterial was a very soft, white material and was formed into an electrode. The electrode was assembled in a battery cell against lithium metal and cycled by discharging to zero volts, followed by charging to 1.5 volts. FIG. 45 depicts a plot of the measured capacity versus cycle number, as well as a plot of the voltage as a function of time during cycling.

Example 25: AMO of Indium Oxide Functionalized by Chloride

Figure 46:
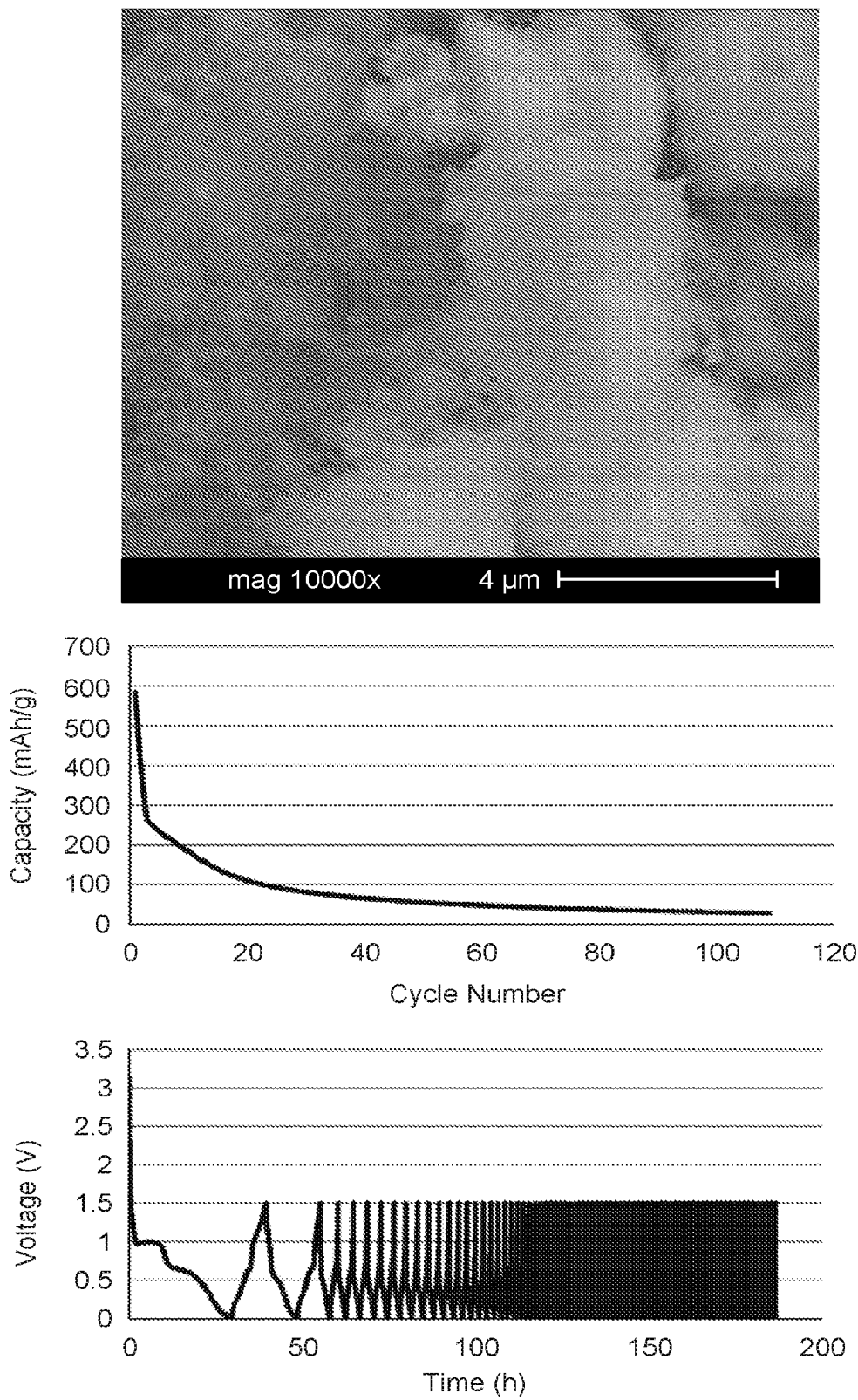
FIG. 46 provides an electron micrograph image of an AMO material and data including a plot of measured capacity versus cycle number as well as a plot of the voltage as a function of time during cycling for a battery cell including an electrode comprising the AMO material.

An indium oxide AMO was synthesized using a single-pot hydrothermal synthesis method. Briefly, indium chloride ($InCl_3$) was dissolved in an ethanol/water solution and acidified by addition of hydrochloric acid (HCl). The resultant AMO nanomaterial was a white material and was formed into an electrode. The electrode was assembled in a battery cell against lithium metal and cycled by discharging to zero volts, followed by charging to 1.5 volts. FIG. 46 depicts an electron micrograph image of the AMO nanomaterial, a plot of the measured capacity versus cycle number, as well as a plot of the voltage as a function of time during cycling.

Example 26: AMO of Indium Oxide Functionalized by Sulfate

Figure 47:
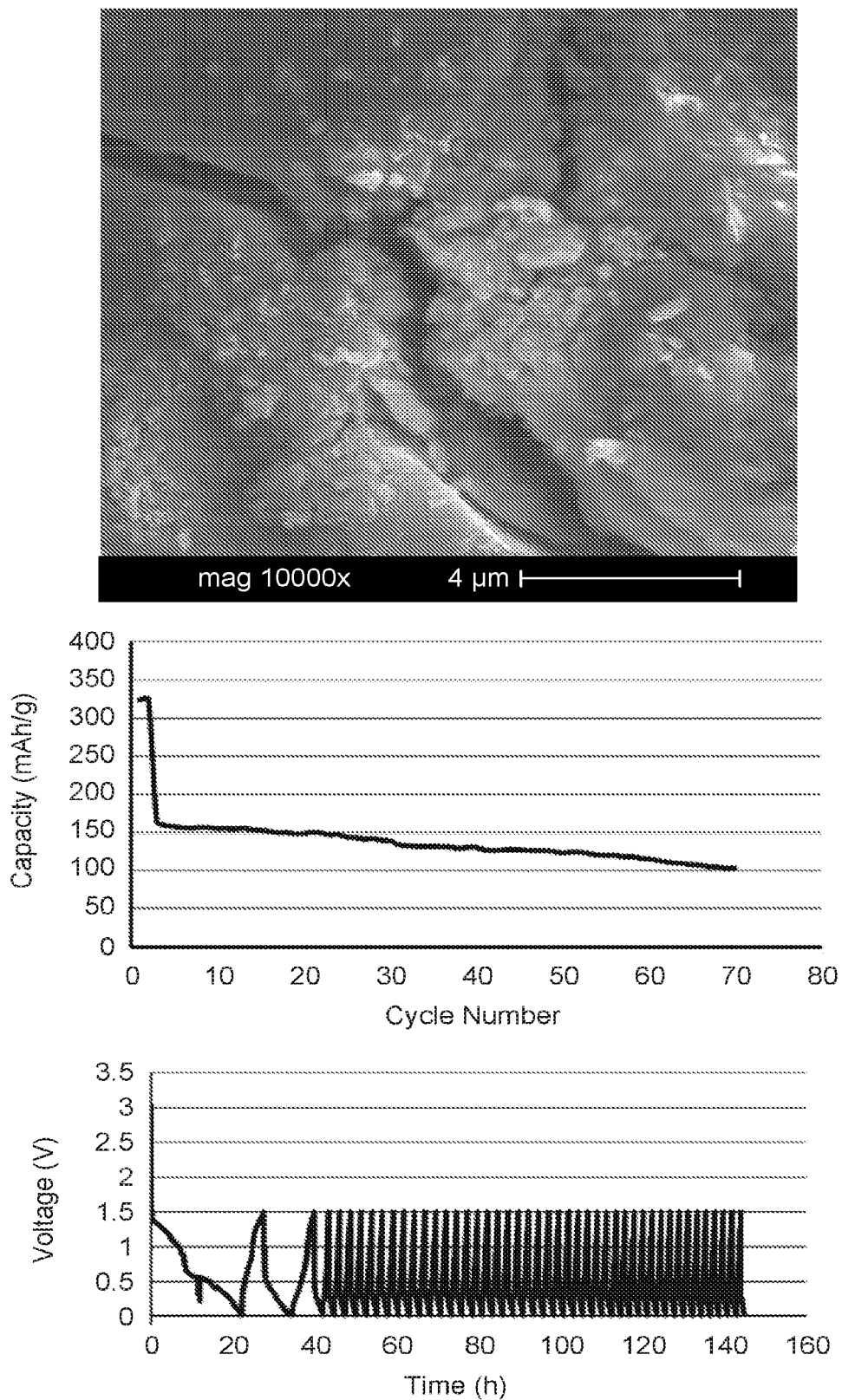
FIG. 47 provides an electron micrograph image of an AMO material and data including a plot of measured capacity versus cycle number as well as a plot of the voltage as a function of time during cycling for a battery cell including an electrode comprising the AMO material.

An indium oxide AMO was synthesized using a single-pot hydrothermal synthesis method. Briefly, indium sulfate ($In_2(SO_4)_3$) was dissolved in an ethanol/water solution and acidified by addition of sulfuric acid ($H_2SO_4$). The resultant AMO nanomaterial was a white material and was formed into an electrode. The electrode was assembled in a battery cell against lithium metal and cycled by discharging to zero volts, followed by charging to 1.5 volts. FIG. 47 depicts an electron micrograph image of the AMO nanomaterial, a plot of the measured capacity versus cycle number, as well as a plot of the voltage as a function of time during cycling.

Example 27: AMO of Indium Oxide Functionalized by Bromide

Figure 48:
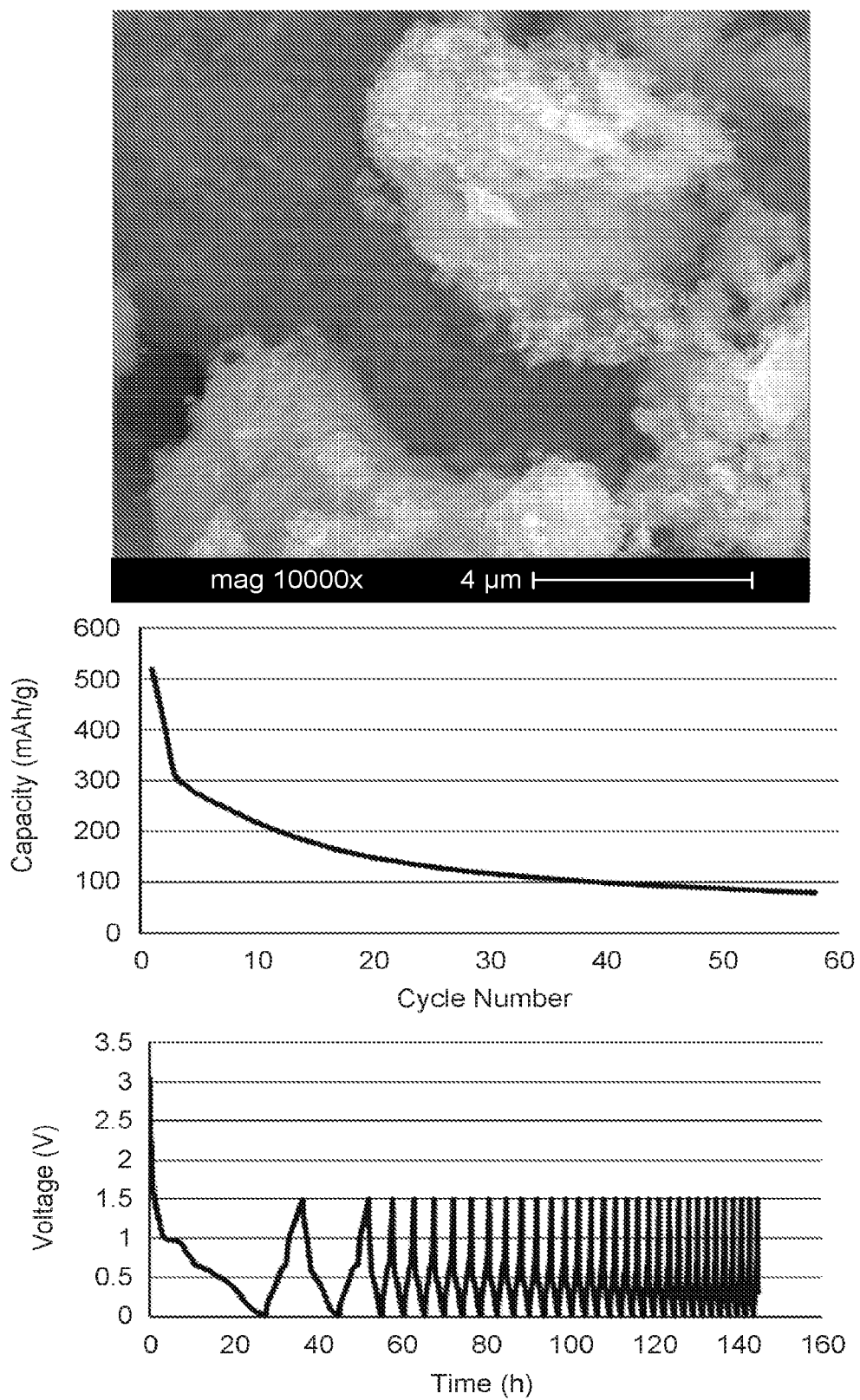
FIG. 48 provides an electron micrograph image of an AMO material and data including a plot of measured capacity versus cycle number as well as a plot of the voltage as a function of time during cycling for a battery cell including an electrode comprising the AMO material.

An indium oxide AMO was synthesized using a single-pot hydrothermal synthesis method. Briefly, indium bromide ($InBr_3$) was dissolved in an ethanol/water solution and acidified by addition of hydrobromic acid (HBr). The resultant AMO nanomaterial was a blue-white material and was formed into an electrode. The electrode was assembled in a battery cell against lithium metal and cycled by discharging to zero volts, followed by charging to 1.5 volts. FIG. 48 depicts an electron micrograph image of the AMO nanomaterial, a plot of the measured capacity versus cycle number, as well as a plot of the voltage as a function of time during cycling.

Example 28: AMO of Indium Oxide Functionalized by Chloride

Figure 49:
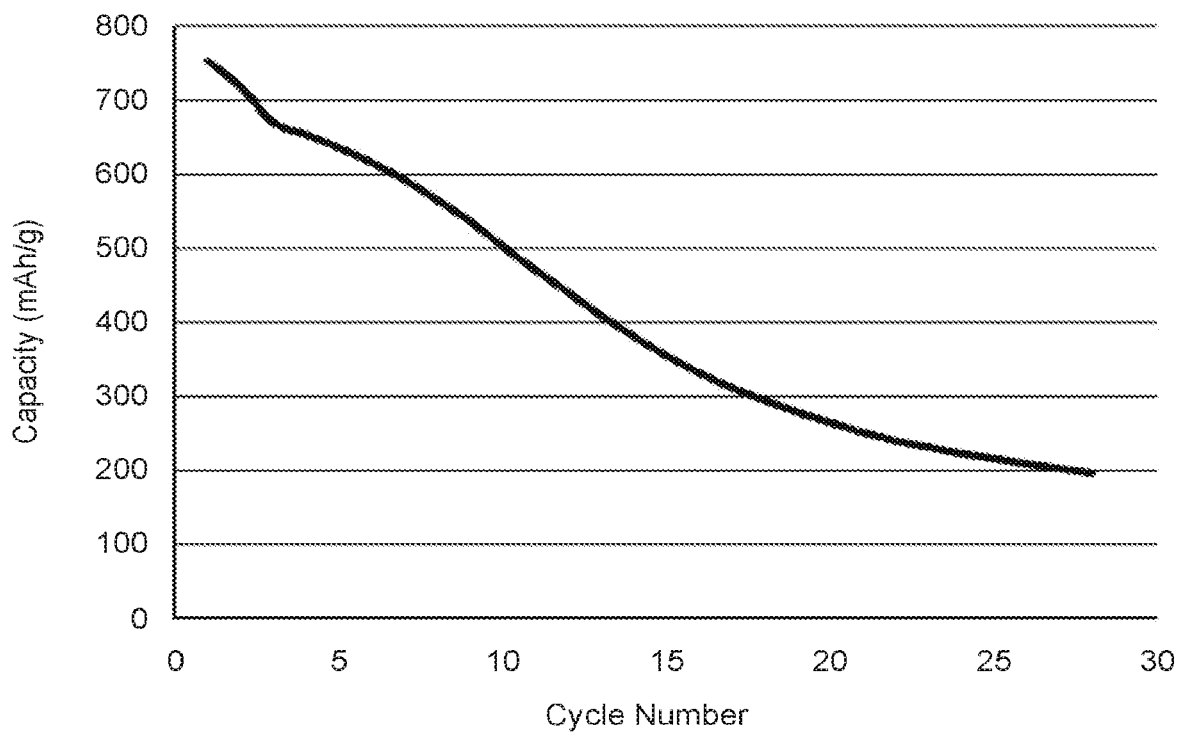
FIG. 49 provides data including a plot of measured capacity versus cycle number as well as a plot of the voltage as a function of time during cycling for a battery cell including an electrode comprising an AMO material.
Figure 49:
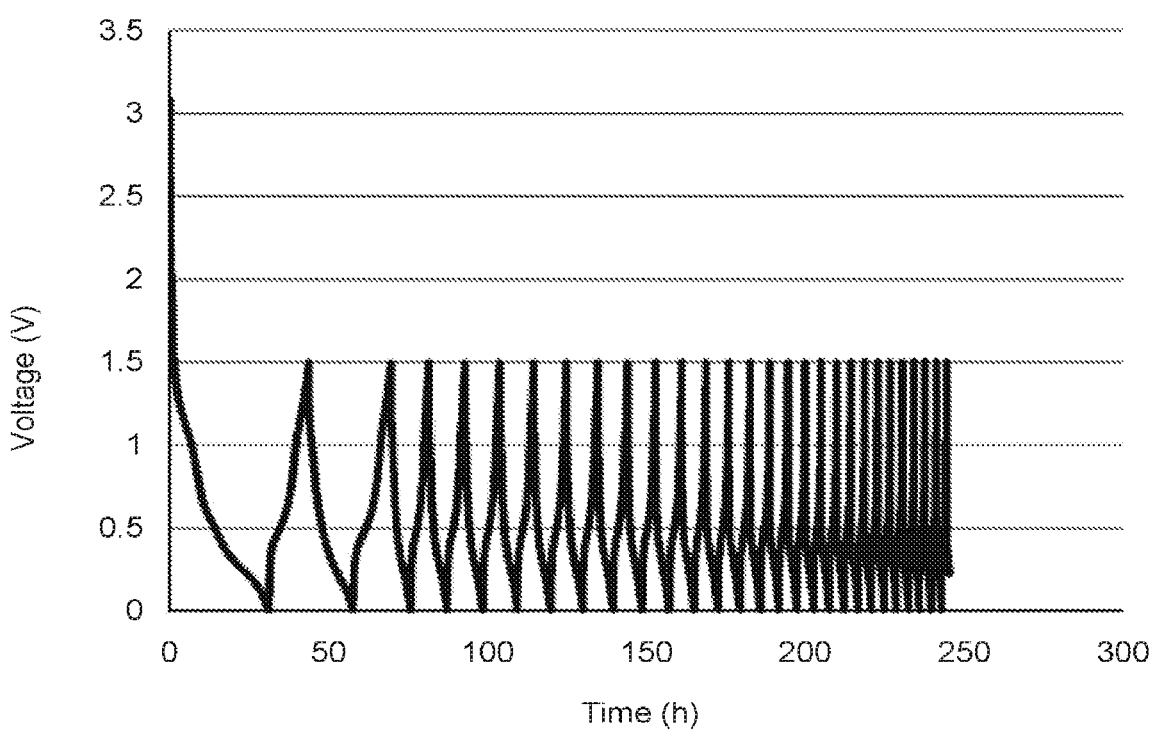

An indium oxide AMO was synthesized using a single-pot hydrothermal synthesis method. Briefly, indium chloride ($InCl_3$) was dissolved in an ethanol/water solution and acidified by addition of hydrochloric acid (HCl). The resultant AMO nanomaterial was grey with a yellow ring and was formed into an electrode. The electrode was assembled in a battery cell against lithium metal and cycled by discharging to zero volts, followed by charging to 1.5 volts. FIG. 49 depicts an electron micrograph image of the AMO nanomaterial, a plot of the measured capacity versus cycle number, as well as a plot of the voltage as a function of time during cycling.

Figure 50:
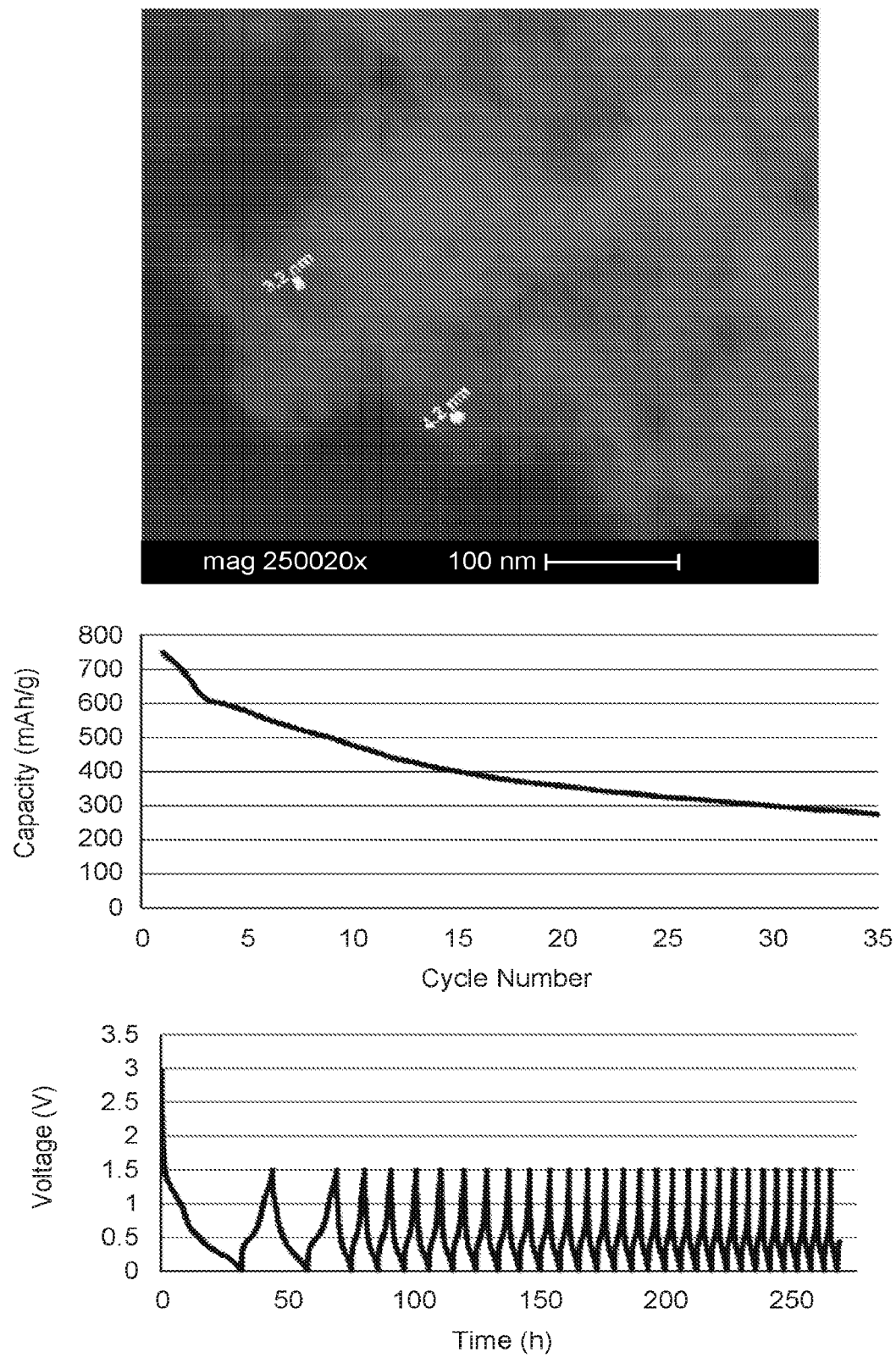
FIG. 50 provides an electron micrograph image of an AMO material and data including a plot of measured capacity versus cycle number as well as a plot of the voltage as a function of time during cycling for a battery cell including an electrode comprising the AMO material.

Example 29: Mixed AMO of Lithium Oxide and Iron Oxide Doped with Tin Oxide and Functionalized by Chloride/acetate A doped mixed lithium oxide and iron oxide AMO was synthesized using a single-pot hydrothermal synthesis method. Briefly, lithium acetate ($Li(CH_3COO)$) and iron chloride ($FeCl_3$) were dissolved in an ethanol/water solution with a lesser amount of tin chloride ($SnCl_2$). The solution was acidified by addition of hydrochloric acid (HCl). During synthesis, a tan, pinkish color with a green ring on the flask developed. The final AMO nanomaterial, however, was grey and was formed into an electrode. The electrode was assembled in a battery cell against lithium metal and cycled by discharging to zero volts, followed by charging to 1.5 volts. FIG. 50 depicts an electron micrograph image of the AMO nanomaterial, a plot of the measured capacity versus cycle number, as well as a plot of the voltage as a function of time during cycling.

Figure 51:
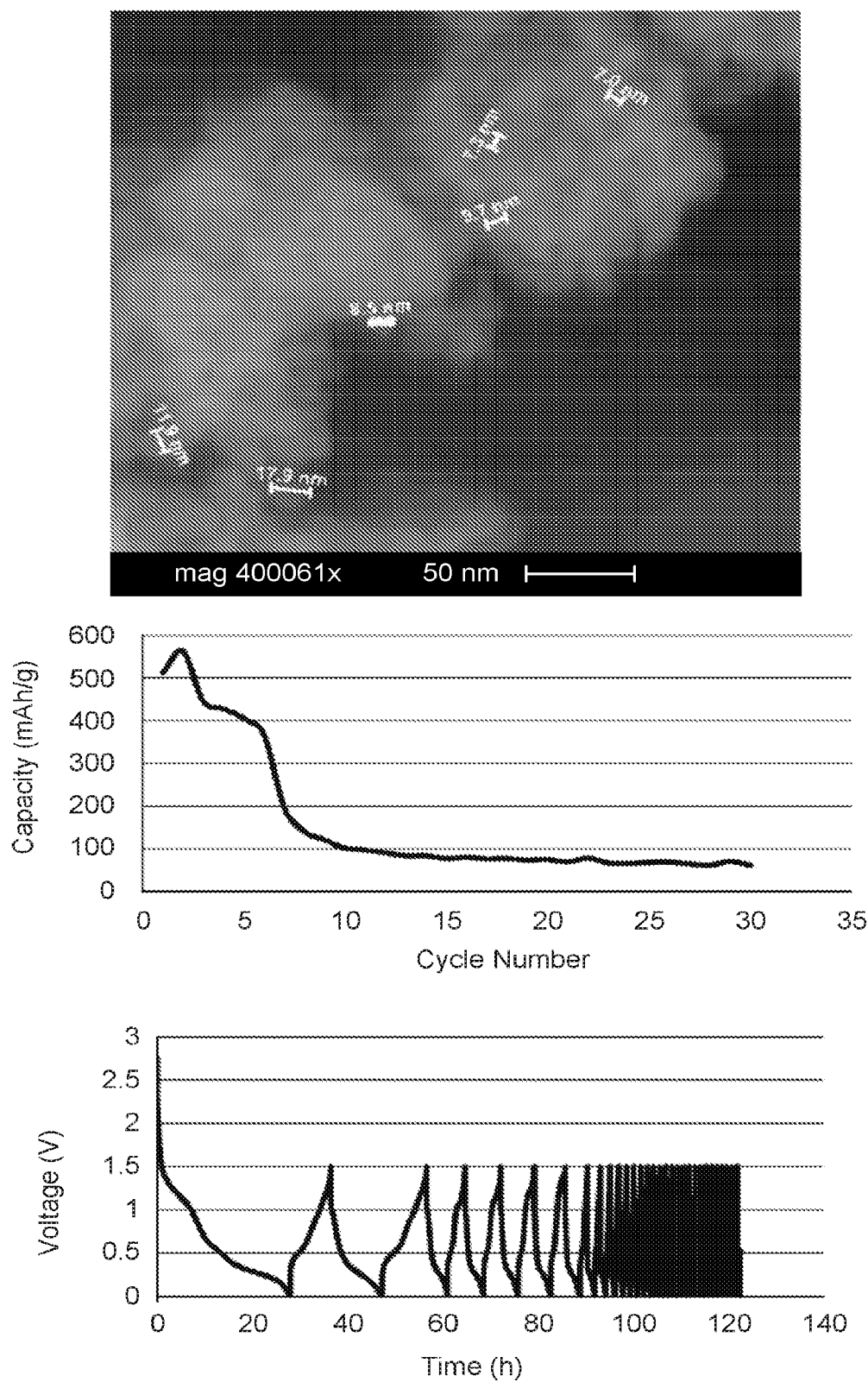
FIG. 51 provides an electron micrograph image of an AMO material and data including a plot of measured capacity versus cycle number as well as a plot of the voltage as a function of time during cycling for a battery cell including an electrode comprising the AMO material.

Example 30: Mixed AMO of Lithium Oxide and Iron Oxide Doped with Tin Oxide and Functionalized by Chloride/Acetate A doped mixed lithium oxide and iron oxide AMO was synthesized using a single-pot hydrothermal synthesis method. Briefly, lithium acetate ($Li(CH_3COO)$) and iron chloride ($FeCl_3$) were dissolved in an ethanol/water solution with a lesser amount of tin chloride ($SnCl_2$). The solution was acidified by addition of hydrochloric acid (HCl). The resultant AMO nanomaterial was a golden pale material and was formed into an electrode. The electrode was assembled in a battery cell against lithium metal and cycled by discharging to zero volts, followed by charging to 1.5 volts. FIG. 51 depicts an electron micrograph image of the AMO nanomaterial, a plot of the measured capacity versus cycle number, as well as a plot of the voltage as a function of time during cycling.

Figure 52:
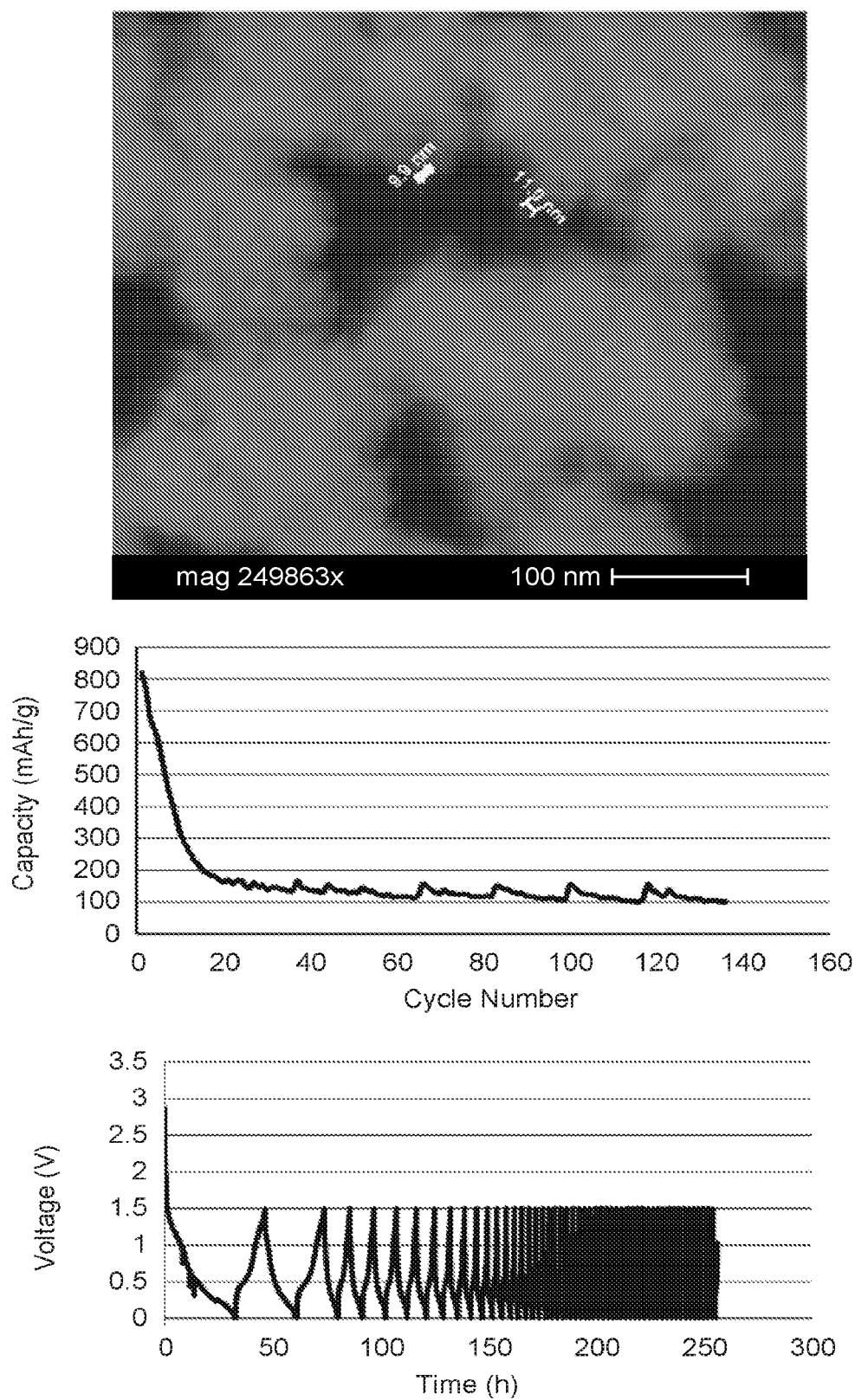
FIG. 52 provides an electron micrograph image of an AMO material and data including a plot of measured capacity versus cycle number as well as a plot of the voltage as a function of time during cycling for a battery cell including an electrode comprising the AMO material.

Example 31: Mixed AMO Of Lithium Oxide and Iron Oxide Doped with Tin Oxide and Functionalized by Chloride/Acetate A doped mixed lithium oxide and iron oxide AMO was synthesized using a single-pot hydrothermal synthesis method. Briefly, lithium acetate ($Li(CH_3COO)$) and iron chloride ($FeCl_3$) were dissolved in an ethanol/water solution with a lesser amount of tin chloride ($SnCl_2$). The solution was acidified by addition of hydrochloric acid (HCl). The resultant AMO nanomaterial was a light creamy white material and was formed into an electrode. The electrode was assembled in a battery cell against lithium metal and cycled by discharging to zero volts, followed by charging to 1.5 volts. FIG. 52 depicts an electron micrograph image of the AMO nanomaterial, a plot of the measured capacity versus cycle number, as well as a plot of the voltage as a function of time during cycling.

Figure 53A:
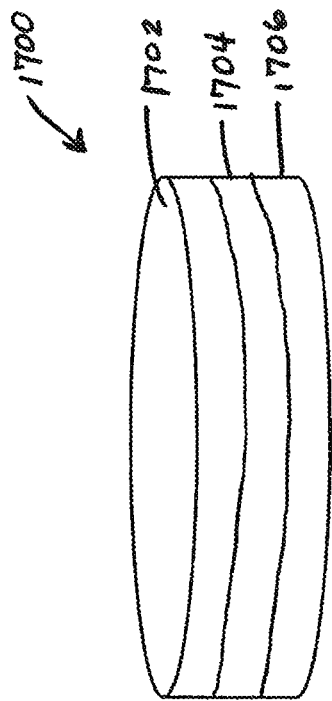
FIG. 53A is a side view of an example cathode including a layered construction according to aspects of the present disclosure.
Figure 53B:
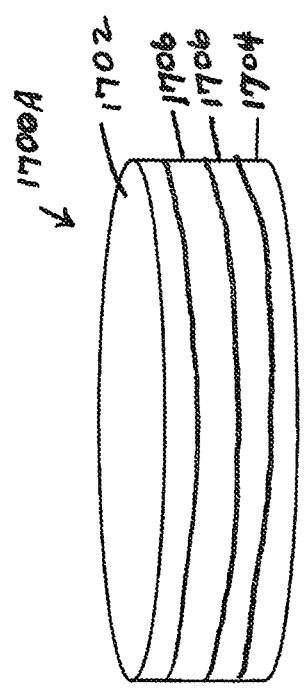
FIG. 53B is a side view of an alternate example cathode including a layered construction according to aspects of the present disclosure.
Figure 53C:
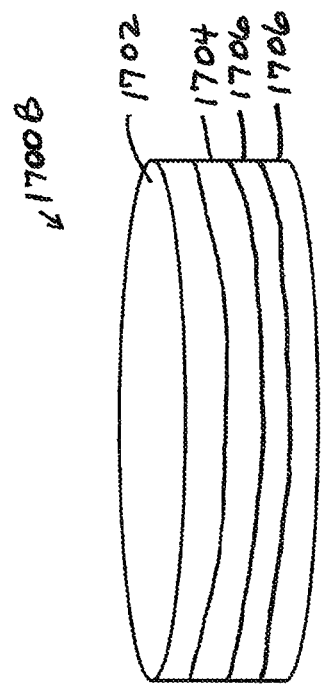
FIG. 53C is a side view of a second alternative example cathode including a layered construction according to aspects of the present disclosure.

Referring now to FIG. 53A, FIG. 53B, and FIG. 53C, perspective views of cathodes 1700, 1700A and 1700B according to aspects of the present disclosure are shown. FIGS. 53A-53C are not to scale. The cathode 1700 comprises 33.3% $SnO_2$ in AMO form. The AMO was prepared according to the methods disclosed above. To form a carbon layer 1704 a slurry of Ketjenblack (KB) EC-300J (SA: ~800 $m^2/g$) prepared using NMP solvent and coated on copper foil 1702 of thickness 10 μm. The slurry composition was 80% KB and 20% PVDF by weight. As coated tape was dried in a vacuum oven at 100° C.

To form a carbon/$SnO_2$ layer 1706 $SnO_2$ (AMO), Ketjenblack and PVDF each 33.3% by weight were mixed together and slurry was prepared by adding NMP solvent, and coated on part of the KB-coated copper foil (1702, 1704). The $SnO_2$-containing layer may be referred to as the "active material" layer. The resultant tape was dried in a vacuum oven at 100° C. (overnight) and calendared at room temperature. Thickness of the tape was measured using a micrometer at $SnO_2$ coated and KB (only) coated areas. The thickness of the KB layer 1704 is about 8 μm; the thickness of the electrode layer 1706 is about 2 μm. The foil layer 1702 is about 10 μm giving a total thickness of the cathode 1700 of about 18 μm.

The calendared tape was punched out into circular discs at KB (only) and $SnO_2$ coated areas. The weight of the KB disc was subtracted from the $SnO_2$ disc to obtain total mass of the electrode material. In case of one tested cell type, the total mass of the electrode material is 0.0005 g (after subtracting the KB disc weight), and the active material content is 0.000167 g (33.3% of total mass).

Note that elements of the cathode 1700, in the illustrated embodiment, include (1) the layering, using a carbon undercoat, (2) the use of KB high surface area carbon in both undercoat and topcoat, (3) the 33% active material topcoat, and (4) the thin (<10 nm) topcoat layer. Nanoparticle-sized carbon blacks other than KB or their equivalents may be used. As a non-limiting example, Super P has been shown to be an alternative, although it may be less preferred for certain applications. In addition, conductive carbon blacks having a primary particle size in a range of 30 to 50 nm may be used. It is believed that any nanoparticle-sized carbon black having a primary particle size of less than 1 μm is suitable. Binders other than PVDF may be used. The cathode may be constructed in one or more layers. Alternative arrangements of layers are shown for cathodes 1700A and 1700B.

The percentage of active material in the mixed layer is preferably 33%. However, it should be understood that the percentage of active material in the mixed layer may be more or less than 33%. For example, the range of active material in the mixed layer may be between 10% and 80%. A preferred range may be between 20% and 50%. A most preferred range may be between 25% and 35%. In some embodiments, the layered construction forms an anode, a cathode, or both. A layered cathodic system may be combined with a lithium anode (to include metallic lithium as well as combinations containing lithium).

The thickness of the one or more layers of a layered construction may be more or less than 2 μm. A variety of current collectors may be used in order to optimize cell construction. A preferred layered construction may include at least one carbon layer and at least one active material layer and/or mixed layer. In a preferred arrangement includes at least one carbon layer and a low loading active material or mixed layer. A carbon layer (KB) may be used under the active material layer or mixed layer, between layers of active material or mixed layer, on top of the active material layer or mixed layer, or in any combination thereof With reference to FIG. 54, a comparison graph of performance testing of three examples of battery cells having active materials constructed using a layered construction compared with cells having the same active materials constructed using a non-layered mixed construction are presented. The non-layered test cells included a mixed construction of active material mixed with carbon material (KB). It should be understood that the presented performance testing was a first discharge test for each example. However, increased capacity has been observed for multiple cycles as well. (See FIGS. 54-59)

Figure 54:
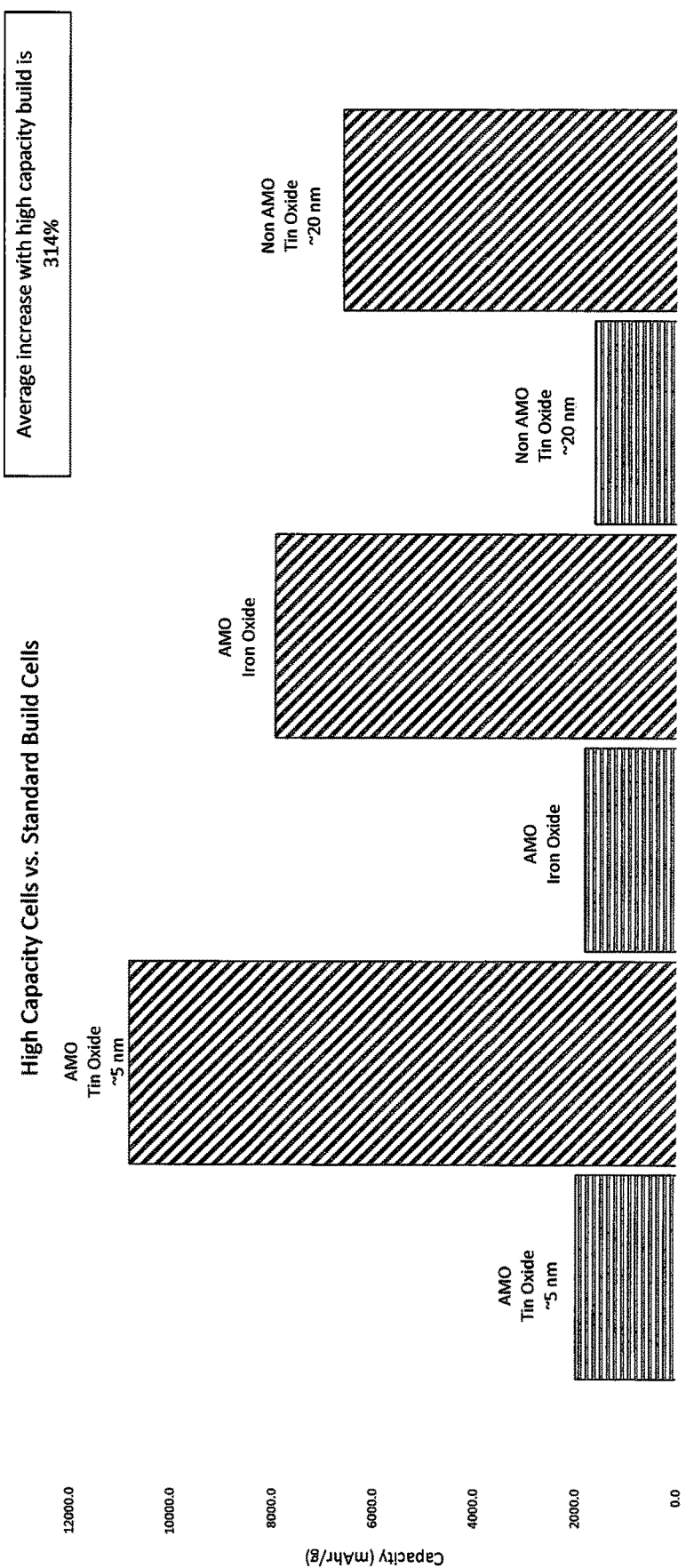
FIG. 54 is a plot of lithiation capacities of ultra-high capacity cells of this disclosure compared to standard-built cells.
Figure 55:
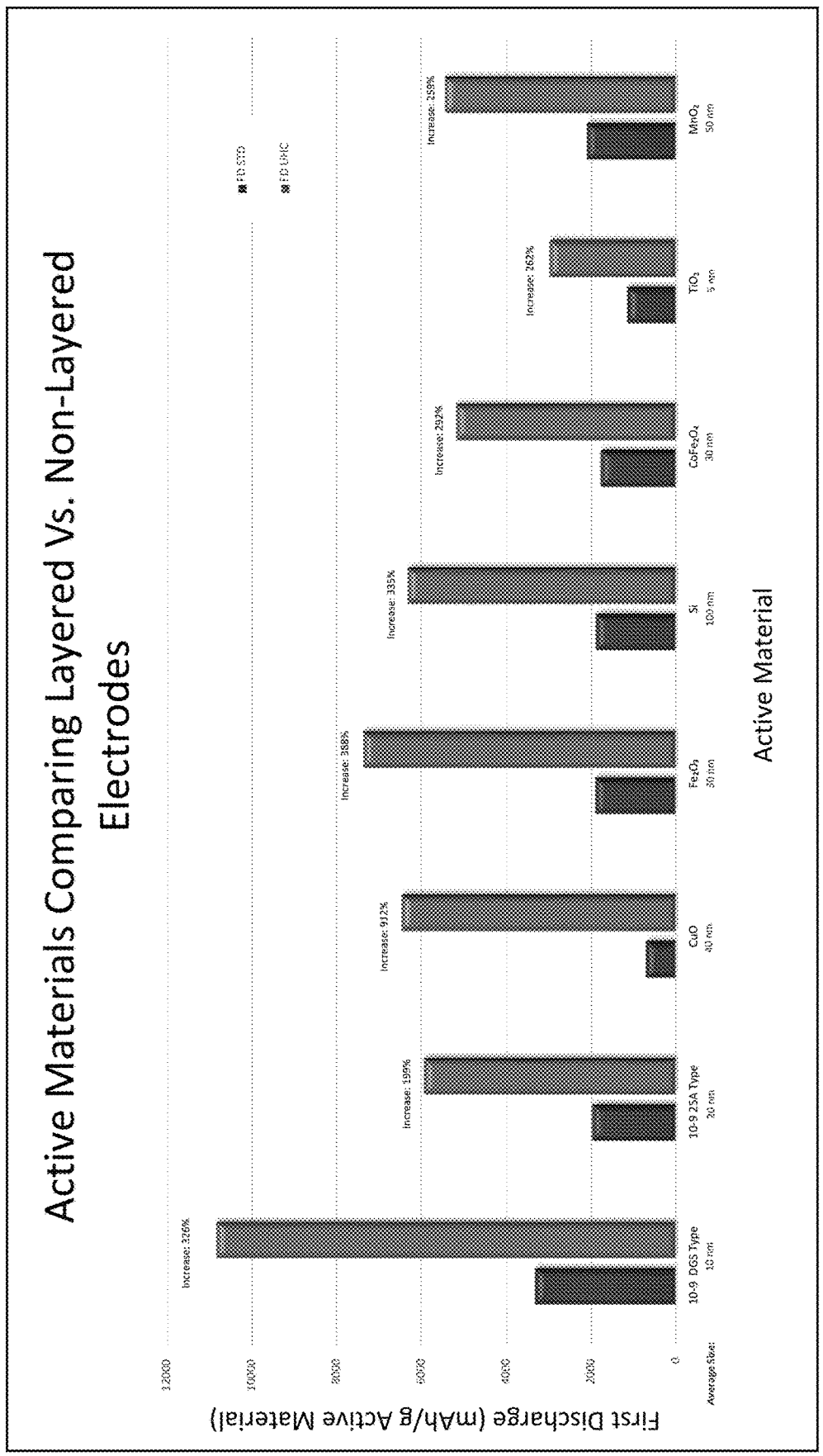
FIG. 55 is a graph comparing first discharge capacities for various active materials based upon layered versus non-layered construction.
Figure 56:
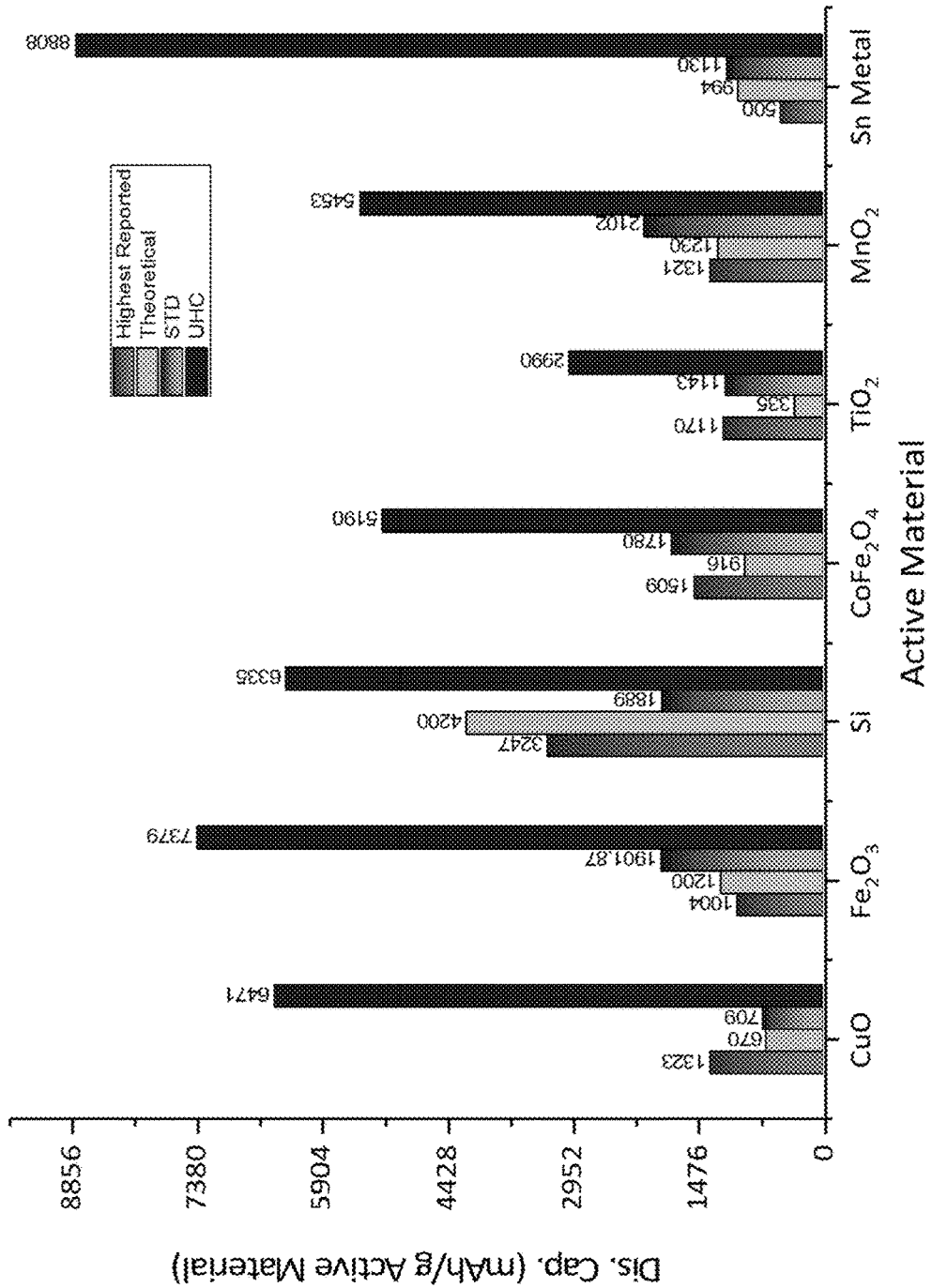
FIG. 56 is a graph comparing first discharge capacities for various active materials as reported previously, as calculated theoretically, as constructed according to the present disclosure in a non-layered construction, and as constructed according to the present disclosure in a layered construction.
Figure 57:
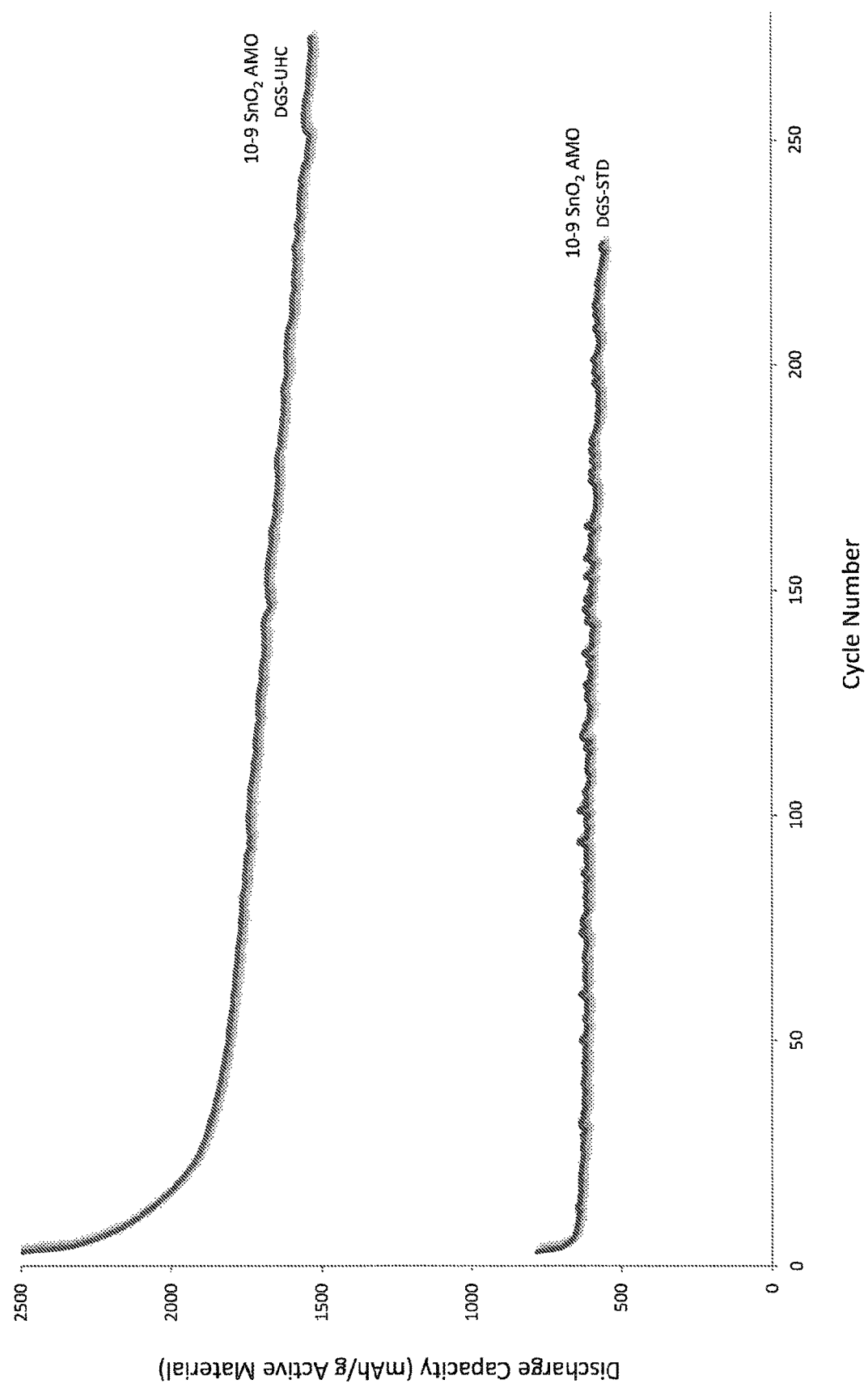
FIG. 57 is a graph of discharge capacity over a plurality of cycles for an $SnO_2$ AMO according to the present disclosure in ultra-high capacity and standard configurations.

The layered electrode construction described above has been found to improve the performance of battery active materials generally, not just of AMO materials. FIG. 54 shows the improved performance of battery coin cells made according to the disclosed method using AMO tin oxide, non-AMO tin oxide of two size ranges, and AMO iron oxide. The average increase in capacity using the layered construction format as compared to a non-layered construction format is 314%. This is believed to be the result of the additional storage of lithium at the (layer) interface(s) and not simply as a result of conductive effects. That said, however, a layered construction results in better conductive contact than a non-layered construction. It is submitted that every electrode material tested to date may perform better in a layered construction than in a non-layered or mixed construction.

In some embodiments, a layered constructed technique for a battery electrode may be effected utilizing a spray gun or airbrush. Both the mixed layer and/or the carbon layer may be applied utilizing a spray gun or airbrush. In the case of a multilayered construction, an airbrush or spray gun method may be used for all of the layers or only some of the layers. An airbrush or spray gun method may also be used to deliver the electrolyte in conjunction with, next to, or on top of, the spray gun constructed electrode.

For purposes of the present disclosure, a spray gun or airbrush is considered to be a mechanism or device for delivery of discrete droplets of a substance onto a surface to form a layer (e.g., of carbon or an active layer). The discrete droplets may be small but the technique would be considered different from a chemical vapor deposition technique since the layer arrives and aggregates on the surface in the form of droplets as opposed to condensing from a gaseous form. In the present embodiments, the spray gun/airbrush methods do not require a clean room or carefully controlled gaseous environment in which to operate. The physical mechanism by which droplets are propelled may be based on air or gas flow or a mechanical actuation (e.g., a piezoelectric spray gun or ultrasonic spray gun). In some embodiments, the dispersal of droplets of material may be effected by a printing type technique using software controlled mechanical actuators to control the precise placement, flow rate, and thickness of layers. It should be understood that in utilizing a sprayed construction methodology, a single layer may be applied in a single pass, or built up over multiple passes before the layer is considered complete such that the next adjacent layer would begin (e.g., carbon or active layer).

In one embodiment, a suspension, such as a colloidal suspension, according to the present disclosure is atomized and delivered through a nozzle by gas pressure. The suspension may have a solids content ranging from 0.001-20%. The solids may be suspended in a variety of liquids functioning as carrier fluids, including but not limited to water and ethanol. The solids may be active materials such as nanoparticulate metal oxides, which may be delivered alone or in combination with conductive carbons, binders, and other additives. In some embodiments, the suspension is prepared as a slurry having from 2-33% active material therein. Total solids in the sprayed suspension may range from 0.01-10 mg/cm$^2$.

The nozzle used for atomization or spraying may be of various geometries and may have variously sized openings and flow rates at various pressures. The nozzle delivery system may be controlled via computer (e.g., with a printer). The droplet size of the spray may range from about 1 nm to about 100 μm. The propellant gas may be normal atmospheric or ambient air (optionally filtered) or may some other gas or mixtures of gases.

Using a sprayed construction technique, an electrode can be constructed in one sprayed layer or in multiple sprayed layers. The electrode can be constructed of at least one sprayed layer with additional layers constructed by other means. The sprayed layers may be less than 10 μm thick, with porosities of 50% or higher. Porosities may be controllable or adjustable based upon nozzle operation and may bear upon performance of the completed electrode. Thickness may also be controllable or adjustable based upon nozzle operation and may bear upon performance of the completed electrode. In some embodiments total thickness of a sprayed layer may range from 6-22 μm.

Airbrush/spray gun techniques are not dependent upon geometry of the substrate as the mixed layers and carbon materials can be applied to a wide variety of surfaces including but not limited to copper tape, aluminum tape, carbon cloth, and metallized films including but not limited to metallized copper film and metallized aluminum film. In some embodiments, the carbon layers and the active layers are applied to a conductive polymer layer as a foundation for the electrode. The conductive polymer layer may include, but is not limited to, polyacetylene, polypyrrole, and polyaniline.

In some embodiments, a layer of carbon is air brush or spray gun applied to a conductive polymer film followed by a mixed or active layer. Another carbon layer and subsequent active layer may be applied until the desired number of layers is achieved. A completed cell may be constructed utilizing electrolytes according to the present disclosure or others. In another embodiment, the active layer may be applied directly on the conductive polymer or metallized film.

A coin-type cell using AMO SnO$_2$ active material constructed with the cathode 1700 described above (non-airbrush construction) using a glass separator, 1:1:1 DEC/EC/DMC as an electrolyte, and an anode consisting of lithium was tested. Other types of separators and electrolytes may be used. The cell was cycled from its open circuit voltage of 3.19 V to 0.01 V and up to 1.5V at a rate of C/10, and thence forward between 1.5 V and 0.01 V at a rate of C/5. Other voltage ranges both greater than and smaller than these may be used. Other rates both greater than and smaller than these may be used. Table 2 below shows the charge capacity and discharge capacity (mAh/g of AMO SnO$_2$) over 111 cycles.

A coin-type cell using AMO SnO$_2$ active material delivered in the airbrush construction method described above a glass separator, 1:1:1 DEC/EC/DMC as an electrolyte, and an anode consisting of lithium was tested. FIG. 59 shows its cycling performance.

Statements Regarding Incorporation by Reference and Variations

All references throughout this application, for example patent documents including issued or granted patents or equivalents, patent application publications, and non-patent literature documents or other source material, are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising," particularly in a description of components of a composition or in a description of elements of a device, is understood to encompass those compositions and methods consisting essentially of and consisting of the recited components or elements. The invention illustratively described herein suitably may be practiced in the absence of any element or limitation that is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the claims.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed:

1. A method of forming a battery electrode comprising:
    preparing a suspension of a nanoparticle sized acidified metal oxide;
    spraying the suspension onto a collector surface and drying the sprayed suspension to create a first active material layer, wherein the nanoparticle sized acidified metal oxide is less than 40% by weight of the first active material layer after drying; and
    providing a first carbon conductive layer containing carbon nanoparticles adjacent to the first active material layer.

2. The method of claim 1, wherein the step of providing at least one carbon conductive layer further comprises spraying the carbon conductive layer onto the active material layer.

3. The method of claim 1, further comprising providing a second active material layer adjacent to the first carbon conductive layer.

4. The method of claim 3, wherein the step of providing a second active material layer further comprises spraying the suspension onto the first carbon conductive layer to create the second active material layer.

5. The method of claim 1, wherein the nanoparticle sized acidified metal oxide is 20-25% by weight of the active material layer after drying.

6. The method of claim 5, wherein the nanoparticle sized acidified metal oxide is 21% by weight of the active material layer after drying.

7. The method of claim 1, further comprising preparing the suspension of nanoparticle sized acidified metal oxide such that the nanoparticles are monodispersed.

8. The method of claim 7, wherein the acidified nanoparticle sized metal oxide has a pH>5, the pH measured when a dried form of the acidified nanoparticle sized metal is suspended in water at 5% by weight.

9. The method of claim 8, the acidified nanoparticle sized metal oxide is selected from the group consisting of tin oxide, iron oxide, manganese oxide, and titanium oxide.

10. The method of claim 9, wherein the acidified nanoparticle sized metal oxide comprises one or more electron withdrawing groups selected from the group consisting of Cl, Br, $BO_3$, $SO_4$, $PO_4$, $NO_3$, $CH_3COO$, $C_2O_4$, $C_2H_2O_4$, $C_6H_8O_7$, and $C_6H_5O_7$.

11. The method of claim 10, the battery electrode is a cathode.

12. The method of claim 1, wherein the nanoparticle sized acidified metal oxide provides a lithiation capacity of at least 4000 mAhr/g.

13. The method of claim 1, further comprising spraying the suspension to create the first active material layer with a thickness of less than 10 μm thick.

14. The method of claim 1, further comprising spraying the suspension to create the first active material layer with a porosity of at least 50%.

15. A method of forming a battery electrode comprising:
    forming a plurality of active material layers, each containing acidified metal oxide nanoparticles in an amount less than 40% by weight of the active material layer; and
    forming at least one carbon conductive layer between at least two of the plurality of active material layers to create an alternating arrangement;
    wherein at least one of the plurality of active material layers is formed by spraying a suspension of metal oxide onto a collector surface and drying the sprayed suspension.

16. The method of claim 15, wherein each of the plurality of active material layers is formed by spraying a suspension of the acidified metal oxide nanoparticles onto a collector surface and drying the sprayed suspension.

17. The method of claim 16, wherein the spraying a suspension of the acidified metal oxide nanoparticles onto the surface and the drying the sprayed suspension further comprises spraying the suspension of the acidified metal oxide nanoparticles with a droplet size of 1 nm to 100 μm.

18. The method of claim 15, wherein at least one of the plurality of active material layers is not formed by spraying.

19. The method of claim 15, further comprising the acidified metal oxide nanoparticles selected from the group consisting of tin oxide, iron oxide, manganese oxide, and titanium oxide.

20. The method of claim 19, wherein the acidified metal oxide nanoparticles have a pH of between 0 and 7, the pH measured when a dried form of the acidified metal oxide nanoparticles is suspended in water at 5 wt. %, and have a Hammett function, $H_0$, that is greater than −12 at least on the surface of the acidified metal oxide nanoparticles.

21. The method of claim 15, wherein the acidified metal oxide nanoparticles comprise tin oxide.

22. The method of claim 15, wherein the sprayed suspension contains solids from 0.01-10 mg/cm$^2$.

* * * * *